US012676111B2

(12) United States Patent
Yuan et al.

(10) Patent No.: US 12,676,111 B2
(45) Date of Patent: Jul. 7, 2026

(54) PIXEL CIRCUIT, DRIVING METHOD AND DISPLAY DEVICE

(71) Applicants: CHENGDU BOE OPTOELECTRONICS TECHNOLOGY CO., LTD., Chengdu (CN); BOE TECHNOLOGY GROUP CO., LTD., Beijing (CN); Beijing BOE Technology Development Co., Ltd., Beijing (CN)

(72) Inventors: Changlong Yuan, Beijing (CN); Baoxi Wang, Beijing (CN); Jingyi Feng, Beijing (CN); Li Zhu, Beijing (CN); Zhenhua Zhang, Beijing (CN); Xilei Cao, Beijing (CN); Wulin Shen, Beijing (CN); Xiaoxiao Wang, Beijing (CN); Yao Hu, Beijing (CN); Zhen Liu, Beijing (CN); Mengmeng Du, Beijing (CN)

(73) Assignees: BOE TECHNOLOGY GROUP CO., LTD, Beijing (CN); CHENGDU BOE OPTOELECTRONICS TECHNOLOGY CO., LTD., Chengdu (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 12 days.

(21) Appl. No.: 18/695,638

(22) PCT Filed: Jul. 31, 2023

(86) PCT No.: PCT/CN2023/110336

§ 371 (c)(1),
(2) Date: Mar. 26, 2024

(87) PCT Pub. No.: WO2024/060841

PCT Pub. Date: Mar. 28, 2024

(65) Prior Publication Data

US 2024/0257755 A1 Aug. 1, 2024

(30) Foreign Application Priority Data

Sep. 19, 2022 (CN) ......................... 202211139247.2
Nov. 28, 2022 (WO) ................ PCT/CN2022/134737

(51) Int. Cl.
*G09G 3/3233* (2016.01)

(52) U.S. Cl.
CPC ... *G09G 3/3233* (2013.01); *G09G 2300/0842* (2013.01); *G09G 2310/061* (2013.01); *G09G 2310/08* (2013.01); *G09G 2320/0233* (2013.01)

(58) Field of Classification Search
None
See application file for complete search history.

(56) References Cited

U.S. PATENT DOCUMENTS 11,170,719 B1 11/2021 Lu et al.
2011/0164016 A1 7/2011 Kang et al.
(Continued)

FOREIGN PATENT DOCUMENTS

CN 101127183 A 2/2008
CN 101908316 A 12/2010
(Continued)

OTHER PUBLICATIONS

Translation of CN114241978A into English; Guo et al. (Year: 2022).*

(Continued)

*Primary Examiner* — Brian M Butcher
(74) *Attorney, Agent, or Firm* — MUNCY, GEISSLER, OLDS & LOWE, P.C.

(57) ABSTRACT

A pixel circuit, a driving method, and a display device are provided. The pixel circuit includes a light emitting element,
(Continued)

a driving circuit, a first energy storage circuit, a first setting circuit, a second setting circuit and a light emitting control circuit. The first setting circuit controls to connect the first setting voltage terminal and the first node under the control of the first control signal provided by the first control terminal; the second setting circuit controls to connect the second setting voltage terminal and the second terminal of the first energy storage circuit under the control of the second control signal provided by the second control terminal.

19 Claims, 50 Drawing Sheets

(56) References Cited

U.S. PATENT DOCUMENTS

| | | | | |
|---|---|---|---|---|
| 2013/0335399 | A1 | 12/2013 | Tsuge | |
| 2014/0111490 | A1 | 4/2014 | Lee et al. | |
| 2015/0243203 | A1* | 8/2015 | Kim | G09G 3/2092 345/212 |
| 2016/0217739 | A1 | 7/2016 | Kang et al. | |
| 2018/0082652 | A1 | 3/2018 | Lv et al. | |
| 2019/0180688 | A1 | 6/2019 | Yang et al. | |
| 2020/0066212 | A1 | 2/2020 | Kim et al. | |
| 2020/0168156 | A1 | 5/2020 | Yin | |
| 2021/0125547 | A1 | 4/2021 | Lin et al. | |
| 2022/0101777 | A1 | 3/2022 | Kim et al. | |
| 2022/0115485 | A1 | 4/2022 | Yu | |
| 2022/0319426 | A1 | 10/2022 | Yin | |
| 2022/0351671 | A1 | 11/2022 | Xu et al. | |
| 2023/0419896 | A1 | 12/2023 | Zhang | |
| 2024/0119897 | A1 | 4/2024 | Zhang et al. | |

FOREIGN PATENT DOCUMENTS

| | | | |
|---|---|---|---|
| CN | 102930822 | A | 2/2013 |
| CN | 104008726 | A | 8/2014 |
| CN | 204257651 | U | 4/2015 |
| CN | 104599637 | A | 5/2015 |
| CN | 104700778 | A | 6/2015 |
| CN | 106297662 | A | 1/2017 |
| CN | 205984242 | U | 2/2017 |
| CN | 106531074 | A | 3/2017 |
| CN | 107068060 | A | 8/2017 |
| CN | 108520726 | A | 9/2018 |
| CN | 109872692 | A | 6/2019 |
| CN | 110675829 | A | 1/2020 |
| CN | 111179836 | A | 5/2020 |
| CN | 112687189 | A | 4/2021 |
| CN | 112885850 | A | 6/2021 |
| CN | 113506540 | A | 10/2021 |
| CN | 113744683 | A | 12/2021 |
| CN | 113838421 | A | 12/2021 |
| CN | 215265531 | U | 12/2021 |
| CN | 114175257 | A | 3/2022 |
| CN | 114241978 | A | 3/2022 |
| CN | 114255708 | A | 3/2022 |
| CN | 114664253 | A | 6/2022 |
| CN | 114708838 | A | 7/2022 |
| CN | 114783357 | A | 7/2022 |
| JP | 2003114657 | A | 4/2003 |
| JP | 2010197544 | A | 9/2010 |
| JP | 2016027364 | A | 2/2016 |
| KR | 20080113998 | A | 12/2008 |
| KR | 20210131852 | A | 11/2021 |

OTHER PUBLICATIONS

Extended European search report corresponding to application No. 23867136.6 dated Apr. 16, 2025, 21 pages.

Extended European search report corresponding to application No. 23896249.2 dated Aug. 20, 2025, 24 pages.

US Office Action U.S. Appl. No. 18/857,165 dated Nov. 12, 2025, 27 pages.

US Non final Office Action in U.S. Appl. No. 18/874,562 dated Oct. 7, 2025; 21 pages.

US Non final Office Action in U.S. Appl. No. 18/857,165 dated Aug. 1, 2025; 31 pages.

* cited by examiner

PIXEL CIRCUIT, DRIVING METHOD AND DISPLAY DEVICE

CROSS-REFERENCE TO RELATED APPLICATION

The present disclosure is the U.S. national phase of PCT Application No. PCT/CN2023/110336 filed on Jul. 31, 2023, which claims the priority of PCT Application No. PCT/CN2022/134737 filed on Nov. 28, 2022 and Chinese patent application No. 202211139247.2 filed on Sep. 19, 2022, which are incorporated herein by reference in their entireties.

TECHNICAL FIELD

The present disclosure relates to the field of display technology, in particular to a pixel circuit, a driving method and a display device.

BACKGROUND

Organic light emitting diode (OLED) displays are one of the hot spots in the field of flat panel display research today. Unlike thin film transistor liquid crystal displays (TFT-LCDs), which use a stable voltage to control brightness, OLEDs are driving by a driving current that needs to be kept constant to control illumination. The OLED display panel includes a plurality of pixel units configured with pixel driving circuits arranged in a plurality of rows and a plurality of columns. Each pixel driving circuit includes a driving transistor having a gate terminal connected to each row gate line and a drain terminal connected to one column data line. When the row of pixel circuits that are gated is turned on, the switching transistor connected to the driving transistor is turned on, and the data voltage is applied from the data line to the driving transistor via the switching transistor, so that the driving transistor outputs a current corresponding to the data voltage to an OLED device, to drive the OLED device to emit light of corresponding brightness.

SUMMARY

In one aspect, the present disclosure provides in some embodiments a pixel circuit, including a light emitting element, a driving circuit, a first energy storage circuit, a first setting circuit, a second setting circuit and a light emitting control circuit; wherein the light emitting control circuit is electrically connected to a light emitting control terminal, a first voltage terminal and a first terminal of the driving circuit respectively, and is configured to control to connect the first voltage terminal and the first terminal of the driving circuit under the control of a light emitting control signal provided by the light emitting control terminal: a control terminal of the driving circuit is electrically connected to a first node, and a second terminal of the driving circuit is electrically connected to a first electrode of the light emitting element, the driving circuit is configured to control to connect the first voltage terminal and the first electrode of the light emitting element under the control of a potential of the first node; the first electrode of the light emitting element is electrically connected to a second node: a second electrode of the light emitting element is electrically connected to a second voltage terminal: a first terminal of the first energy storage circuit is electrically connected to the first node, and a second terminal of the first energy storage circuit is electrically connected to a third node, the first energy storage circuit is configured to store electrical energy: the second node is electrically connected to the third node: the first setting circuit is electrically connected to a first control terminal, a first setting voltage terminal and the first node respectively, and is configured to control to connect the first setting voltage terminal and the first node under the control of a first control signal provided by the first control terminal: the second setting circuit is electrically connected to a second control terminal, a second setting voltage terminal and a second terminal of the first energy storage circuit respectively, and is configured to control to connect the second setting voltage terminal and the second terminal of the first energy storage circuit under the control of a second control signal provided by the second control terminal.

Optionally, the pixel circuit further includes a data writing-in circuit; wherein the data writing-in circuit is electrically connected to a scanning terminal, a data line and the first node respectively, and is configured to write a data voltage provided by the data line into the first node under the control of a scanning signal provided by the scanning terminal.

Optionally, the pixel circuit further includes a second energy storage circuit: wherein the third node is electrically connected to the second node through the second energy storage circuit: a first terminal of the second energy storage circuit is electrically connected to the third node, a second terminal of the second energy storage circuit is electrically connected to the second node, and the second energy storage circuit is configured to store electrical energy.

Optionally, the pixel circuit further includes a third setting circuit; wherein the third setting circuit is electrically connected to a third control terminal, a third setting voltage terminal and the third node respectively, and is configured to write a third setting voltage provided by the third setting voltage terminal into the third node under the control of a third control signal provided by the third control terminal.

Optionally, the first control terminal and the second control terminal are a same control terminal.

Optionally, the pixel circuit further includes a data writing-in circuit; wherein the data writing-in circuit is electrically connected to the scanning terminal, the data line and the first node respectively, and is configured to write the data voltage provided by the data line into the first node under the control of the scanning signal provided by the scanning terminal: the third control terminal and the scanning terminal are a same control terminal.

Optionally, the pixel circuit further includes a fourth setting circuit; wherein the fourth setting circuit is electrically connected to a fourth control terminal, a fourth setting voltage terminal and the second node respectively, and is configured to write a fourth setting voltage provided by the fourth setting voltage terminal into the second node under the control of a fourth control signal provided by the fourth control terminal.

Optionally, the first control terminal and the fourth control terminal are a same control terminal.

Optionally, the pixel circuit includes a third setting circuit and a fourth setting circuit: the third setting circuit is electrically connected to a third control terminal, a third setting voltage terminal and a third node respectively, and is configured to write a third setting voltage provided by the third setting voltage terminal into the third node under the control of a third control signal provided by the third control terminal: the fourth setting circuit is electrically connected to a fourth control terminal, the third node and the second node respectively, and is configured to connect the third node and the second node under the control of the fourth control signal provided by the fourth control terminal: the second setting voltage terminal and the third setting voltage terminal are a same setting voltage.

Optionally, the pixel circuit further comprises a first control circuit; the first terminal of the first energy storage circuit is electrically connected to the first node through the first control circuit: the first terminal of the first energy storage circuit is directly electrically connected to a fourth node: the first control circuit is electrically connected to a fifth control terminal, and is configured to control to connect the first node and the fourth node under the control of a fifth control signal provided by the fifth control terminal.

Optionally, the pixel circuit further includes a data writing-in circuit; wherein the data writing-in circuit is electrically connected to the scanning terminal, the data line and the fourth node respectively, and is configured to write the data voltage provided by the data line into the fourth node under the control of the scanning signal provided by the scanning terminal.

Optionally, the second setting voltage terminal is electrically connected to the first node.

Optionally, the first setting voltage terminal is electrically connected to the third node.

Optionally, the first setting voltage terminal and the first voltage terminal are a same voltage terminal.

Optionally, the pixel circuit further includes a second control circuit; wherein the second control circuit is electrically connected to the light emitting control terminal, the second terminal of the driving circuit and the first electrode of the light emitting element respectively, and is configured to control to connect the second terminal of the driving circuit and the first electrode of the light emitting element under the control of the light emitting control signal.

Optionally, the pixel circuit further includes a fourth setting circuit; wherein the fourth setting circuit is electrically connected to the fourth control terminal, the fourth setting voltage terminal and the second node respectively, and is configured to write the fourth setting voltage provided by the fourth setting voltage terminal into the second node under the control of the fourth control signal provided by the fourth control terminal; the second setting voltage terminal and the fourth setting voltage terminal are a same voltage terminal.

Optionally, the second voltage terminal and the fourth setting voltage terminal are a same voltage terminal.

Optionally, the pixel circuit further includes a fourth setting circuit: the fourth setting circuit is electrically connected to the fourth control terminal, the fourth setting voltage terminal and the second node respectively, and is configured to write the fourth setting voltage provided by the fourth setting voltage terminal into the second node under the control of the fourth control signal provided by the fourth control terminal: the fourth control terminal and the scanning terminal are a same control terminal.

Optionally, the third node is electrically connected to the fourth setting voltage terminal.

In a second aspect, an embodiment of the present disclosure provides a driving method, applied to the pixel circuit, including: controlling, by the light emitting control circuit, to connect the first voltage terminal and the first terminal of the driving circuit under the control of the light emitting control signal: controlling, by the driving circuit, to connect the first voltage terminal and the first electrode of the light emitting element under the control of the potential of the first node: controlling, by the first setting circuit, to connect the first setting voltage terminal and the first node under the control of the first control signal: controlling, by the second setting circuit, to connect the second setting voltage terminal and the first energy storage circuit under the control of the second control signal.

In a third aspect, an embodiment of the present disclosure provides a display device including the pixel circuit.

DETAILED DESCRIPTION

The technical solutions in the embodiments of the present disclosure will be clearly and completely described below with reference to the accompanying drawings in the embodiments of the present disclosure. Obviously, the described embodiments are only some of the embodiments of the present disclosure, rather than all of the embodiments. Based on the embodiments in the present disclosure, all other embodiments obtained by those of ordinary skill in the art without creative work fall within the scope of protection of this disclosure.

The transistors used in all embodiments of the present disclosure may be thin film transistors, field effect transistors, or other devices with the same characteristics. In the embodiment of the present disclosure, in order to distinguish the two electrodes of the transistor except the gate electrode, one electrode is called the first electrode and the other electrode is called the second electrode.

In actual operation, when the transistor is a thin film transistor or a field effect transistor, the first electrode may be a drain electrode, and the second electrode may be a source electrode: or, the first electrode may be a source electrode, the second electrode may be a drain electrode.

Figure 1:
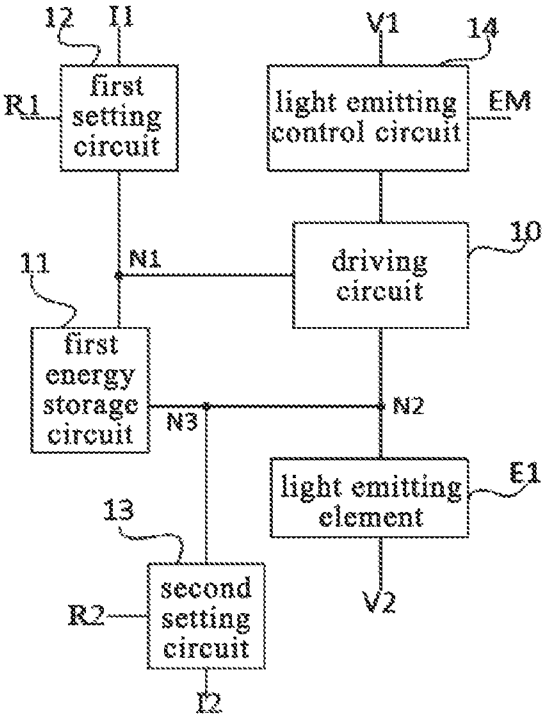
FIG. 1 is a structural diagram of a pixel circuit according to at least one embodiment of the present disclosure.

As shown in FIG. 1, the pixel circuit according to the embodiment of the present disclosure includes a light emitting element E1, a driving circuit 10, a first energy storage circuit 11, a first setting circuit 12, a second setting circuit 13 and a light emitting control circuit 14;

The light emitting control circuit 14 is electrically connected to a light emitting control terminal EM, a first voltage terminal V1 and a first terminal of the driving circuit 10 respectively, and is configured to control to connect the first voltage terminal V1 and the first terminal of the driving circuit 10 under the control of a light emitting control signal provided by the light emitting control terminal EM;

A control terminal of the driving circuit 10 is electrically connected to a first node N1, and a second terminal of the driving circuit 10 is electrically connected to a first electrode of the light emitting element E1. The driving circuit 10 is configured to control to connect the first voltage terminal V1 and the first electrode of the light emitting element E1 under the control of the potential of the first node N1;

The first electrode of the light emitting element E1 is electrically connected to a second node N2; a second electrode of the light emitting element E1 is electrically connected to a second voltage terminal V2;

A first terminal of the first energy storage circuit 11 is electrically connected to the first node N1, and a second terminal of the first energy storage circuit 11 is electrically connected to a third node N3. The first energy storage circuit 11 is configured to store electrical energy: the second node N2 is electrically connected to the third node N3;

The first setting circuit 12 is electrically connected to a first control terminal R1, a first setting voltage terminal I1 and the first node N1 respectively, and is configured to control to connect the first setting voltage terminal I1 and the first node N1 under the control of the first control signal provided by the first control terminal R1;

The second setting circuit 13 is electrically connected to a second control terminal R2, a second setting voltage terminal I2 and a second terminal of the first energy storage circuit 11 respectively, and is configured to control to connect the second setting voltage terminal I2 and the second terminal of the first energy storage circuit 11 under the control of the second control signal provided by the second control terminal R2.

The pixel circuit described in the embodiment of the present disclosure can implement Pulse Width Modulation (PWM) control by using the light emitting control circuit 14.

When the pixel circuit according to the embodiment of the present disclosure is working, in the light emitting phase, the light emitting control signal provided by the light emitting control terminal EM can be a PWM signal. By adjusting the duty ratio and frequency of the PWM signal, the light emitting brightness can be adjusted.

When the pixel circuit described in the embodiment of the present disclosure is working, the threshold compensation phase and the data writing-in phase are performed separately, the compensation is sufficient, and the threshold voltage compensation time is not limited to the data writing-in phase, so that the high-frequency refresh effect can be achieved.

In at least one embodiment of the present disclosure, the first setting voltage provided by the first setting voltage terminal I1 and the second setting voltage provided by the second setting voltage terminal I2 may be the same voltage or may be different voltages.

When the embodiment of the pixel circuit shown in FIG. 1 of the present disclosure is working, The first setting circuit 12 can set the potential of the first node N1 through the first setting voltage Vi1 provided by the first setting voltage terminal I1 under the control of the first control signal;

The second setting circuit 13 sets the potential of the second terminal of the first energy storage circuit 11 through the second setting voltage Vi2 provided by the second setting voltage terminal I2 under the control of the second control signal.

Optionally, the first voltage terminal may be a power supply voltage terminal, and the second voltage terminal may be a low voltage terminal, but is not limited thereto.

The pixel circuit according to at least one embodiment of the present disclosure further includes a data writing-in circuit;

The data writing-in circuit is electrically connected to a scanning terminal, a data line and the first node respectively, and is configured to write the data voltage provided by the data line into the first node under the control of the scanning signal provided by the scanning terminal.

In specific implementation, the pixel circuit may further include a data writing-in circuit, which writes the data voltage to the first node under the control of the scanning signal.

Figure 2:
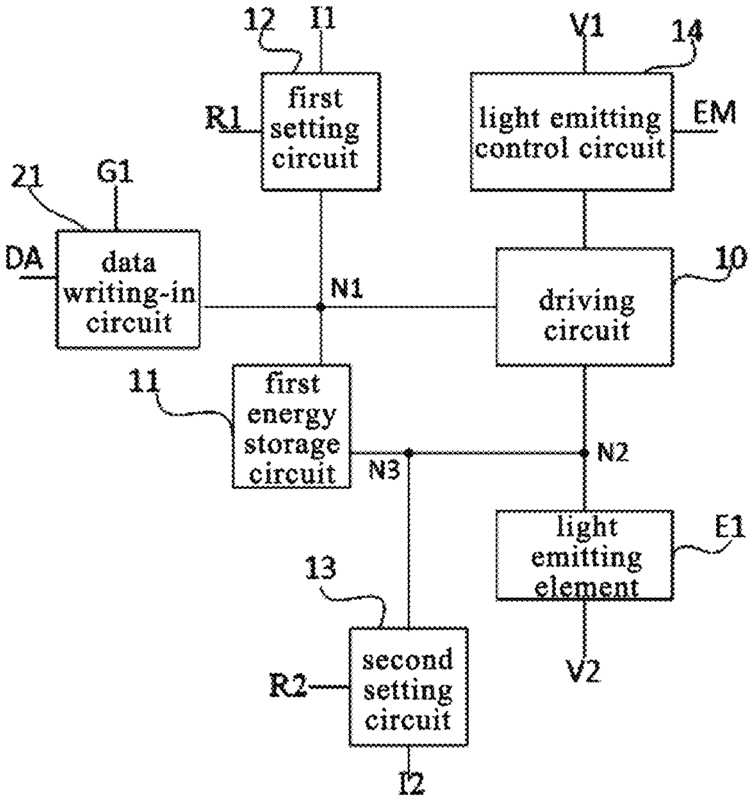
FIG. 2 is a structural diagram of a pixel circuit according to at least one embodiment of the present disclosure.

As shown in FIG. 2, based on the embodiment of the pixel circuit shown in FIG. 1, the pixel circuit described in at least one embodiment of the present disclosure also includes a data writing-in circuit 21;

The data writing-in circuit 21 is electrically connected to the scanning terminal G1, the data line DA and the first node N1 respectively, and is configured to write the data voltage Vdata provided by the data line DA into the first node N1 under the control of the scanning signal provided by the scanning terminal G1.

The pixel circuit according to at least one embodiment of the present disclosure further includes a second energy storage circuit;

The third node is electrically connected to the second node through the second energy storage circuit;

A first terminal of the second energy storage circuit is electrically connected to the third node, a second terminal of the second energy storage circuit is electrically connected to the second node, and the second energy storage circuit is configured to store electrical energy.

During specific implementation, the pixel circuit described in at least one embodiment of the present disclosure may further include a second energy storage circuit, and the third node is electrically connected to the second node through the second energy storage circuit. By adding the second energy storage circuit, when the potential of the first node N1 changes, the potential of the second node N2 will not be affected.

Figure 3:
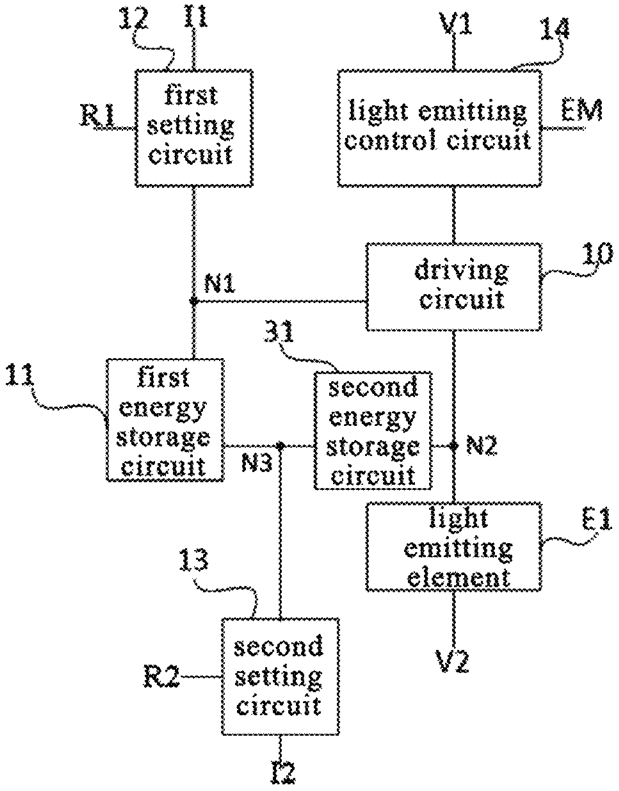
FIG. 3 is a structural diagram of a pixel circuit according to at least one embodiment of the present disclosure.

As shown in FIG. 3, based on at least one embodiment of the pixel circuit shown in FIG. 1, the pixel circuit described in at least one embodiment of the present disclosure may further include a second energy storage circuit 31;

The third node N3 is electrically connected to the second node N2 through the second energy storage circuit 31;

The first terminal of the second energy storage circuit 31 is electrically connected to the third node N3, the second terminal of the second energy storage circuit 31 is electrically connected to the second node N2, and the second energy storage circuit 31 is configured to store electrical energy.

In at least one embodiment of the present disclosure, adding a second energy storage circuit can better isolate the first and second nodes and prevent interference between the two nodes: in addition, when the second setting circuit is turned off, the second energy storage circuit and the first energy storage circuit form a storage circuit with stronger storage capacity.

The pixel circuit according to at least one embodiment of the present disclosure further includes a third setting circuit;

The third setting circuit is electrically connected to the third control terminal, a third setting voltage terminal and a third node respectively, and is configured to write the second setting voltage provided by the second setting voltage terminal into the third node under the control of the third control signal provided by the third control terminal.

During specific implementation, the pixel circuit according to at least one embodiment of the present disclosure may further include a third setting circuit. The third setting circuit writes the third setting voltage into the third node under the control of the third setting control signal.

The pixel circuit according to at least one embodiment of the present disclosure writes the third setting voltage into the third node through the third setting circuit under the control of the third setting control signal, the third node has a stable voltage, so that he potential of the second node is stable.

Figure 4:
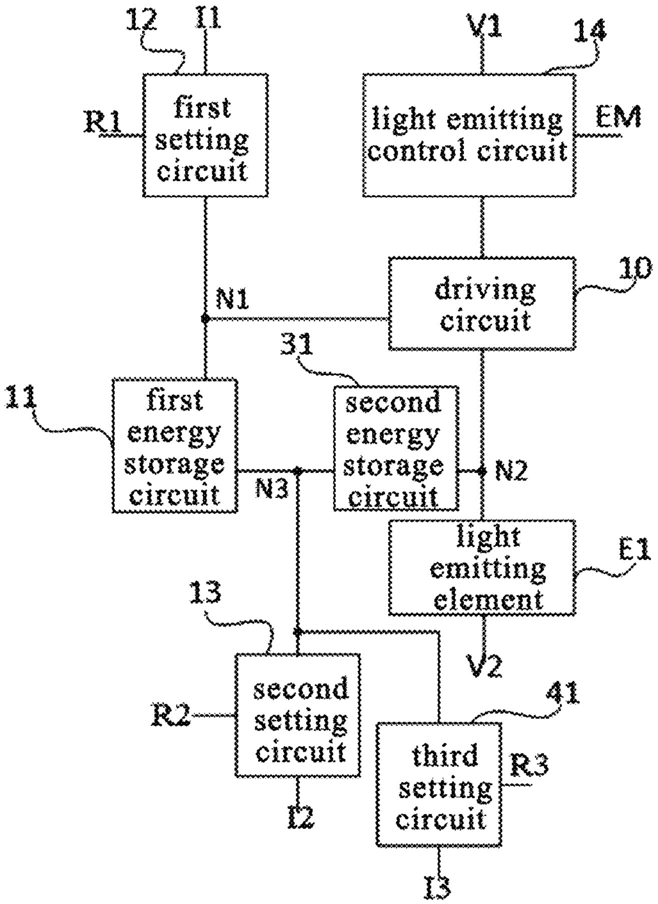
FIG. 4 is a structural diagram of a pixel circuit according to at least one embodiment of the present disclosure.

As shown in FIG. 4, based on at least one embodiment of the pixel circuit shown in FIG. 3, the pixel circuit described in at least one embodiment of the present disclosure may also include a third setting circuit 41;

The third setting circuit 41 is electrically connected to the third control terminal R3, the third setting voltage terminal I3 and the third node N3 respectively, is configured to write the third setting voltage provided by the third setting voltage terminal I3 into the third node N3 under the control of the third control signal provided by the third control terminal R3.

In at least one embodiment of the present disclosure, the third setting voltage may be the same as the first setting voltage and the second setting voltage, but is not limited thereto. In actual operation, the first setting voltage, the second setting voltage and the third setting voltage may also be different from each other.

In at least one embodiment of the present disclosure, the first control terminal and the second control terminal are the same control terminal.

The pixel circuit according to at least one embodiment of the present disclosure further includes a data writing-in circuit;

The data writing-in circuit is electrically connected to the scanning terminal, the data line and the first node respectively, and is configured to write the data voltage provided by the data line into the first node under the control of the scanning signal provided by the scanning terminal;

The third control terminal and the scanning terminal are the same control terminal.

In specific implementation, the pixel circuit may also include a data writing-in circuit. The data writing-in circuit writes the data voltage into the first node under the control of the scanning signal. The third control terminal and the scanning terminal may be the same control terminal to reduce the number of control terminals.

Figure 5:
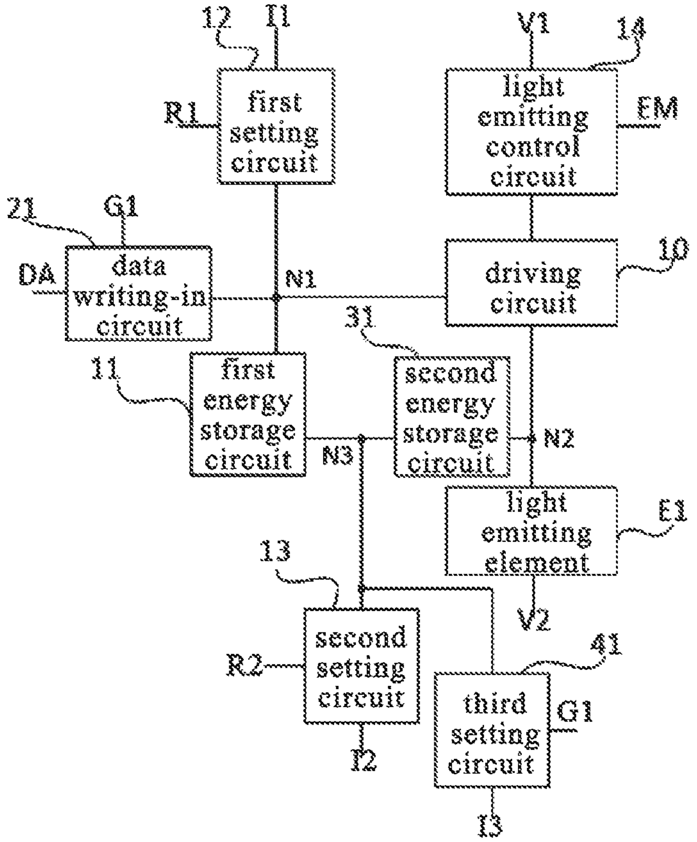
FIG. 5 is a structural diagram of a pixel circuit according to at least one embodiment of the present disclosure.

As shown in FIG. 5, based on at least one embodiment of the pixel circuit shown in FIG. 4, the pixel circuit described in at least one embodiment of the present disclosure also includes a data writing-in circuit 21;

The data writing-in circuit 21 is electrically connected to the scanning terminal G1, the data line DA and the first node N1 respectively, and is configured to write the data voltage Vdata provided by the data line DA into the first node N1 under the control of the scanning signal provided by the scanning terminal G1.

The third control terminal and the scanning terminal G1 are the same control terminal;

The third setting circuit 41 is electrically connected to the scanning terminal G1, the third setting voltage terminal I3 and the third node N3 respectively, and is configured to write the third setting voltage provided by the third setting voltage terminal I3 into the third node N3 under the control of the scanning signal provided by the scanning terminal G1.

The pixel circuit according to at least one embodiment of the present disclosure further includes a fourth setting circuit;

The fourth setting circuit is electrically connected to a fourth control terminal, a fourth setting voltage terminal and the second node respectively, and is configured to write the fourth setting voltage provided by the fourth setting voltage terminal into the second node under the control of the fourth control signal provided by the fourth control terminal.

In specific implementation, the pixel circuit may further include a fourth setting circuit. Under the control of the fourth control signal, the fourth setting circuit writes the fourth setting voltage into the second node, so that in the initialization phase before the threshold voltage compensation phase, the potential of the second node is set.

Figure 6:
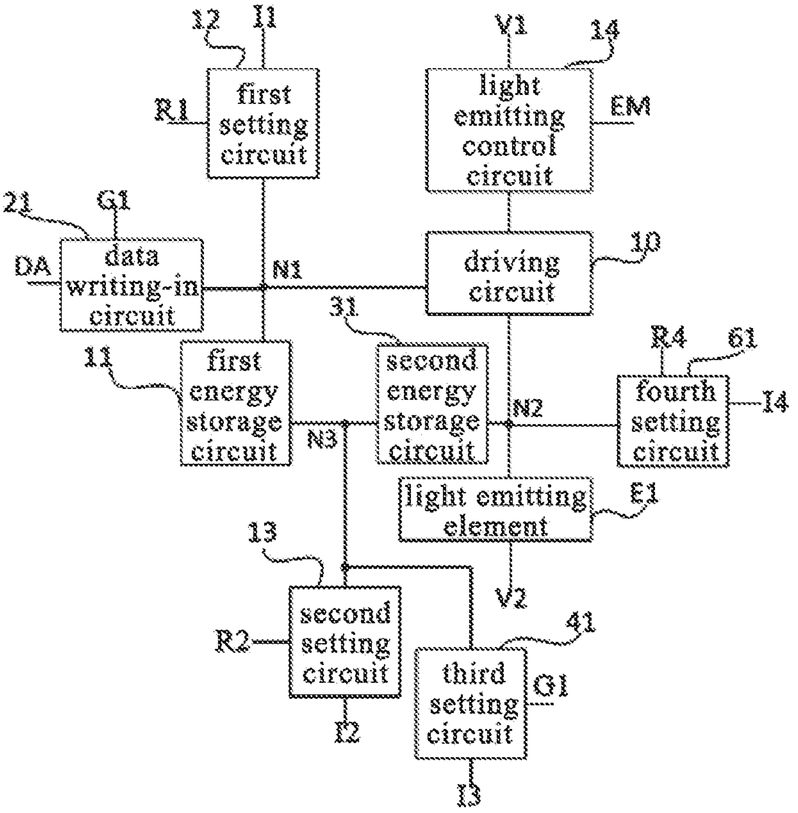
FIG. 6 is a structural diagram of a pixel circuit according to at least one embodiment of the present disclosure.

As shown in FIG. 6, based on at least one embodiment of the pixel circuit shown in FIG. 5, the pixel circuit described in at least one embodiment of the present disclosure may further include a fourth setting circuit 61;

The fourth setting circuit 61 is electrically connected to the fourth control terminal R4, the fourth setting voltage terminal I4 and the second node N2 respectively, and is configured to write the fourth setting voltage provided by the fourth setting voltage terminal I4 into the second node N2 under the control of the fourth control signal provided by the fourth control terminal R4.

In at least one embodiment of the present disclosure, the first control terminal and the fourth control terminal are the same control terminal to reduce the number of control terminals.

In at least one embodiment of the present disclosure, the pixel circuit includes a third setting circuit and a fourth setting circuit;

The third setting circuit is electrically connected to the third control terminal, the third setting voltage terminal and the third node respectively, and is configured to write the third setting voltage provided by the third setting voltage terminal into the third node under the control of the third control signal provided by the third control terminal;

The fourth setting circuit is electrically connected to the fourth control terminal, the fourth setting voltage terminal and the second node respectively, and is configured to write the fourth setting voltage provided by the fourth setting voltage terminal into the second node under the control of the fourth control signal provided by the fourth control terminal;

The second setting voltage terminal, the third setting voltage terminal and the fourth setting voltage terminal are the same setting voltage.

Figure 7A:
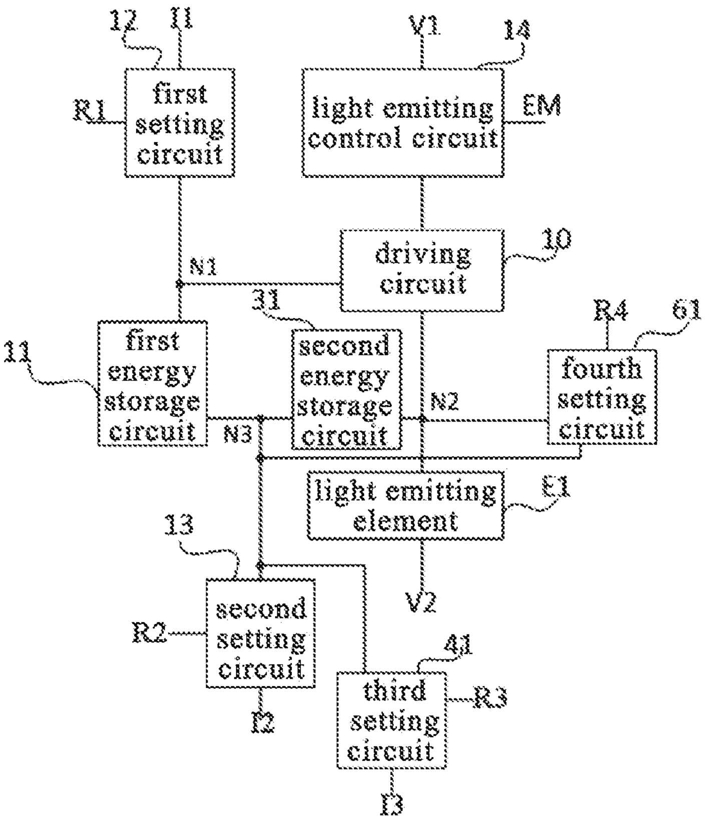
FIG. 7A is a structural diagram of a pixel circuit according to at least one embodiment of the present disclosure.

As shown in FIG. 7A, based on at least one embodiment of the pixel circuit shown in FIG. 3, the pixel circuit includes a third setting circuit 41 and a fourth setting circuit 61;

The third setting circuit 41 is electrically connected to the third control terminal R3, the third setting voltage terminal I3 and the third node N3 respectively, and is configured to write the third setting voltage provided by the third setting voltage terminal I3 into the third node N3 under the control of the third control signal provided by the third control terminal R3;

The fourth setting circuit 61 is electrically connected to the fourth control terminal R4, the third node N3 and the second node N2 respectively, and is configured to connect the third node N3 and the second node N2 under the control of the fourth control signal provided by the fourth control terminal;

The second setting voltage terminal I2 and the third setting voltage terminal I3 are the same setting voltage terminal;

The pixel circuit according to at least one embodiment of the present disclosure further includes a data writing-in circuit 21;

The data writing-in circuit 21 is electrically connected to the scanning terminal G1, the data line DA and the first node N1 respectively, and is configured to write the data voltage Vdata provided by the data line DA into the first node N1 under the control of the scanning signal provided by the scanning terminal G1.

Figure 7B:
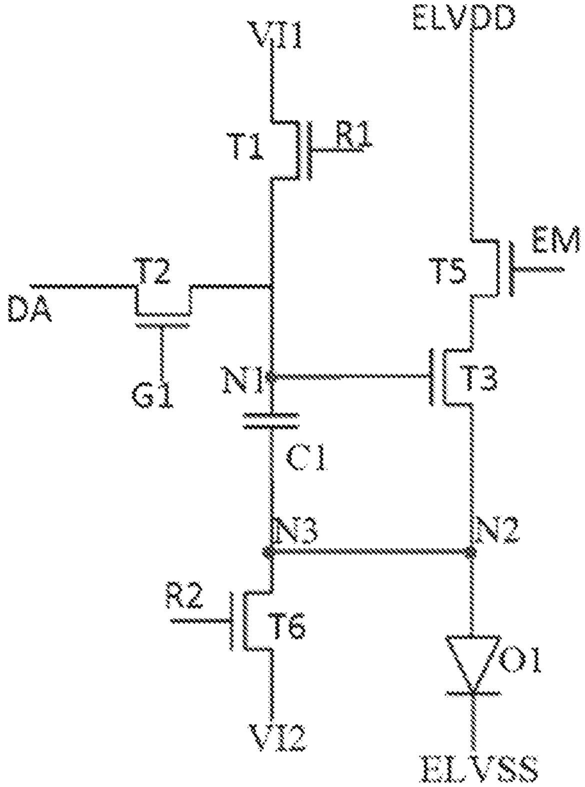
FIG. 7B is a circuit diagram of a pixel circuit according to at least one embodiment of the present disclosure.

As shown in FIG. 7B, based on at least one embodiment of the pixel circuit shown in FIG. 1, the driving circuit includes a driving transistor T3, the first setting circuit includes a first transistor T1, and the data writing-in circuit includes a second transistor T2, the light emitting control circuit includes a fifth transistor T5, the second setting circuit includes a sixth transistor T6; the first energy storage circuit includes a first capacitor C1; the light emitting element is an organic light emitting diode. O1;

The gate electrode of T3 is electrically connected to the first node N1;

The gate electrode of T2 is electrically connected to the scanning terminal G1, the source electrode of T2 is electrically connected to the data line DA, and the drain electrode of T2 is electrically connected to the first node N1;

The gate electrode of T1 is electrically connected to the first control terminal R1, the source electrode of T1 is electrically connected to the first initial voltage terminal VI1, and the drain electrode of T1 is electrically connected to the first node N1; the first initial voltage terminal VI1 is configured to provide first initial voltage Vint1;

The gate electrode of T5 is electrically connected to the light emitting control terminal EM, the source electrode of T5 is electrically connected to the power supply voltage terminal ELVDD, and the drain electrode of T5 is electrically connected to the drain electrode of T3; the power supply voltage terminal ELVDD is configured to provide the power supply voltage Vdd;

The gate electrode of T6 is electrically connected to the second control terminal R2, the source electrode of T6 is electrically connected to the second initial voltage terminal V12, and the drain electrode of T6 is electrically connected to the third node N3; the second initial voltage terminal V12 is configured to provide the second initial voltage Vint2;

The first terminal of C1 is electrically connected to the first node N1, and the second terminal of C1 is electrically connected to the third node N3;

The second node N2 is electrically connected to the third node N3;

The source electrode of T3 is electrically connected to the anode of the organic light emitting diode O1;

The cathode of the organic light emitting diode O1 is electrically connected to the low voltage terminal ELVSS.

Figure 7C:
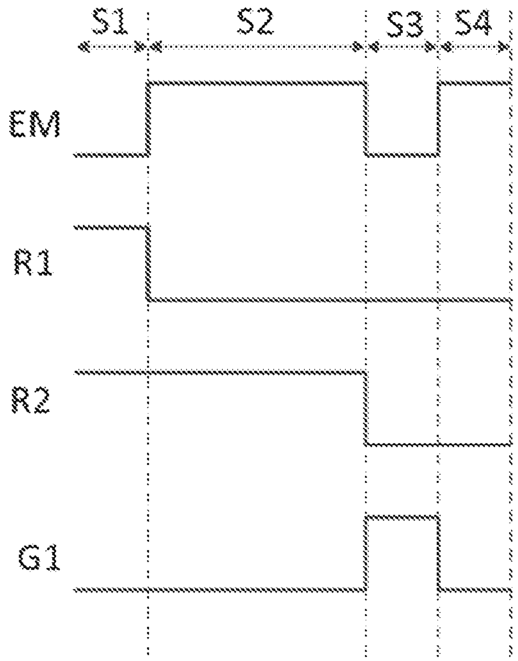
FIG. 7C is a working timing diagram of the pixel circuit shown in FIG. 7B.

FIG. 7C is a working timing diagram of the pixel circuit shown in FIG. 7B.

As shown in FIG. 7C, when at least one embodiment of the pixel circuit shown in FIG. 7B of the present disclosure is working, the display period may include an initialization phase S1, a threshold voltage compensation phase S2, a data writing-in phase S3 and a light emitting phase S4 that are set successively;

In the initialization phase S1, EM provides a low voltage signal, R1 provides a high voltage signal, R2 provides a high voltage signal, G1 provides a low voltage signal, T5 is turned off, T1 and T6 are both turned on, T2 is turned off, and the drain electrode of T3 is connected to ELVDD, the potential of N1 is Vint1, and the potential of N2 is Vint2 to initialize the potential of the gate electrode of T3 and the potential of the anode of O1;

In the threshold voltage compensation phase S2, EM provides a high voltage signal, R1 provides a low voltage signal, R2 provides a high voltage signal, T5 is turned on, and the drain electrode of T3 is connected to ELVDD;

At the beginning of the threshold voltage compensation phase S2, T3 is turned on, ELVDD charges C1 through T5 and T3 that are turned on, and the potential of N2 becomes Vint1−Vth, Vth is the threshold voltage of T3, and T3 is turned off;

In the data writing-in phase S3, EM provides a low voltage signal, both R1 and R2 provide low voltage signals, G1 provides a high voltage signal, and T2 is turned on to write the data voltage provided by DA to the first node N1, and the capacitance value of C1 is far less than the capacitance value of the parasitic capacitance between the cathode of the organic light emitting diode O1 and the second terminal of C1, the voltage change at the gate electrode of T3 does not affect the potential of the source electrode of T3, and the potential of N2 is maintained at Vint1−Vth;

In the light emitting phase S4, EM provides a high voltage signal, R1, R2 and G1 all provide low voltage signals. T5 is turned on, T3 drives O1 to emit light, the gate-source voltage of T3 remains at Vdata−Vint1+Vth, and the driving current flowing through T3 is related to Vdata−Vint1 and is not related to Vth.

Figure 8:
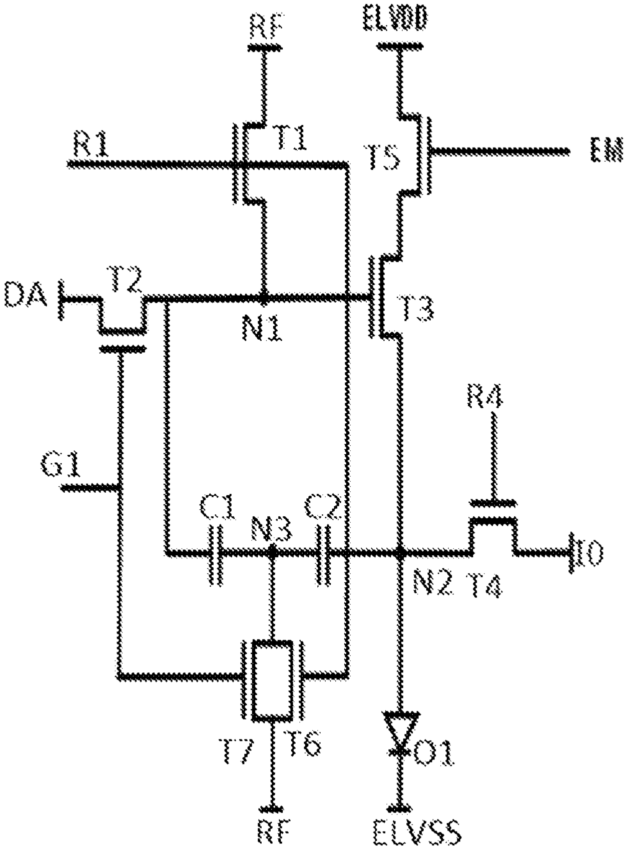
FIG. 8 is a circuit diagram of a pixel circuit according to at least one embodiment of the present disclosure.

In at least one embodiment of the present disclosure, based on at least one embodiment of the pixel circuit shown in FIGS. 1-7A, the pixel circuit may further include a second light emitting control circuit, and the second light emitting control circuit is connected between the second node and the light emitting element, under the control of the second light emitting control signal, the path from the second node to the light emitting element is turned on or off to prevent the light emitting element from lighting up in advance. As shown in FIG. 8, based on at least one embodiment of the pixel circuit shown in FIG. 6, The driving circuit includes a driving transistor T3, the first setting circuit includes a first transistor T1, the data writing-in circuit includes a second transistor T2, the fourth setting circuit includes a fourth transistor T4, and the light emitting circuit includes a fifth transistor T5, the second setting circuit includes a sixth transistor T6, and the third setting circuit includes a seventh transistor T7: the first energy storage circuit includes a first capacitor C1, the second energy storage circuit includes a second capacitor C2; the light emitting element is an organic light emitting diode O1;

The gate electrode of T3 is electrically connected to the first node N1;

The gate electrode of T2 is electrically connected to the scanning terminal G1, the source electrode of T2 is electrically connected to the data line DA, and the drain electrode of T2 is electrically connected to the first node N1;

The gate electrode of T1 is electrically connected to the first control terminal R1, the source electrode of T1 is electrically connected to the reference voltage terminal RF, and the drain electrode of T1 is electrically connected to the first node N1; the reference voltage terminal RF is configured to provide the reference voltage Vref;

The gate electrode of T4 is electrically connected to the fourth control terminal R4, the source electrode of T4 is electrically connected to the initial voltage terminal I0, and the drain electrode of T4 is electrically connected to the second node N2; the initial voltage terminal I0 is configured to provide the initial voltage Vint;

The gate electrode of T5 is electrically connected to the light emitting control terminal EM, the source electrode of T5 is electrically connected to the power supply voltage terminal ELVDD, and the drain electrode of T5 is electrically connected to the drain electrode of T3; the power supply voltage terminal ELVDD is configured to provide the power supply voltage Vdd;

The gate electrode of T6 is electrically connected to the first control terminal R1, the source electrode of T6 is electrically connected to the reference voltage terminal RF, and the drain electrode of T6 is electrically connected to the third node N3;

The gate electrode of T7 is electrically connected to the scanning terminal G1, the source electrode of T7 is electrically connected to the reference voltage terminal RF, and the drain electrode of T7 is electrically connected to the third node N3;

The first terminal of C1 is electrically connected to the first node N1, and the second terminal of C1 is electrically connected to the third node N3;

The first terminal of C2 is electrically connected to the third node N3, and the second terminal of C2 is electrically connected to the second node N2;

The source electrode of T3 is electrically connected to the anode of the organic light emitting diode O1;

The cathode of the organic light emitting diode O1 is electrically connected to the low voltage terminal ELVSS.

In at least one embodiment of the pixel circuit shown in FIG. 8, all transistors are n-type transistors, and the n-type transistors may be oxide transistors. The oxide material may be, for example, Indium Gallium Zinc Oxide (IGZO), but not limited to this.

In at least one embodiment of the pixel circuit shown in FIG. 8, the second control terminal and the first control terminal R1 are the same control terminal, the third control terminal is the scanning terminal G1, the first setting voltage terminal, the second setting voltage terminal and the third setting voltage terminal are the reference voltage terminal RF, and the fourth setting voltage terminal is the initial voltage terminal I0, but it is not limited to this.

When at least one embodiment of the pixel circuit shown in FIG. 8 of the present disclosure is working, the display period may include an initialization phase, a threshold voltage compensation phase, a data writing-in phase and a light emitting phase that are set successively;

In the initialization phase and threshold voltage compensation phase, R1 provides a high voltage signal, T1 and T6 are turned on, and the reference voltage Vref is configured to stabilize the voltage of N1; Vref-Vdd is less than the threshold voltage Vth of T3, Vref-Vint is greater than Vth, and Vref is configured to stabilize the potential of N3;

In the data writing-in phase, G1 provides a high voltage signal, T2 is turned on, T7 is turned on, and Vref is written to N3 to stabilize the potential of N3; N1 and N2 are separated from each other by N3, and the potential of N2 will not be affected by signal writing.

In actual operation, a stable voltage other than Vref can be configured to stabilize the potential of N3. For example, the power supply voltage provided by ELVDD, the low voltage provided by ELVSS, and the initial voltage Vint provided by I0 can be configured to stabilize the potential of N3.

Figure 9:
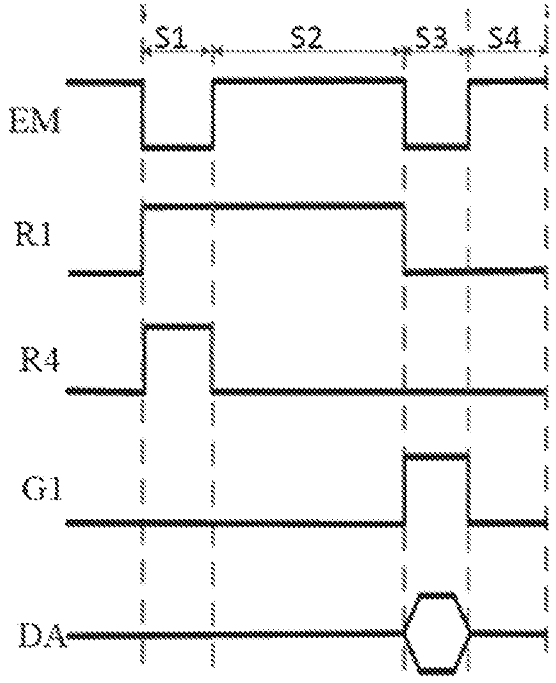
FIG. 9 is a working timing diagram of the pixel circuit shown in FIG. 8.

As shown in FIG. 9, when at least one embodiment of the pixel circuit shown in FIG. 8 of the present disclosure is working, the display period may include an initialization phase S1, a threshold voltage compensation phase S2, a data writing-in phase S3 and a light emitting phase S4 that are set successively;

In the initialization phase S1, EM provides a low voltage signal, R1 provides a high voltage signal, R4 provides a high voltage signal, G1 provides a low voltage signal, T1 and T6 are turned on, the potential of N1 is Vref, the potential of N3 is Vref, T4 is turned on, and the potential of N2 is Vint: by initializing the potential of each node, T3 can be turned on at the beginning of the threshold voltage compensation phase S2;

In the threshold voltage compensation phase S2, EM provides a high voltage signal, R1 provides a high voltage signal, R4 provides a low voltage signal, G1 provides a low voltage signal, T1 is turned on, the potential of N1 is Vref, T5 is turned on, T6 is turned on, and the potential of N3 is Vref;

At the beginning of the threshold voltage compensation phase S2, T3 is turned on, and ELVDD charges C1 and C2 through T5 and T3 that are turned on to change the potential of N2 until the potential of N2 becomes Vref-Vth and T3 is turned off;

In the data writing-in phase S3, EM provides a low voltage signal, R1 provides a low voltage signal, R4 provides a low voltage signal, G1 provides a high voltage signal, DA provides the data voltage Vdata, T2 is turned on, and DA provides the data voltage to the first node N1, T7 is turned on, the potential of N3 is Vref, and the potential of N2 is Vref-Vth; due to the existence of C1 and C2, data voltage writing will not affect the potential of N2;

In the light emitting phase S4, EM provides a high voltage signal, R1 provides a low voltage signal, R4 provides a low voltage signal, G1 provides a low voltage signal, T5 is turned on, and T3 drives O1 to emit light;

In the light emitting phase S4, the potential of the anode of O1 is Vel, the potential of N1 becomes Vdata−Vref+Vth+Vel, and the gate-source voltage of T3 is Vdata−Vref+Vth, so that the driving current Ids of T3 driving O1 is not related to Vth;

$Ids=K\times(Vdata-Vref)^2$; where K is the current coefficient of T3. From the formula of Ids, it can be seen that the driving current Ids of T3 is not related to the threshold voltage Vth of T3.

When at least one embodiment of the pixel circuit shown in FIG. 8 of the present disclosure is working, in the threshold voltage compensation phase, the potential of N2 is Vref-Vth, and the potential of N3 is Vref. In the data writing-in phase, due to the addition of C2 and T7, the potential of N3 controlled by T7 is to be maintained at Vref, so that data voltage writing-in will not affect the potential of N2, and threshold voltage compensation can be performed normally.

When the pixel circuit described in at least one embodiment of the present disclosure is working, the threshold voltage compensation phase and the data writing-in phase are separated, so that the time of the threshold voltage compensation phase can be increased and high-frequency refresh can be achieved.

Figure 10:
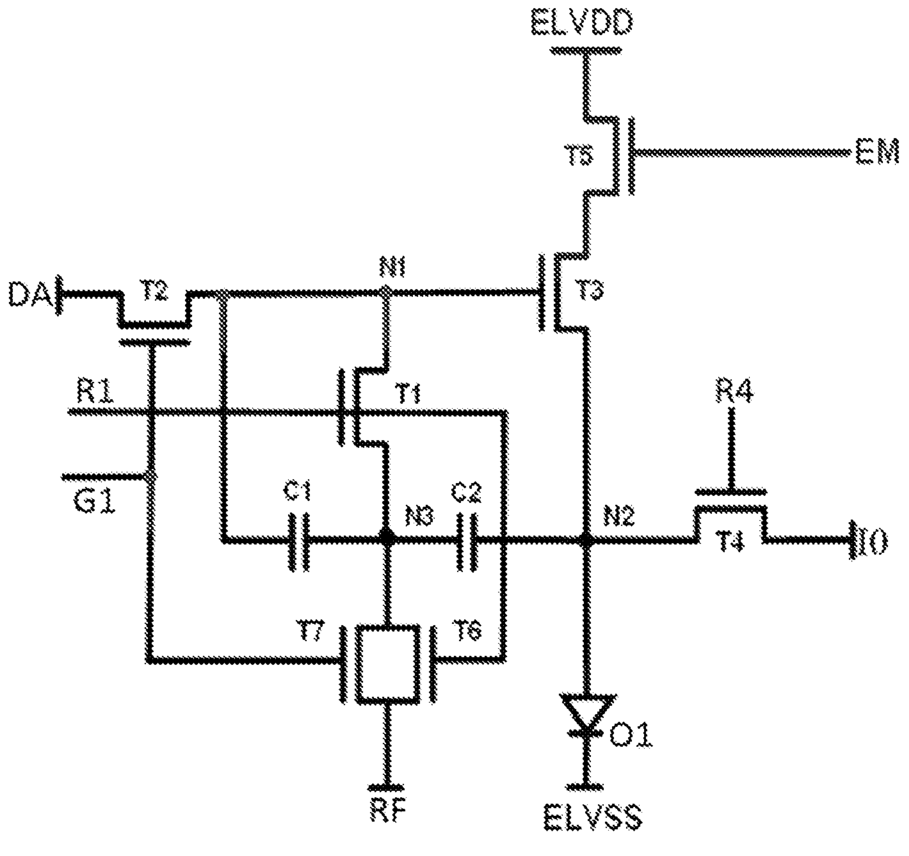
FIG. 10 is a circuit diagram of a pixel circuit according to at least one embodiment of the present disclosure.

The difference between at least one embodiment of the pixel circuit shown in FIG. 10 of the present disclosure and at least one embodiment of the pixel circuit shown in FIG. 8 of the present disclosure is that:

The source electrode of T1 is electrically connected to the third node N3.

As shown in FIG. 9, when at least one embodiment of the pixel circuit shown in FIG. 10 of the present disclosure is working, the display period may include an initialization phase S1, a threshold voltage compensation phase S2, a data writing-in phase S3 and a light emitting phase S4 that are set successively;

In the initialization phase S1, EM provides a low voltage signal, R1 provides a high voltage signal, R4 provides a high voltage signal, G1 provides a low voltage signal, T1 and T6 are turned on, the potential of N1 is Vref, the potential of N3 is Vref, T4 is turned on, and the potential of N2 is Vint: by initializing the potential of each node, T3 can be turned on at the beginning of the threshold voltage compensation phase S2;

In the threshold voltage compensation phase S2, EM provides a high voltage signal, R1 provides a high voltage signal, R4 provides a low voltage signal, G1 provides a low voltage signal, T1 is turned on, the potential of N1 is Vref, T5 is turned on, T6 is turned on, and the potential of N3 is Vref;

At the beginning of the threshold voltage compensation phase S2, T3 is turned on, and ELVDD charges C1 and C2 through T5 and T3 that are turned on to change the potential of N2 until the potential of N2 becomes Vref-Vth and T3 is turned off;

In the data writing-in phase S3, EM provides a low voltage signal, R1 provides a low voltage signal, R4 provides a low voltage signal, G1 provides a high voltage signal, DA provides the data voltage Vdata, T2 is turned on, and DA provides the data voltage to the first node N1, T7 is turned on, the potential of N3 is Vref, and the potential of N2 is Vref−Vth; due to the existence of C1 and C2, data voltage writing-in will not affect the potential of N2;

In the light emitting phase S4, EM provides a high-voltage signal, R1 provides a low-voltage signal, R4 provides a low-voltage signal, G1 provides a low-voltage signal, T5 is turned on, and T3 drives O1 to emit light;

In the light emitting phase S4, the potential of the anode of O1 is Vel, the potential of N1 becomes Vdata−Vref+Vth+Vel, and the gate-source voltage of T3 is Vdata−Vref+Vth, so that the driving current Ids of T3 driving O1 is not related to Vth;

Ids=K×(Vdata−Vref)$^2$; where K is the current coefficient of T3. According to the formula of Ids, Ids is not related to Vth.

Figure 11:
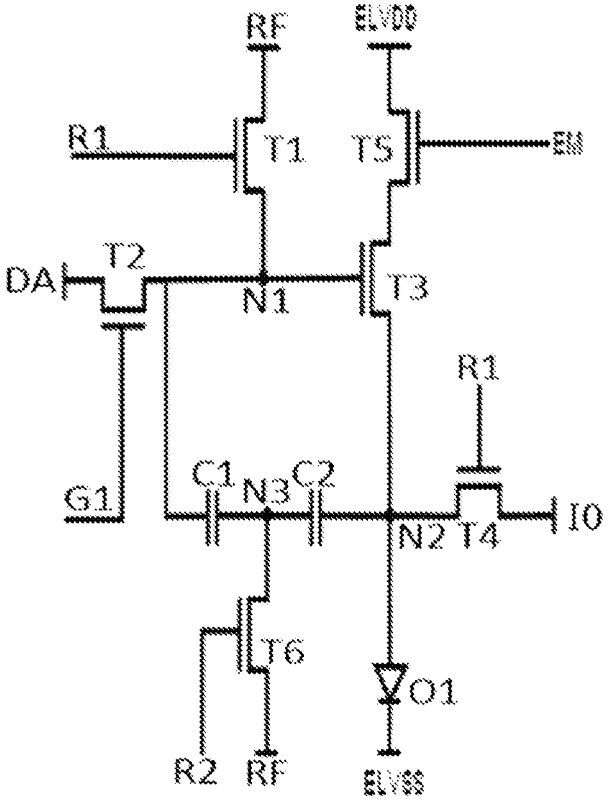
FIG. 11 is a circuit diagram of a pixel circuit according to at least one embodiment of the present disclosure.

The difference between at least one embodiment of the pixel circuit shown in FIG. 11 of the present disclosure and at least one embodiment of the pixel circuit shown in FIG. 8 of the present disclosure is that:

T7 is not provided;

The gate electrode of T6 is electrically connected to the second control terminal R2, and the gate electrode of T4 is electrically connected to the first control terminal R1.

In at least one embodiment of the pixel circuit shown in FIG. 11, the fourth control terminal and the first control terminal R1 are the same control terminal, the first setting voltage terminal is the reference voltage terminal RF, and the second setting voltage terminal is the reference voltage terminal RF, the fourth setting voltage terminal is the initial voltage terminal I0.

Figure 12:
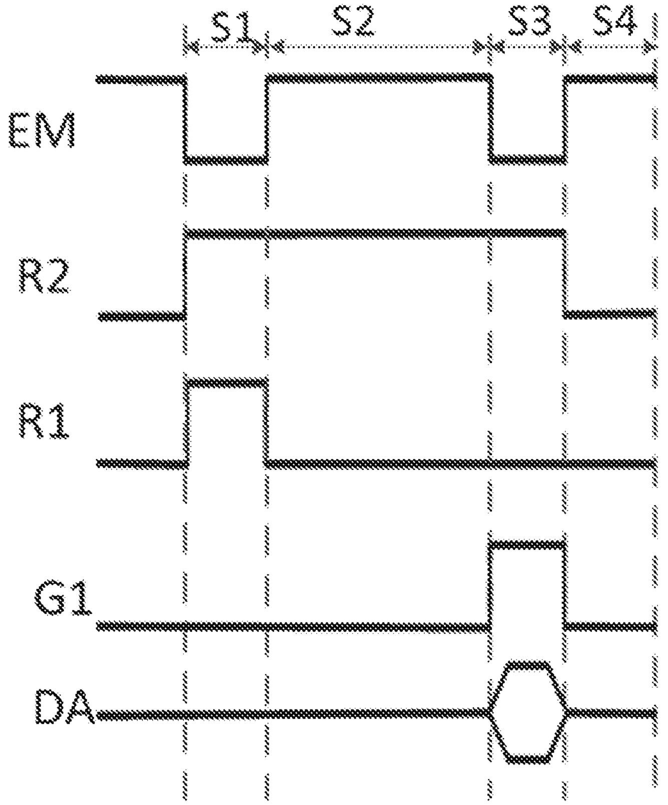
FIG. 12 is a working timing diagram of the pixel circuit shown in FIG. 11.

As shown in FIG. 12, when at least one embodiment of the pixel circuit shown in FIG. 11 of the present disclosure is working, the display period may include an initialization phase S1, a threshold voltage compensation phase S2, a data writing-in phase S3 and a light emitting phase S4 that are set successively;

In the initialization phase S1, EM provides a low voltage signal, R2 provides a high voltage signal, R1 provides a high voltage signal, G1 provides a low voltage signal, T6 is turned on, the potential of N3 is Vref, T1 is turned on, the potential of N1 is Vref; T4 is turned on, the potential of N2 is Vint; so that when the threshold voltage compensation phase S2 starts, T3 can be turned on;

In the threshold voltage compensation phase S2, EM provides a high voltage signal, R2 provides a high voltage signal, R1 provides a low voltage signal, G1 provides a low voltage signal, T5 is turned on, T6 is turned on, and the potential of N3 is Vref;

At the beginning of the threshold voltage compensation phase S2, ELVDD charges C2 through T5 and T3 that are turned on to increase the potential of N2 until T3 is turned off. At this time, the potential of N2 is Vref−Vth, and Vth is the threshold voltage of T3;

In the data writing-in phase S3, EM provides a low voltage signal, R2 provides a high voltage signal, R1 provides a low voltage signal, G1 provides a high voltage signal, T2 is turned on, DA provides the data voltage Vdata to the first node N1, T6 is turned on, and the potential of N3 is Vref; so that the data voltage writing-in will not affect the potential of N2, the potential of N2 is maintained at Vref−Vth;

In the light emitting phase S4, EM provides a high voltage signal, R2 provides a low voltage signal, R1 provides a low voltage signal, G1 provides a low voltage signal, T5 is turned on, T3 drives O1 to emit light, and the driving current Ids of T3 driving O1 is not related to Vth;

In the light emitting phase S4, the gate-source voltage of T3 is Vdata Vref+Vth, Ids=K(Vdata−Vref)$^2$; Ids is not related to Vth.

Figure 13:
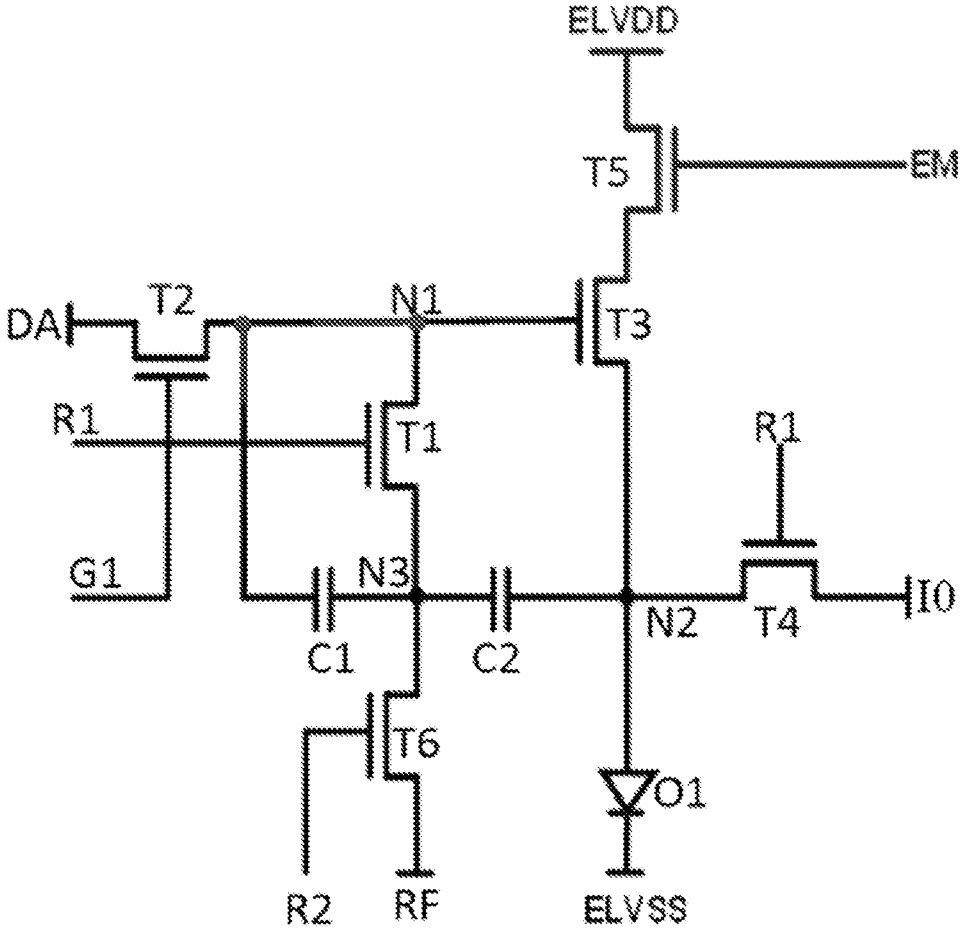
FIG. 13 is a circuit diagram of a pixel circuit according to at least one embodiment of the present disclosure.

The difference between at least one embodiment of the pixel circuit shown in FIG. 13 of the present disclosure and at least one embodiment of the pixel circuit shown in FIG. 11 of the present disclosure is that the source electrode of T1 is electrically connected to the third node N3.

In at least one embodiment of the pixel circuit shown in FIG. 13, the fourth control terminal and the first control terminal R1 are the same control terminal, the first setting voltage terminal is electrically connected to the third node N3, the second setting voltage terminal is the reference voltage terminal RF, and the fourth setting voltage terminal is the initial voltage terminal I0.

As shown in FIG. 12, when at least one embodiment of the pixel circuit shown in FIG. 13 is working, the display period may include an initialization phase S1, a threshold voltage compensation phase S2, a data writing-in phase S3, and a light emitting phase S4 set sequentially;

In the initialization phase S1, EM provides a low voltage signal, R2 provides a high voltage signal, R1 provides a high voltage signal, G1 provides a low voltage signal, T6 is turned on, the potential of N3 is Vref, T1 is turned on, and the potential of N1 is Vref; T4 is turned on, and the potential of N2 is Vint: so that T3 is turned on when the threshold voltage compensation phase S2 begins;

In the threshold voltage compensation phase S2, EM provides a high voltage signal, R2 provides a high voltage signal, R1 provides a low voltage signal, G1 provides a low voltage signal, T5 is turned on, and the potential of N3 is Vref;

At the beginning of the threshold voltage compensation phase S2, ELVDD charges C2 through T5 and T3 that are turned on to increase the potential of N2 until T3 is turned off. At this time, the potential of N2 is Vref−Vth, and Vth is the threshold voltage of T3;

In the data writing-in phase S3, EM provides a low voltage signal, R2 provides a high voltage signal, R1 provides a low voltage signal, G1 provides a high voltage signal, T2 is turned on, DA provides data voltage Vdata to the first node N1, T6 is turned on, and the potential of N3 is Vref; so that the writing of data voltage does not affect the potential of N2, and the potential of N2 is maintained at Vref−Vth;

In the light emitting phase S4, EM provides a high voltage signal, R2 provides a low voltage signal, R1 provides a low voltage signal, G1 provides a low voltage signal, T5 is turned on, T3 drives O1 to emit light, and the driving current of T3 driving O1 is not related to Vth;

In the light emitting phase S4, the gate-source voltage of T3 is Vdata Vref+Vth, Ids=K(Vdata−Vref)$^2$; Ids is not related to Vth.

Figure 14:
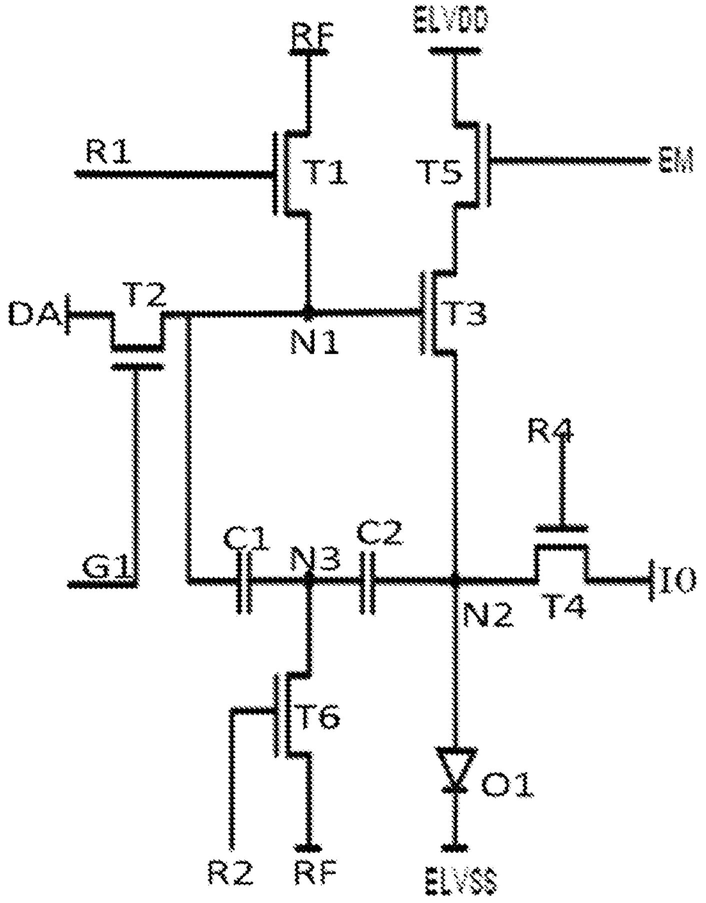
FIG. 14 is a circuit diagram of a pixel circuit according to at least one embodiment of the present disclosure.

The difference between at least one embodiment of the pixel circuit shown in FIG. 14 of the present disclosure and at least one embodiment of the pixel circuit shown in FIG. 11 of the present disclosure is that:

The gate electrode of T4 is electrically connected to the fourth control terminal R4.

In at least one embodiment of the pixel circuit shown in FIG. 14 of the present disclosure, the first setting voltage terminal is the reference voltage terminal RF, the second setting voltage terminal is the reference voltage terminal RF, and the fourth setting voltage terminal is the initial voltage terminal I0.

Figure 15:
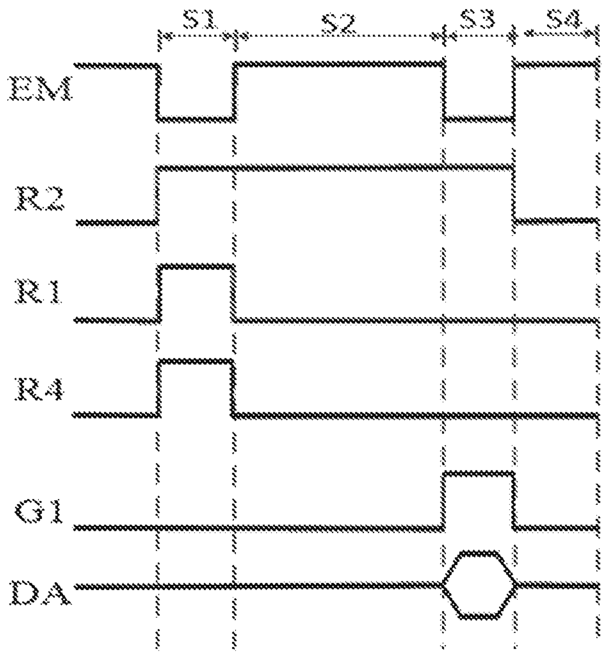
FIG. 15 is a working timing diagram of the pixel circuit shown in FIG. 14.

As shown in FIG. 15, when at least one embodiment of the pixel circuit shown in FIG. 14 of the present disclosure is working, the display period may include an initialization phase S1, a threshold voltage compensation phase S2, a data writing-in phase S3 and a light emitting phase S4 that are set successively;

In the initialization phase S1, EM provides a low voltage signal, R2 provides a high voltage signal, R1 provides a high voltage signal, R4 provides a high voltage signal, G1 provides a low voltage signal, T5 is turned on, T6 is turned on, T1 is turned on, T4 is turned on, and the potential of N1 is Vref, the potential of N3 is Vref, and the potential of N2 is Vint, so that when the threshold voltage compensation phase S2 starts, T3 can be turned on;

In the threshold voltage compensation phase S2, EM provides a high voltage signal, R2 provides a high voltage signal, R1 provides a low voltage signal, R4 provides a low voltage signal, G1 provides a low voltage signal, and T5 is turned on; the potential of N3 is Vref;

At the beginning of the threshold voltage compensation phase S2, T3 is turned on, and ELVDD charges C2 through T5 and T3 that are turned on to increase the potential of N2 until the potential of N2 becomes Vref−Vth, and Vth is the threshold voltage of T3;

In the data writing-in phase S3, EM provides a low voltage signal, R2 provides a high voltage signal, R1 provides a low voltage signal, R4 provides a low voltage signal, G1 provides a high voltage signal, T6 is turned on, the potential of N3 is Vref, T2 is turned on, and DA provides the data voltage Vdata to the first node N1; since the potential of N3 remains unchanged, the potential of N2 is maintained at Vref-Vth, and the potential of N2 is not affected by the writing-in of the data voltage:

In the light emitting phase S4, EM provides a high-voltage signal, R2 provides a low-voltage signal, R1 provides a low-voltage signal, R4 provides a low-voltage signal, G1 provides a low-voltage signal, T5 is turned on, T3 drives O1 to emit light, and the driving current of T3 driving O1 is not related to Vth;

In the light emitting phase S4, the gate-source voltage of T3 is Vdata-Vref+Vth, $Ids=K(Vdata-Vref)^2$; Ids is not related to Vth.

Figure 16:
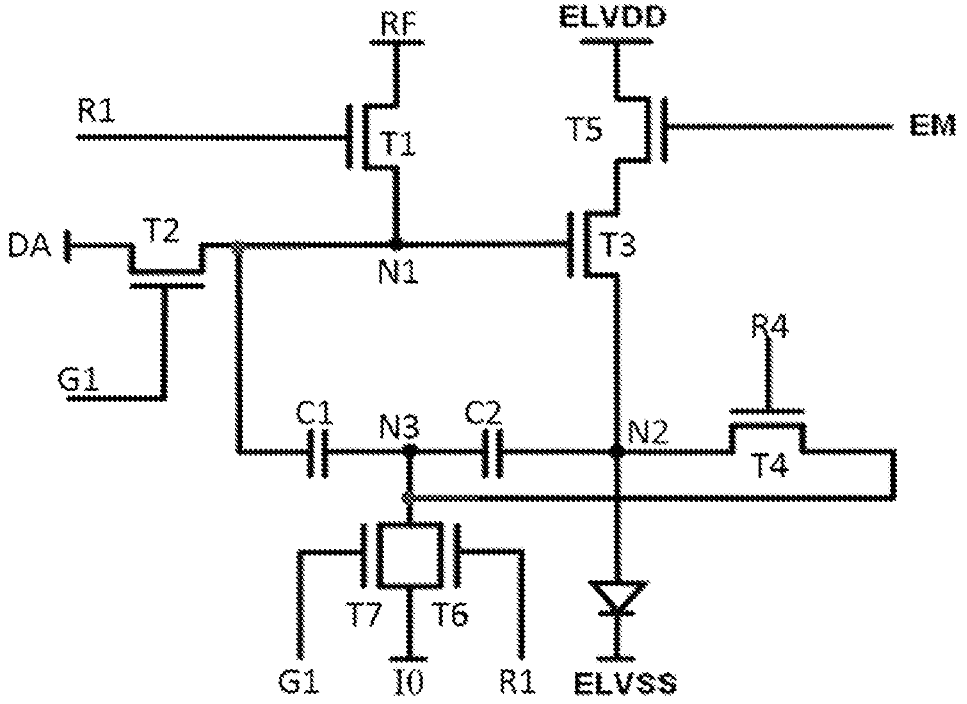
FIG. 16 is a circuit diagram of a pixel circuit according to at least one embodiment of the present disclosure.

The difference between at least one embodiment of the pixel circuit shown in FIG. 16 of the present disclosure and at least one embodiment of the pixel circuit shown in FIG. 8 of the present disclosure is that:

- The source electrode of T4 is electrically connected to the third node N3;
- The source electrode of T6 and the source electrode of T7 are both electrically connected to the initial voltage terminal I0;
- The initial voltage terminal I0 is configured to provide an initial voltage Vint.

In at least one embodiment of the pixel circuit shown in FIG. 16 of the present disclosure, the third control terminal is the scanning terminal G1, the first setting voltage terminal is the reference voltage terminal RF, the second setting voltage terminal and the third setting voltage terminal are both initial voltage terminals I0, and the fourth setting voltage terminal is electrically connected to the third node N3.

Figure 17:
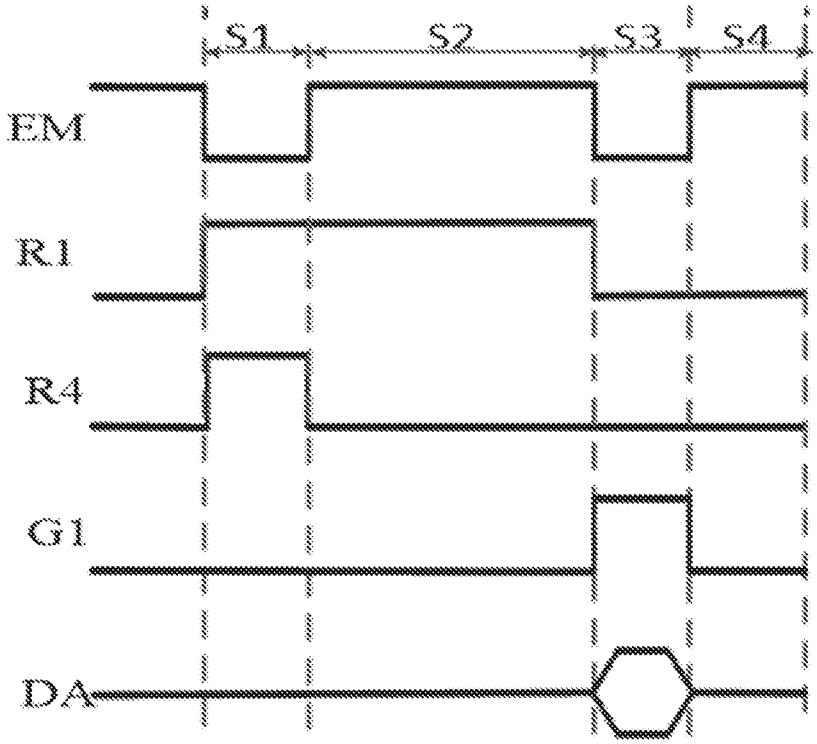
FIG. 17 is a working timing diagram of the pixel circuit shown in FIG. 16.

As shown in FIG. 17, when at least one embodiment of the pixel circuit shown in FIG. 16 of the present disclosure is working, the display period may include an initialization phase S1, a threshold voltage compensation phase S2, a data writing-in phase S3 and a light emitting phase S4 that are set successively;

In the initialization phase S1, EM provides a low voltage signal, R1 provides a high voltage signal, R4 provides a high voltage signal, G1 provides a low voltage signal, T1 and T6 are turned on, the potential of N1 is Vref, the potential of N3 is Vint, T4 is turned on, and the potential of N2 is Vint: by setting the potential of N1 and the potential of N2, T3 can be turned on at the beginning of the threshold voltage compensation phase S2;

In the threshold voltage compensation phase S2, EM provides a high voltage signal, R1 provides a high voltage signal, R4 provides a low voltage signal, G1 provides a low voltage signal, T5 is turned on: T6 is turned on, and the potential of N3 is Vint;

At the beginning of the threshold voltage compensation phase S2, T3 is turned on, and ELVDD charges C2 through T5 and T3 that are turned on until T3 is turned off, at which time the potential of N2 is Vref−Vth;

In the data writing-in phase S3, EM provides a low voltage signal, R1 provides a low voltage signal, R4 provides a low voltage signal, G1 provides a high voltage signal, T2 is turned on, DA provides the data voltage Vdata to the first node N1, T7 is turned on, and the potential of N3 is Vint: data writing will not affect the potential of N2, and the potential of N2 is maintained at Vref−Vth;

In the light emitting phase S4, EM provides a high-voltage signal, R1 provides a low-voltage signal, R4 provides a low-voltage signal, G1 provides a low-voltage signal, T5 is turned on, T3 drives O1 to emit light, and the driving current of T3 driving O1 is not related to Vth;

In the light emitting phase S4, the gate-source voltage of T3 is Vdata-Vref+Vth, $Ids=K(Vdata-Vref)^2$; Ids is not related to Vth.

Optionally, the pixel circuit also includes a first control circuit;

The first terminal of the first energy storage circuit is electrically connected to the first node through a first control circuit;

The first terminal of the first energy storage circuit is directly electrically connected to the fourth node;

The first control circuit is electrically connected to a fifth control terminal, and is configured to control to connect the first node and the fourth node under the control of a fifth control signal provided by the fifth control terminal.

Figure 18:
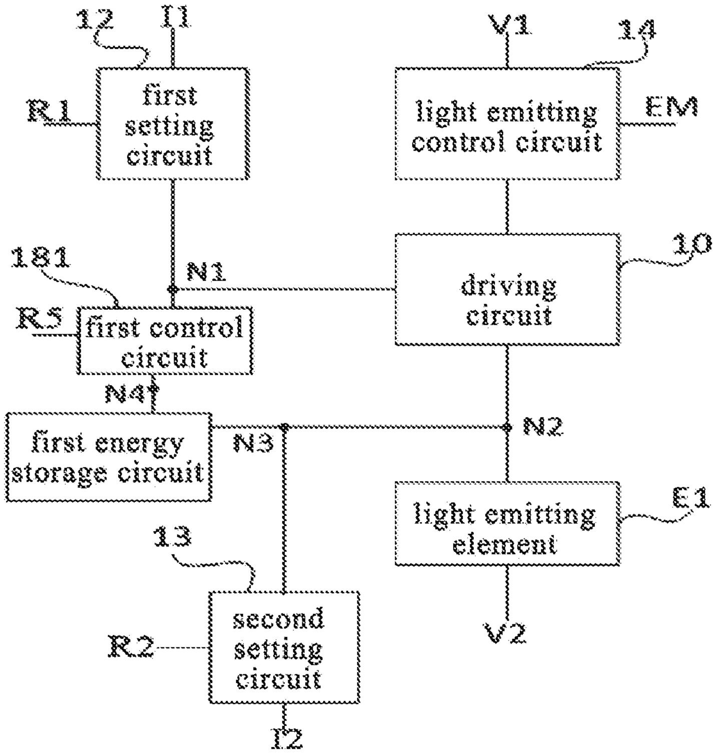
FIG. 18 is a structural diagram of a pixel circuit according to at least one embodiment of the present disclosure.

As shown in FIG. 18, based on at least one embodiment of the pixel circuit shown in FIG. 1, the pixel circuit described in at least one embodiment of the present disclosure also includes a first control circuit 181;

The first terminal of the first energy storage circuit 11 is electrically connected to the first node N1 through the first control circuit 181;

The first terminal of the first energy storage circuit 11 is directly electrically connected to the fourth node N4;

The first control circuit 181 is electrically connected to the fifth control terminal R5, and is configured to control to connect the first node N1 and the fourth node N4 under the control of the fifth control signal provided by the fifth control terminal R5.

In at least one embodiment of the present disclosure, adding a first control circuit can better isolate the first node and the second node, and the first control circuit is turned off when necessary to prevent interference between the two nodes.

When the pixel circuit described in the embodiment of the present disclosure is working, after using the source follower threshold voltage compensation, when one terminal of the first energy storage circuit 11 (the first energy storage circuit 11 may include a capacitor) is configured to float, the voltage difference between the two terminals of the energy storage circuit 11 remains unchanged, the threshold voltage compensation is realized.

The pixel circuit according to at least one embodiment of the present disclosure further includes a data writing-in circuit;

The data writing-in circuit is electrically connected to the scanning terminal, the data line and the fourth node respectively, and is configured to write the data voltage provided by the data line into the fourth node under the control of the scanning signal provided by the scanning terminal.

Figure 19:
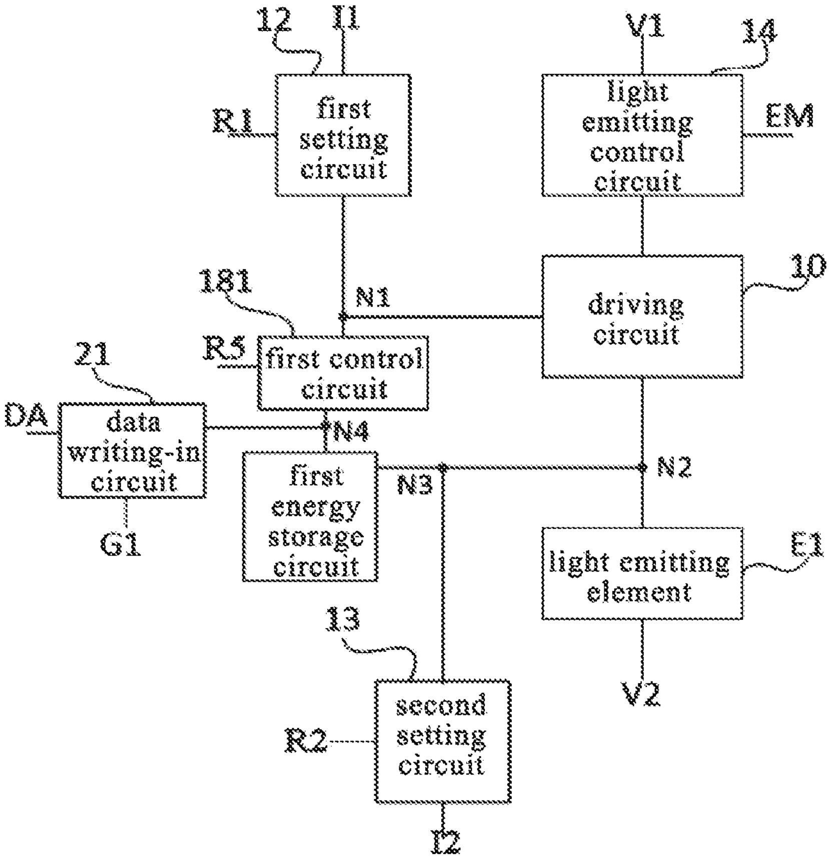
FIG. 19 is a structural diagram of a pixel circuit according to at least one embodiment of the present disclosure.

As shown in FIG. 19, based on at least one embodiment of the pixel circuit shown in FIG. 18, the pixel circuit described in at least one embodiment of the present disclosure may also include a data writing-in circuit 21;

The data writing-in circuit 21 is electrically connected to the scanning terminal G1, the data line DA and the fourth node N4 respectively, and is configured to write the data voltage Vdata provided by the data line DA into the fourth node N4 under the control of the scanning signal provided by the scanning terminal G1.

Optionally, the second setting voltage terminal may be electrically connected to the first node.

Optionally, the first setting voltage terminal may be electrically connected to the third node.

In at least one embodiment of the present disclosure, the first setting voltage terminal and the first voltage terminal may be the same voltage terminal to reduce the number of voltage terminals.

The pixel circuit according to at least one embodiment of the present disclosure further includes a second control circuit;

The second control circuit is electrically connected to the light emitting control terminal, the second terminal of the driving circuit and the first electrode of the light emitting element respectively, and is configured to control to connect the second terminal of the driving circuit and the first electrode of the light emitting element under the control of the light emitting control signal.

In specific implementation, the pixel circuit may further include a second control circuit for light emitting control; the second control circuit controls to connect the second terminal of the driving circuit and the first electrode of the light emitting element under the control of the light emitting control signal.

Figure 20:
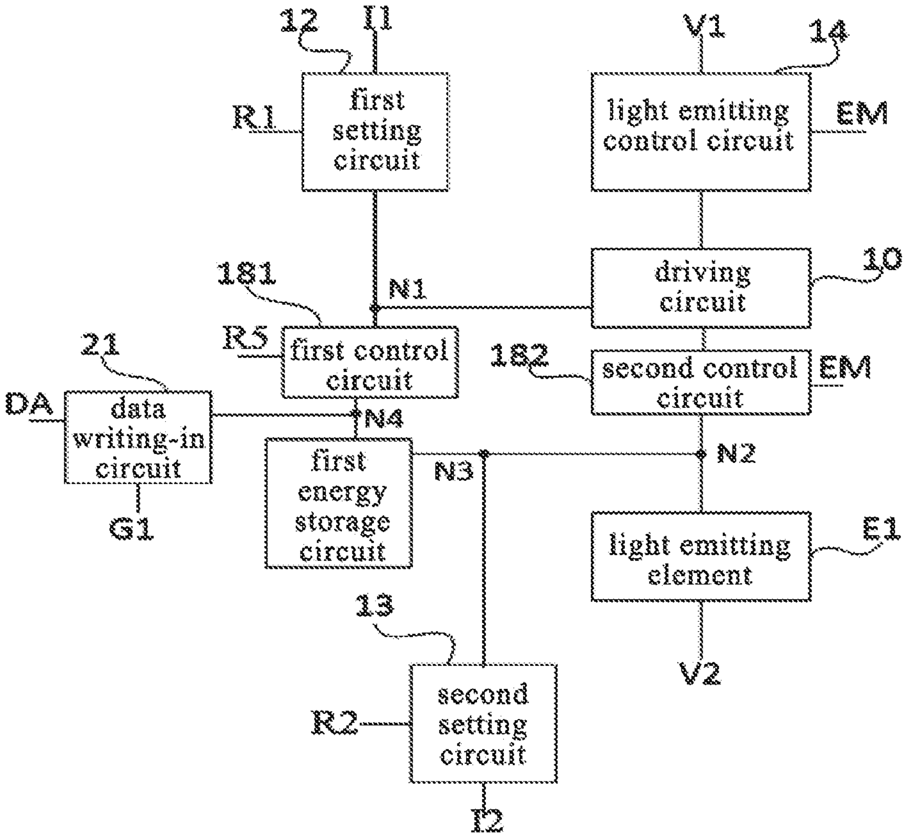
FIG. 20 is a structural diagram of a pixel circuit according to at least one embodiment of the present disclosure.

As shown in FIG. 20, based on at least one embodiment of the pixel circuit shown in FIG. 19, the pixel circuit described in at least one embodiment of the present disclosure also includes a second control circuit 182;

The second control circuit 182 is electrically connected to the light emitting control terminal EM, the second terminal of the driving circuit 10 and the first electrode of the light emitting element E1 respectively, and is configured to control to connect the second terminal of the driving circuit 10 and the first electrode of the light emitting element E1 under the control of the light emitting control signal.

The pixel circuit according to at least one embodiment of the present disclosure further includes a fourth setting circuit;

The fourth setting circuit is electrically connected to the fourth control terminal, the fourth setting voltage terminal and the second node respectively, and is configured to write the fourth setting voltage provided by the fourth setting voltage terminal into the second node under the control of the fourth control signal provided by the fourth control terminal;

The second setting voltage terminal and the fourth setting voltage terminal are the same voltage terminal.

In specific implementation, the pixel circuit may further include a fourth setting circuit, and the fourth setting circuit writes the fourth setting voltage into the second node under the control of the fourth control signal.

Figure 21:
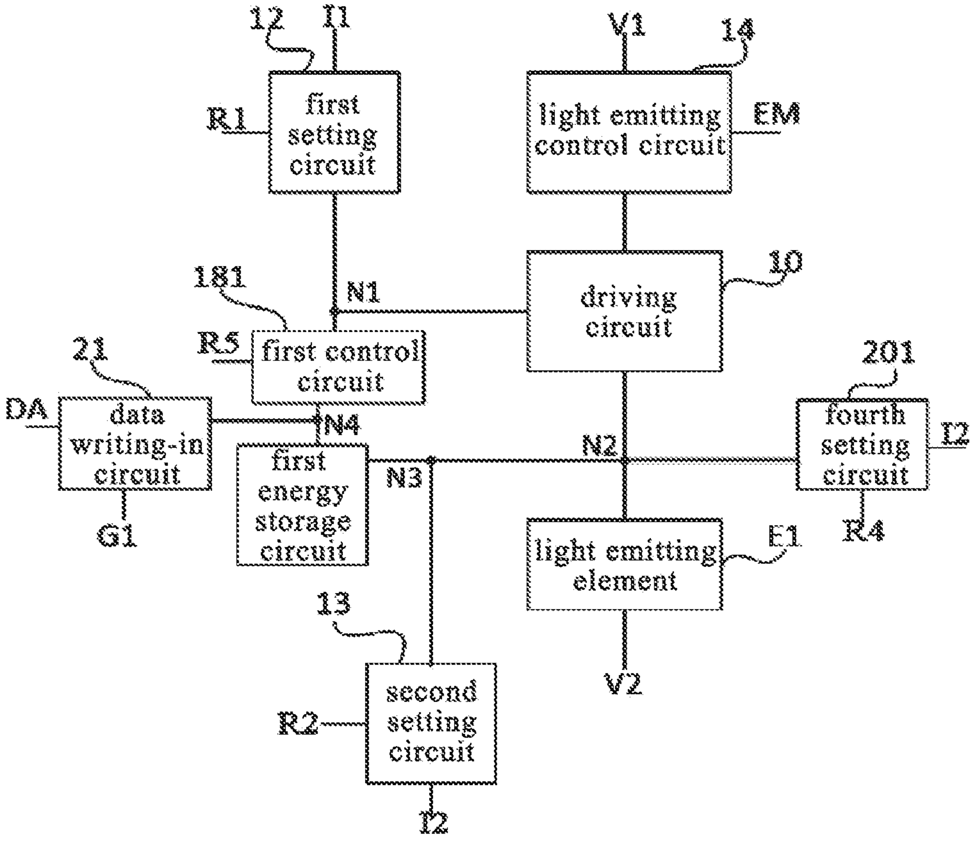
FIG. 21 is a structural diagram of a pixel circuit according to at least one embodiment of the present disclosure.

As shown in FIG. 21, based on at least one embodiment of the pixel circuit shown in FIG. 19, the pixel circuit described in at least one embodiment of the present disclosure also includes a fourth setting circuit 201;

The fourth setting circuit 201 is electrically connected to the fourth control terminal R4, the second setting voltage terminal I2 and the second node N2 respectively, and is configured to write the second setting voltage provided by the second setting voltage terminal I2 into the second node N2 under the control of the fourth control signal provided by the fourth control terminal R4.

In at least one embodiment of the present disclosure, the second voltage terminal and the fourth setting voltage terminal may be the same voltage terminal to reduce the number of voltage terminals.

In at least one embodiment of the present disclosure, the pixel circuit further includes a fourth setting circuit;

The fourth setting circuit is electrically connected to the fourth control terminal, the fourth setting voltage terminal and the second node respectively, and is configured to write the fourth setting voltage provided by the fourth setting voltage terminal into the second node under the control of the fourth control signal provided by the fourth control terminal;

The fourth control terminal and the scanning terminal are the same control terminal.

Figure 22:
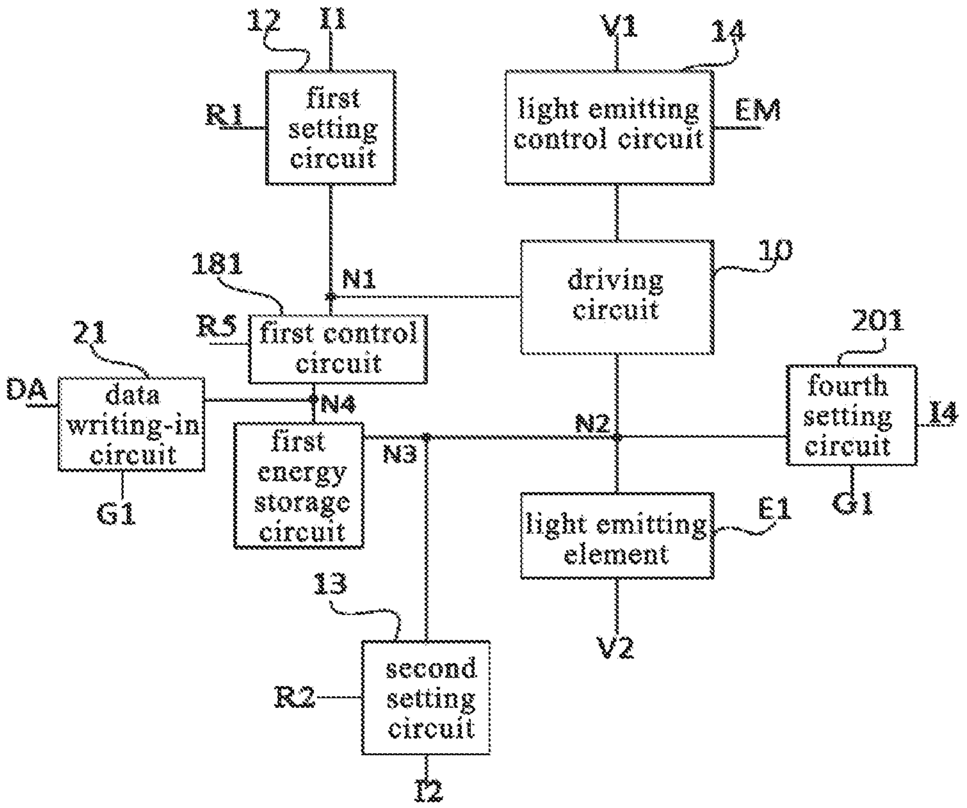
FIG. 22 is a structural diagram of a pixel circuit according to at least one embodiment of the present disclosure.

As shown in FIG. 22, based on at least one embodiment of the pixel circuit shown in FIG. 19, the pixel circuit described in at least one embodiment of the present disclosure also includes a fourth setting circuit 201;

The fourth setting circuit 201 is electrically connected to the scanning terminal G1, the fourth setting voltage terminal I4 and the second node N2 respectively, and is configured to write the fourth setting voltage provided by the fourth setting voltage terminal I4 into the second node N2 under the control of the scanning signal provided by the scanning terminal G1.

In at least one embodiment of the present disclosure, the third node may be electrically connected to the fourth setting voltage terminal.

Figure 23:
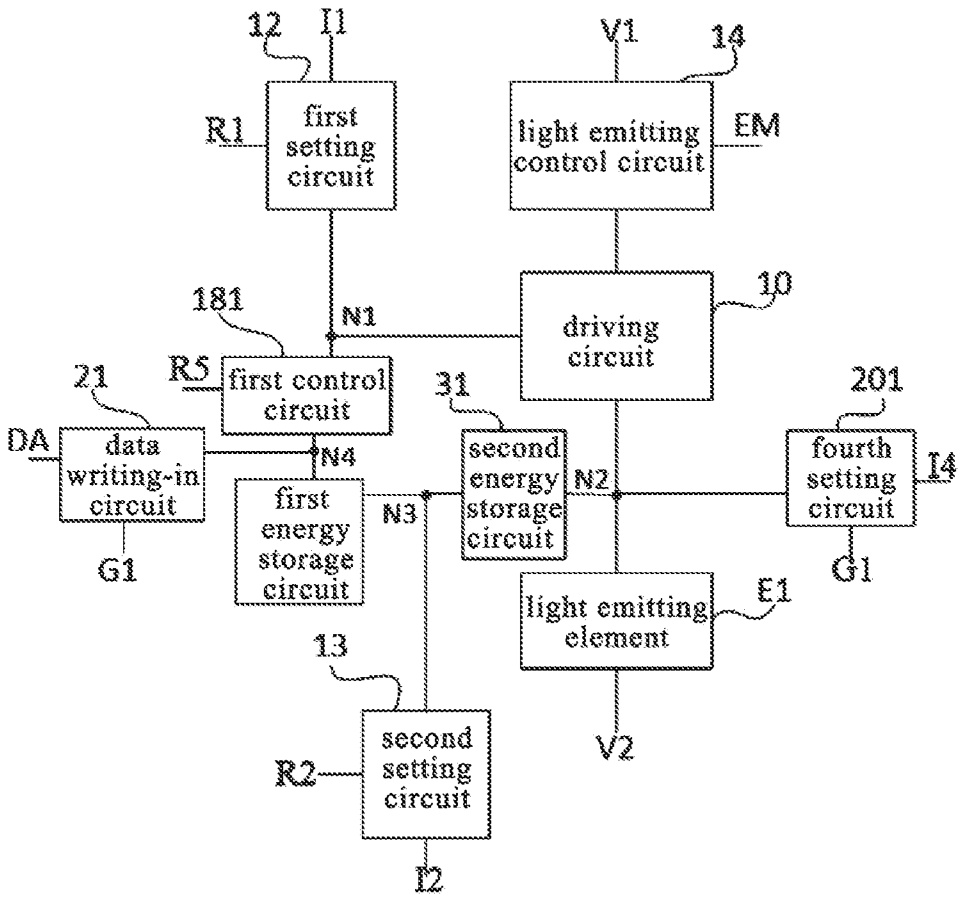
FIG. 23 is a structural diagram of a pixel circuit according to at least one embodiment of the present disclosure.

As shown in FIG. 23, based on at least one embodiment of the pixel circuit shown in FIG. 22, the pixel circuit described in at least one embodiment of the present disclosure also includes a second energy storage circuit 31;

The first terminal of the second energy storage circuit 31 is electrically connected to the third node N3, and the second terminal of the second energy storage circuit 31 is electrically connected to the second node N2;

The second energy storage circuit 31 is configured to store electrical energy.

In at least one embodiment of the present disclosure, adding a second energy storage circuit can better isolate the first node and the second node and prevent interference between the two nodes: in addition, when the second setting circuit is turned off, the second energy storage circuit and the first energy storage circuit may form the storage circuit with stronger storage capacity.

Figure 24:
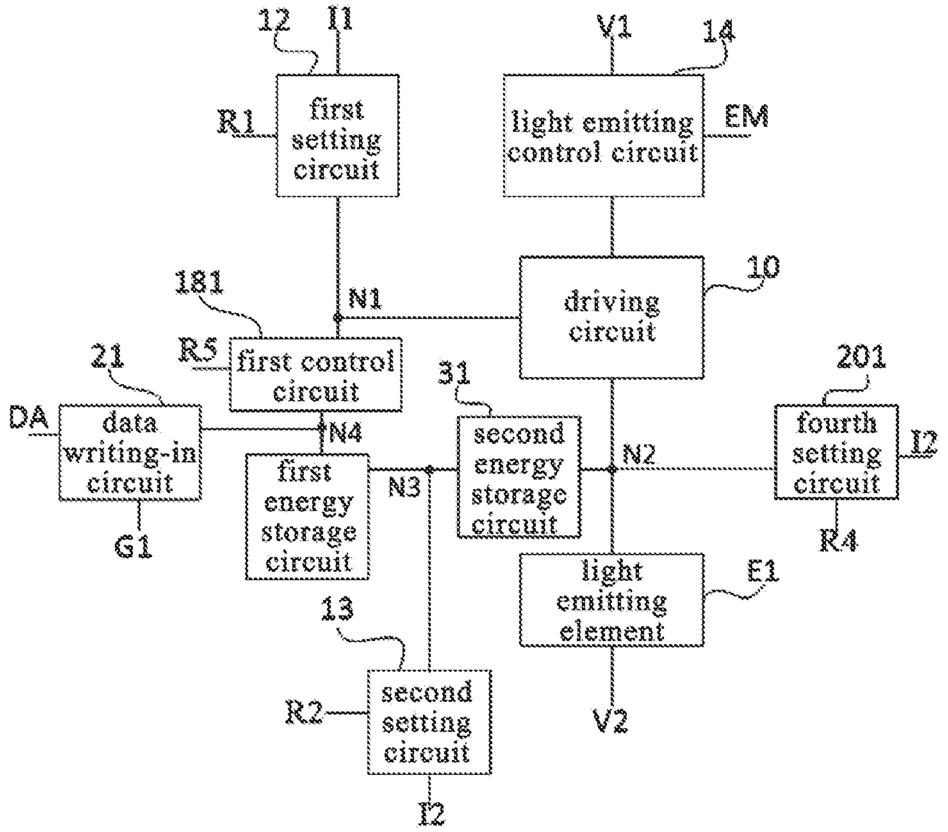
FIG. 24 is a structural diagram of a pixel circuit according to at least one embodiment of the present disclosure.

As shown in FIG. 24, based on at least one embodiment of the pixel circuit shown in FIG. 21, the pixel circuit described in at least one embodiment of the present disclosure also includes a second energy storage circuit 31;

The first terminal of the second energy storage circuit 31 is electrically connected to the third node N3, and the second terminal of the second energy storage circuit 31 is electrically connected to the second node N2;

The second energy storage circuit 31 is configured to store electrical energy.

In at least one embodiment of the present disclosure, based on at least one embodiment of the pixel circuit shown in FIGS. 18 to 24, the pixel circuit may further include a second light emitting control circuit, and the second light emitting control circuit is connected between the second node and the light emitting element, in response to the second light emitting control signal, the path between the second node and the light emitting element is turned on or off to prevent the light emitting element from lighting up in advance.

Figure 25:
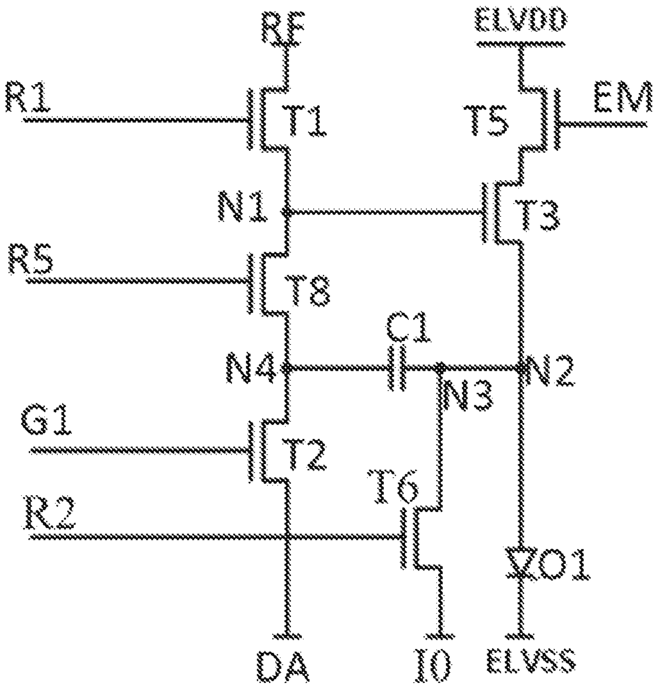
FIG. 25 is a circuit diagram of a pixel circuit according to at least one embodiment of the present disclosure.

As shown in FIG. 25, based on at least one embodiment of the pixel circuit shown in FIG. 19, The driving circuit includes a driving transistor T3, the first setting circuit includes a first transistor T1, the data writing-in circuit includes a second transistor T2, the light emitting control circuit includes a fifth transistor T5, and the second setting circuit includes a sixth transistor T6, the first energy storage circuit includes a first capacitor C1, and the light emitting element is an organic light emitting diode O1; the first control circuit includes an eighth transistor T8;

The gate electrode of T3 is electrically connected to the first node N1;

The gate electrode of T1 is electrically connected to the first control terminal R1, the source electrode of T1 is electrically connected to the reference voltage terminal RF, and the drain electrode of T1 is electrically connected to the first node N1; the reference voltage terminal RF is configured to provide the reference voltage Vref;

The gate electrode of T2 is electrically connected to the scan terminal G1, the source electrode of T2 is electrically connected to the data line DA, and the drain electrode of T2 is electrically connected to the fourth node N4;

The gate electrode of T5 is electrically connected to the light emitting control terminal EM, the source electrode of T5 is electrically connected to the power supply voltage terminal ELVDD, and the drain electrode of T5 is electrically connected to the drain electrode of T3; the power supply voltage terminal ELVDD is configured to provide the power supply voltage Vdd;

The gate electrode of T6 is electrically connected to the second control terminal R2, the source electrode of T6 is electrically connected to the initial voltage terminal I0, and the drain electrode of T6 is electrically connected to the third node N3; the initial voltage terminal I0 is configured to provide the initial voltage Vint;

The first terminal of C1 is electrically connected to the fourth node N4, and the second terminal of C1 is electrically connected to the third node N3; the anode of O1 is electrically connected to the second node N2, and the second node N2 and the third node N3 are electrically connected;

The source electrode of T3 is electrically connected to the anode of the organic light emitting diode O1;

The cathode of the organic light emitting diode O1 is electrically connected to the low voltage terminal ELVSS;

The gate electrode of T8 is electrically connected to the fifth control terminal R5, the source electrode of T8 is electrically connected to the first node N1, and the drain electrode of T8 is electrically connected to the fourth node N4.

At least one implementation of the pixel circuit shown in FIG. 25, each transistor is an n-type transistor, but is not limited to this.

In at least one embodiment of the pixel circuit shown in FIG. 25, the second control terminal is the scanning terminal G1, the first setting voltage terminal is the reference voltage terminal RF, and the second setting voltage terminal is the initial voltage terminal I0.

At least one embodiment of the pixel circuit shown in FIG. 25 of the present disclosure is provide with the fifth transistor T5. The potential of the light emitting control signal provided by EM is at a low level during the period when the potential of the first control signal provided by R1 is a high voltage. That is to say, the light emitting control signal provided by EM and the first control signal provided by R1 are inverted in phase, during the initialization phase of the anode potential of O1, it prevents the formation of a current path between T3 and T6. At the same time, Vint can also be used for better resetting the potential of the anode of O1.

Figure 26:
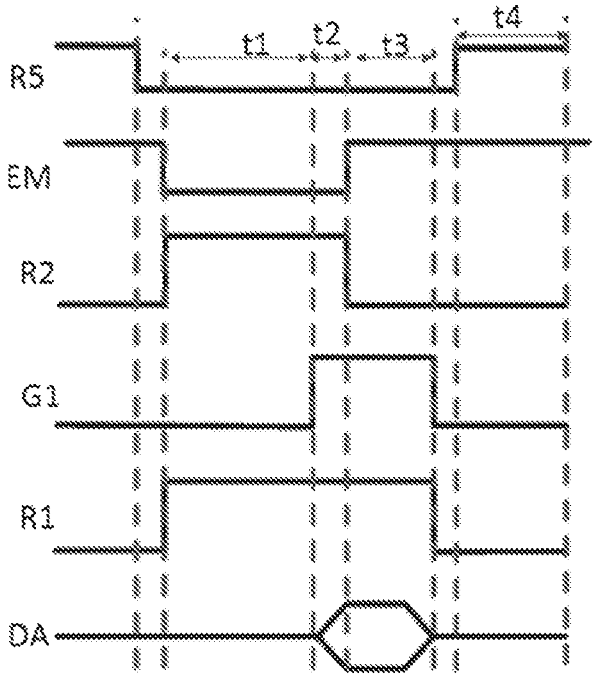
FIG. 26 is a working timing diagram of the pixel circuit shown in FIG. 25.

As shown in FIG. 26, when at least one embodiment of the pixel circuit shown in FIG. 25 of the present disclosure is working, The display period includes the first phase t1, the second phase t2, the third phase t3 and the fourth phase t4 which are set successively;

In the first phase t1, R5 provides a low voltage signal, EM provides a low voltage signal, R2 provides a high voltage signal, G1 provides a low voltage signal, R1 provides a high voltage signal, T8 and T5 are turned off, T1 is turned on, and T6 is turned on to write the reference voltage Vref provided by RF into the gate electrode of T3, the initial voltage Vint provided by I0 is written into the source electrode of T3, and the gate potential of T3, the potential of the anode of O1 and the potential of the source electrode of T3 are reset;

In the second phase t2, R5 provides a low voltage signal, EM provides a low voltage signal, R2 provides a high voltage signal, G1 provides a high voltage signal, R1 provides a high voltage signal, T6, T8 and T5 are turned off, T2 and T1 are both turned on, the data voltage Vdata provided by the data line DA is written into the fourth node N4, the reference voltage Vref provided by the reference voltage terminal RF is written into the first node N1, and the initial voltage Vin provided by the initial voltage terminal I0 is written into the source electrode of T3;

In the third phase t3, R5 provides a low voltage signal, EM provides a high voltage signal, R2 provides a low voltage signal, G1 provides a high voltage signal, R1 provides a high voltage signal, and DA provides the data voltage Vdata. At this time, T6 is turned off and T1 is turned on, T2 is turned on, the potential of the gate electrode of T3 is Vref; T5 is turned on, the drain electrode of T3 is electrically connected to ELVDD;

At the beginning of the third phase t3, T3 is turned on to charge C1 and increase the potential of the source electrode of T3 until the potential of the source electrode of T3 becomes Vref−Vth and T3 is turned off;

In the fourth phase t4, R5 provides a high voltage signal, EM provides a high voltage signal, T8, T5 and T3 are turned on, the drain electrode of T3 is electrically connected to ELVDD, the potential of N1 is equal to the potential of N4, because N1 is in a floating state, before and after T3 is turned on, the voltage difference across C1 remains unchanged. At this time, the difference between the potential of the first node and the source electrode of T3 is Vdata−Vref+Vth, and the gate-source voltage of T3 is Vdata−Vref+Vth, the current flowing through O1 is $K(Vdata-Vref)^2$; among them, K is the current coefficient of T3; from the above formula, it can be seen that since Vref is a fixed voltage, the drain-source current Ids provided to O1 can be determined correspondingly by the data voltage Vdata; the current flowing through O1 is not related to the threshold voltage of the driving transistor and the power supply voltage provided by ELVDD, and can perform threshold voltage compensation;

In the fourth phase t4, Ids is equal to $K(Vdata-Vref)^2$; Ids is not related to Vth.

Figure 27:
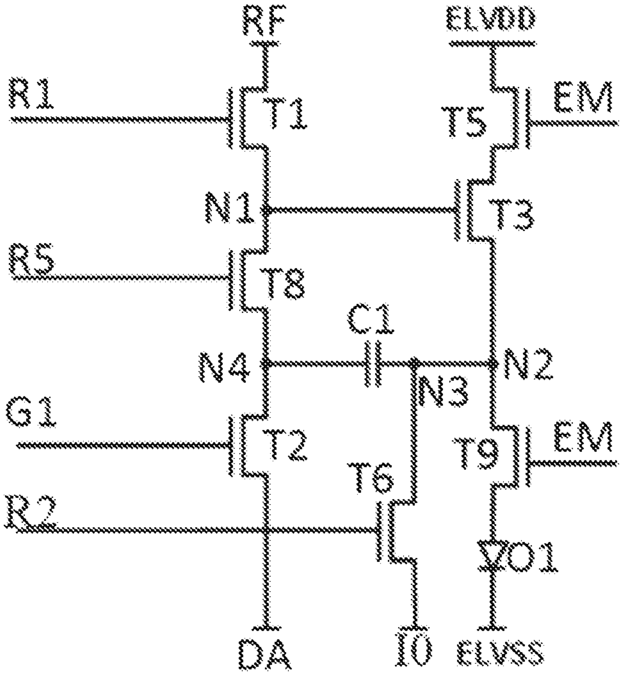
FIG. 27 is a circuit diagram of a pixel circuit according to at least one embodiment of the present disclosure.

The difference between at least one embodiment of the pixel circuit shown in FIG. 27 and at least one embodiment of the pixel circuit shown in FIG. 25 is that:

At least one embodiment of the pixel circuit shown in FIG. 27 further includes a second control circuit;

The second control circuit includes a ninth transistor T9;

The gate electrode of the ninth transistor T9 is electrically connected to the light emitting control terminal EM, the source electrode of the ninth transistor T9 is electrically connected to the source electrode of the driving transistor T3, and the drain electrode of the ninth transistor T9 is electrically connected to the anode of the organic light emitting diode O1.

In at least one embodiment of the pixel circuit shown in FIG. 27, all transistors are n-type transistors, but are not limited to this.

Figure 28:
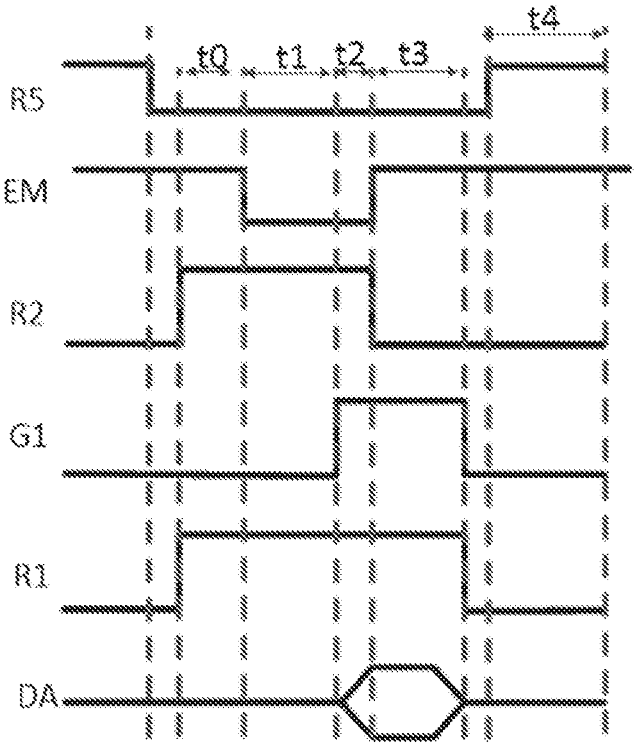
FIG. 28 is a working timing diagram of the pixel circuit shown in FIG. 27.

FIG. 28 is a working timing diagram of the pixel circuit shown in FIG. 27.

Compared with at least one embodiment of the pixel circuit shown in FIG. 25, at least one embodiment of the pixel circuit shown in FIG. 27 adds a ninth transistor T9; and, during the period that the potential of the light emitting control signal provided by the EM is a high voltage, and there is an overlapping period with the period when the potential of the second control signal provided by R2 is high voltage. During this overlapping period, T6, T5 and T9 are all turned on. At this time, Vint can reset the anode of O1; during the period that T9 is turned off, the potential of the anode of O1 remains at Vint. Even during the threshold voltage compensation phase, the source voltage of T3 is Vref−Vth, which will not affect the turning on sequence of the red pixel circuit, green pixel circuit and blue pixel circuit.

As shown in FIG. 28, when at least one embodiment of the pixel circuit shown in FIG. 27 of the present disclosure is working, the display period includes a pre-phase t0, a first phase t1, a second phase t2, a third phase t3 and a fourth phase t4 set successively;

In the pre-phase t0, R5 provides a low voltage signal, EM provides a high voltage signal, R2 provides a high voltage signal, G1 provides a low voltage signal, R1 provides a high voltage signal, T8 is turned off, T5 is turned on, T6 is turned on, and T2 is turned off. T1 is turned on to write the reference voltage Vref provided by RF into the first node N1, control the drain electrode of T3 to be electrically connected to ELVDD, and write the initial voltage Vint provided by I0 into the source electrode of T3;

In the first phase t1, R5 provides a low voltage signal, EM provides a low voltage signal, R2 provides a high voltage signal, G1 provides a low voltage signal, R1 provides a high voltage signal, T8, T5 and T9 are turned off, T1 is turned on, and T6 is turned on, to write the reference voltage Vref provided by RF into the gate electrode of T3, write the initial voltage Vint provided by I0 into the source electrode of T3, and reset the potential of the gate electrode of T3, the potential of the anode of O1 and the potential of the source electrode of T3;

In the second phase t2, R5 provides a low voltage signal, EM provides a low voltage signal, R2 provides a high voltage signal, G1 provides a high voltage signal, R1 provides a high voltage signal, T6, T8, T5 and T9 are turned off, and both T2 and T1 are turned on to write the data voltage Vdata provided by the data line DA into the fourth node N4, write the reference voltage Vref provided by the reference voltage terminal RF into the first node N1, and write the initial voltage Vin provided by the initial voltage terminal I0 into the source electrode of T3;

In the third phase t3, R5 provides a low voltage signal, EM provides a high voltage signal, R2 provides a low voltage signal, G1 provides a high voltage signal, R1 provides a high voltage signal, and DA provides the data voltage Vdata. At this time, T6 is turned off and T1 is turned on, T2 is turned on, the potential of the gate electrode of T3 is Vref; T5 and T9 are turned on, the drain electrode of T3 is electrically connected to ELVDD, and the source electrode of T3 is electrically connected to the anode of O1;

At the beginning of the third phase t3, T3 is turned on to charge C1 and increase the potential of the source electrode of T3 until the potential of the source electrode of T3 becomes Vref−Vth and T3 is turned off;

In the fourth phase t4, R5 provides a high voltage signal, EM provides a high voltage signal, T8, T5, T9 and T3 are turned on, the drain electrode of T3 is electrically connected to ELVDD, the source electrode of T3 is electrically connected to the anode of O1, and the potential of N1 is equal to that of N4. Since N1 is in a floating state, the voltage difference across C1 remains unchanged before and after T3 is turned on. At this time, the difference between the potential of the first node and the potential of the source electrode of T3 is Vdata−Vref+Vth, the gate-source voltage of T3 is Vdata−Vref+Vth, and the current flowing through O1 is K(Vdata−Vref) 2; where K is the current coefficient of T3; from the above formula, it can be seen that since Vref is a fixed voltage, the drain-source current Ids supplied to O1 can be determined corresponding to the data voltage Vdata: the current flowing through O1 is not related to the threshold voltage of the driving transistor and the power supply voltage provided by ELVDD, and can perform threshold voltage compensation;

In the fourth phase t4, Ids is equal to $K(Vdata-Vref)^2$; Ids is not related to Vth.

Figure 29:
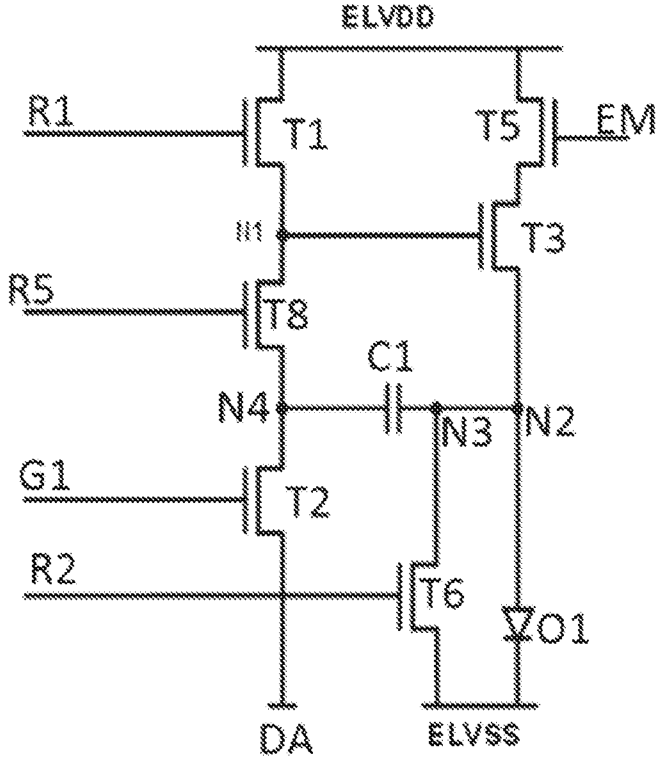
FIG. 29 is a circuit diagram of a pixel circuit according to at least one embodiment of the present disclosure.

The difference between at least one embodiment of the pixel circuit shown in FIG. 29 and the at least one embodiment of the pixel circuit shown in FIG. 25 is that:

The source electrode of T1 is electrically connected to the power supply voltage terminal ELVDD;

The source electrode of T6 is electrically connected to the low voltage terminal ELVSS.

In at least one embodiment of the pixel circuit shown in FIG. 29, the source electrode of T1 is electrically connected to the power supply voltage terminal ELVDD, and the drain electrode of T6 is electrically connected to the low voltage terminal ELVSS, which can save two additional voltage lines and is beneficial to layout design.

In at least one embodiment of the pixel circuit shown in FIG. 29, the first setting voltage terminal is a power supply voltage terminal, and the second setting voltage terminal is a low voltage terminal.

Figure 30:
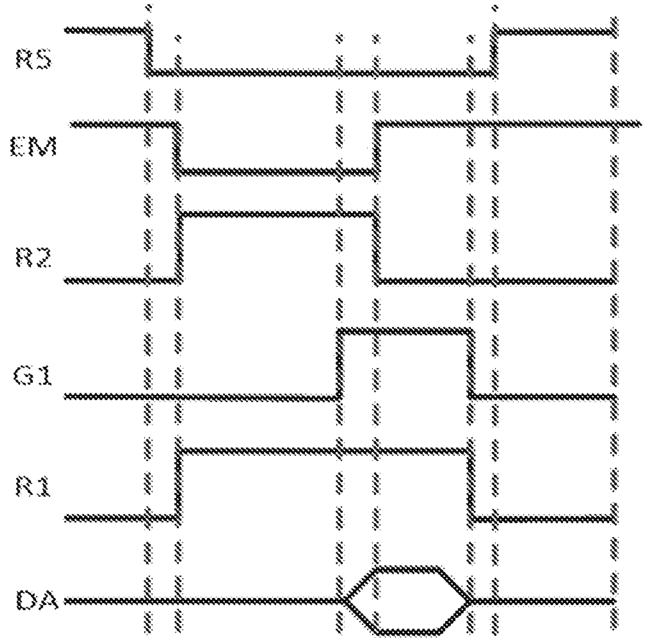
FIG. 30 is a working timing diagram of the pixel circuit shown in FIG. 29.
Figure 31:
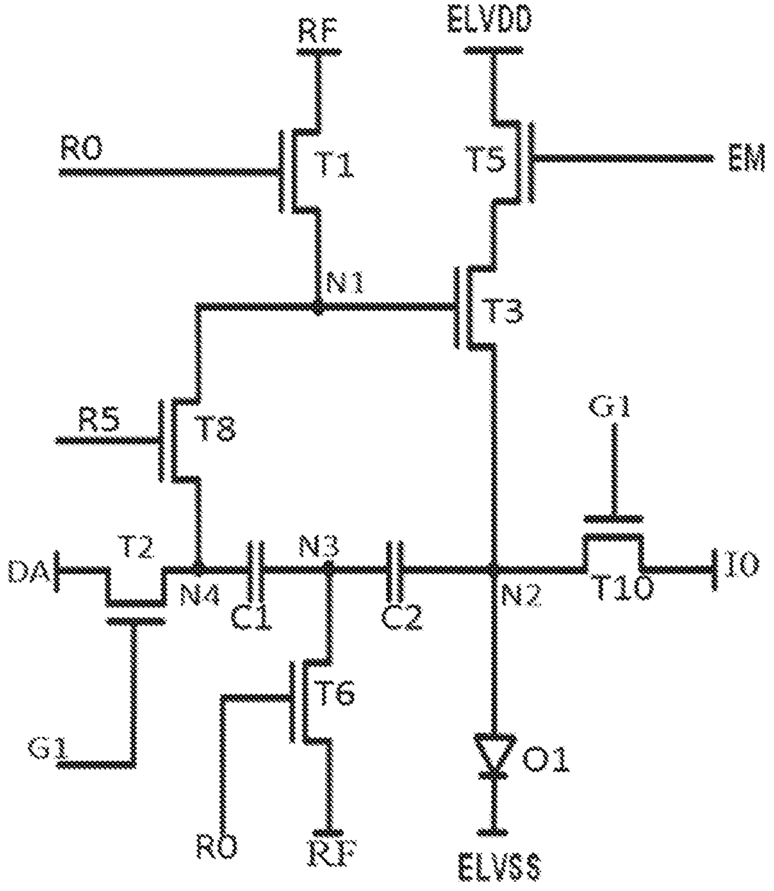
FIG. 31 is a circuit diagram of a pixel circuit according to at least one embodiment of the present disclosure.

FIG. 30 is a working timing diagram of the pixel circuit shown in FIG. 29. The difference between at least one embodiment of the pixel circuit shown in FIG. 31 of the present disclosure and at least one embodiment of the pixel circuit shown in FIG. 25 is that:

The gate electrode of T1 and the gate electrode of T6 are both electrically connected to the reset terminal R0; the source electrode of T6 is electrically connected to the reference voltage terminal RF;

At least one embodiment of the pixel circuit shown in FIG. 31 of the present disclosure also includes a second energy storage circuit and a fourth setting circuit;

The second energy storage circuit includes a second capacitor, and the fourth setting circuit includes a tenth transistor T10;

The first terminal of the second capacitor C2 is electrically connected to the third node N3, and the second terminal of the second capacitor C2 is electrically connected to the second node N2;

The gate electrode of the tenth transistor T10 is electrically connected to the scanning terminal G1, the source electrode of the tenth transistor T10 is electrically connected to the initial voltage terminal I0, and the drain electrode of the tenth transistor T10 is electrically connected to the second node N2; the initial voltage terminal I0 is configured to provide the initial voltage Vint.

In at least one embodiment of the pixel circuit shown in FIG. 31, all transistors are n-type transistors, but are not limited to this.

In at least one embodiment of the pixel circuit shown in FIG. 31, the first control terminal and the second control terminal are both the reset terminal R0, the first setting voltage terminal is the reference voltage terminal RF, and the second setting voltage terminal is the reference voltage terminal RF, the fourth setting voltage terminal is the initial voltage terminal I0.

Figure 32:
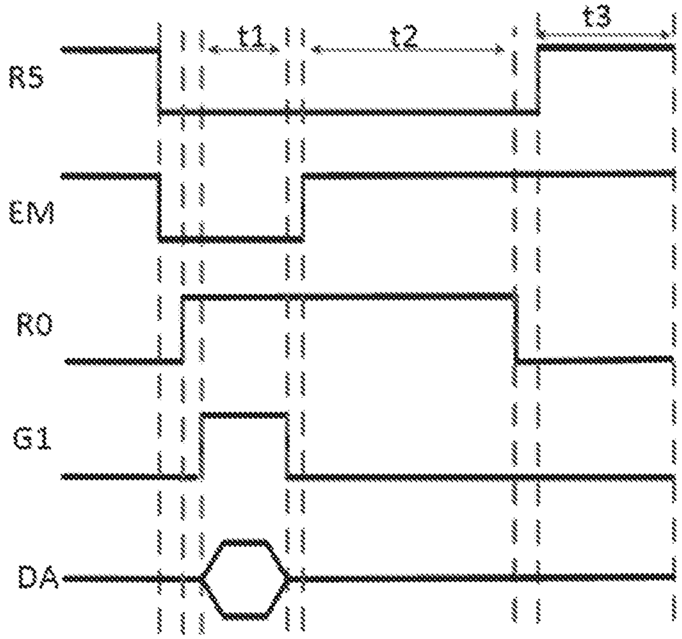
FIG. 32 is a working timing diagram of the pixel circuit shown in FIG. 31.

FIG. 32 is a working timing diagram of the pixel circuit shown in FIG. 31.

As shown in FIG. 32, when at least one embodiment of the pixel circuit shown in FIG. 31 of the present disclosure is working, the display period may include a first phase t1, a second phase t2, and a third phase t3 set successively;

In the first phase t1, R5 provides a low voltage signal, EM provides a low voltage signal, R0 provides a high voltage signal, G1 provides a high voltage signal, DA provides the data voltage Vdata, T5 is turned off, and T1 is turned on to write the reference voltage Vref provided by RF into the gate electrode of T3, T8 is turned off, T2 is turned on to write the data voltage Vdata into the fourth node N4, T6 is turned on to write the reference voltage Vref into the third node N3, and T10 is turned on to write Vint into the source electrode of T3;

In the second phase t2, R5 provides a low voltage signal, EM provides a high voltage signal, R0 provides a high voltage signal, G1 provides a low voltage signal, T1 is turned on to write Vref into the gate electrode of T3, and T6 is turned on to write Vref into the third node N3; T5 is turned on, and the drain electrode of T3 is electrically connected to ELVDD;

At the beginning of the second phase t2, T3 is turned on, and T3 performs threshold voltage compensation in a source following manner. The potential of the source electrode of T3 continues to increase from Vint until the potential of the source of T3 becomes Vref−Vth, at this time threshold voltage compensation is finished, T3 is turned off: at this time, the difference between the potential of N2 and the potential of the source electrode of T3 is Vdata-(Vref−Vth);

In the third phase t3, R5 provides a high voltage signal, EM provides a high voltage signal, R0 provides a low voltage signal, G1 provides a low voltage signal, T8 and T5 are turned on, and the drain electrode of T3 is electrically connected to ELVDD;

The potential of the gate electrode of T3 is Vdata, and the gate-source voltage of T3 is Vdata−Vref+Vth; at this time, the current Ioled flowing through O1 is equal to $K(Vdata-Vref)^2$; where K is the current coefficient of T3. Referring to the above equation, the current Ioled supplied by the driving transistor T3 to O1 can be determined based on the voltage difference between Vdata and Vref; since Vref is a fixed voltage, Ioled can be determined based on Vdata: Ioled is equal to the driving current Ids of T3 driving O1;

In the third phase t3, Ioled is equal to $K(Vdata-Vref)^2$; Ioled is not related to Vth.

When at least one embodiment of the pixel circuit shown in FIG. 31 of the present disclosure is working, in the first phase t1, both R0 and G1 provide high voltage signals, and T6 is turned on to write the reference voltage Vref provided by RF into the third node N3, T2 and T10 are both turned on to write the data voltage Vdata provided by the data line DA into the fourth node, and write the initial voltage Vint provided by I0 into the second terminal of C2.

Figure 33:
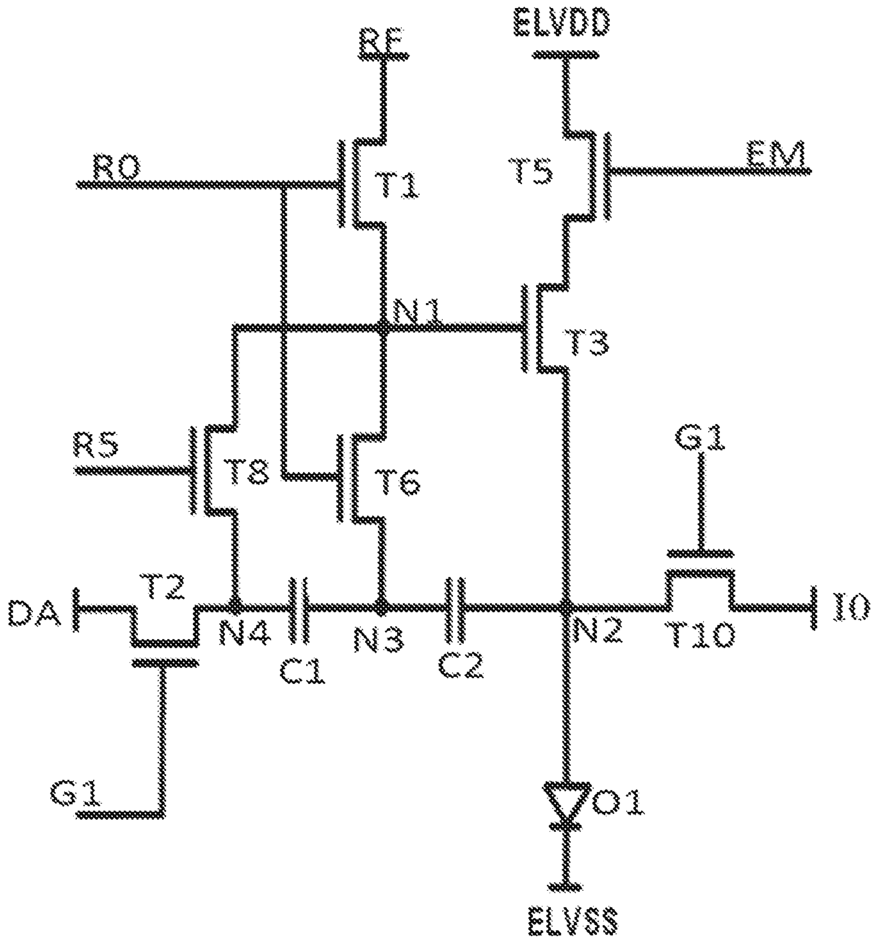
FIG. 33 is a circuit diagram of a pixel circuit according to at least one embodiment of the present disclosure.

The difference between at least one embodiment of the pixel circuit shown in FIG. 33 of the present disclosure and at least one embodiment of the pixel circuit shown in FIG. 31 of the present disclosure is that the source electrode of T6 is electrically connected to the first node N1.

In at least one embodiment of the pixel circuit shown in FIG. 33 of the present disclosure, the first control terminal and the second control terminal are both the reset terminal R0, the first setting voltage terminal is the reference voltage terminal RF, and the second setting voltage terminal is electrically connected to the first node N1, and the fourth setting voltage terminal is the initial voltage terminal I0.

Figure 34:
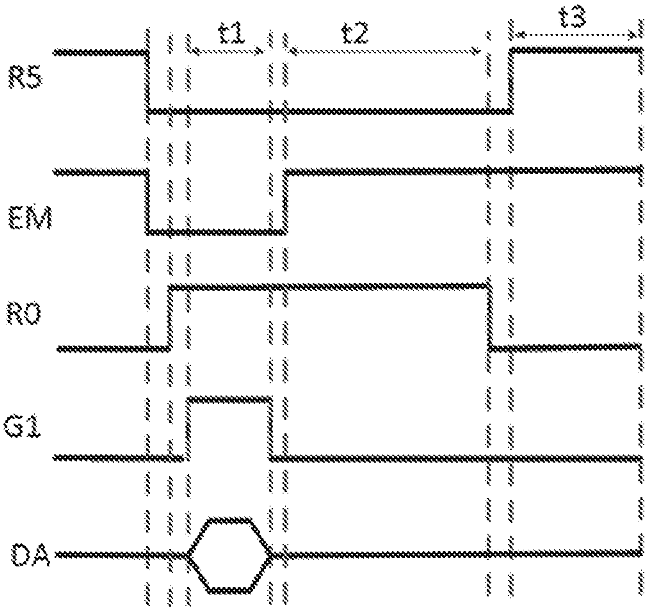
FIG. 34 is a working timing diagram of the pixel circuit shown in FIG. 33.

FIG. 34 is a working timing diagram of at least one embodiment of the pixel circuit shown in FIG. 33.

As shown in FIG. 34, when at least one embodiment of the pixel circuit shown in FIG. 33 of the present disclosure is working, the display period may include a first phase t1, a second phase t2 and a third phase t3 set successively;

In the first phase t1, R5 provides a low voltage signal, EM provides a low voltage signal, R0 provides a high voltage signal, G1 provides a high voltage signal, DA provides the data voltage Vdata, and T1 is turned on to write the reference voltage Vref provided by RF into the gate electrode of T3, T8 and T5 are turned off, T2 is turned on to write the data voltage Vdata into the second node N2, and T6 is turned on to control to connect the first node N1 and the third node N3, so that the potential of the third node N3 is Vref; T10 is turned on to write Vint into the source electrode of T3;

In the second phase t2, R5 provides a low voltage signal, EM provides a high voltage signal, R0 provides a high voltage signal, G1 provides a low voltage signal, T5 is turned on, the drain electrode of T3 is electrically connected to ELVDD, and T1 is turned on to write Vref into the gate electrode of T3, T6 is turned on to control to connect the first node N1 and the third node N3, so that the potential of the third node N3 is Vref;

At the beginning of the second phase t2, T3 is turned on, and T3 compensates for the threshold voltage in a source following manner. The potential of the source electrode of T3 continues to increase from Vint until the source potential of T3 becomes Vref−Vth, at this time, the threshold voltage compensation is finished, T3 is turned off, at this time, the difference between the potential of N2 and the potential of the source electrode of T3 is Vdata−(Vref−Vth);

In the third phase t3, R5 and EM provide high voltage signals, R0 provides low voltage signals, G1 provides low voltage signals, T8 and T5 are turned on, the drain electrode of T3 is electrically connected to ELVDD, the potential of the gate electrode of T3 is Vdata, and the gate-source voltage is Vdata−Vref+Vth; at this time, the current Ioled flowing through O1 is equal to $K(Vdata-Vref)^2$; where K is the current coefficient of T3. Referring to the above equation, the current Ioled supplied by the driving transistor T3 to O1 can be determined based on the voltage difference between Vdata and Vref; since Vref is a fixed voltage, Ioled can be determined based on Vdata: Ioled is equal to the driving current Ids of T3 driving O1;

In the third phase t3, Ioled is equal to $K(Vdata-Vref)^2$; Ioled is not related to Vth.

Figure 35:
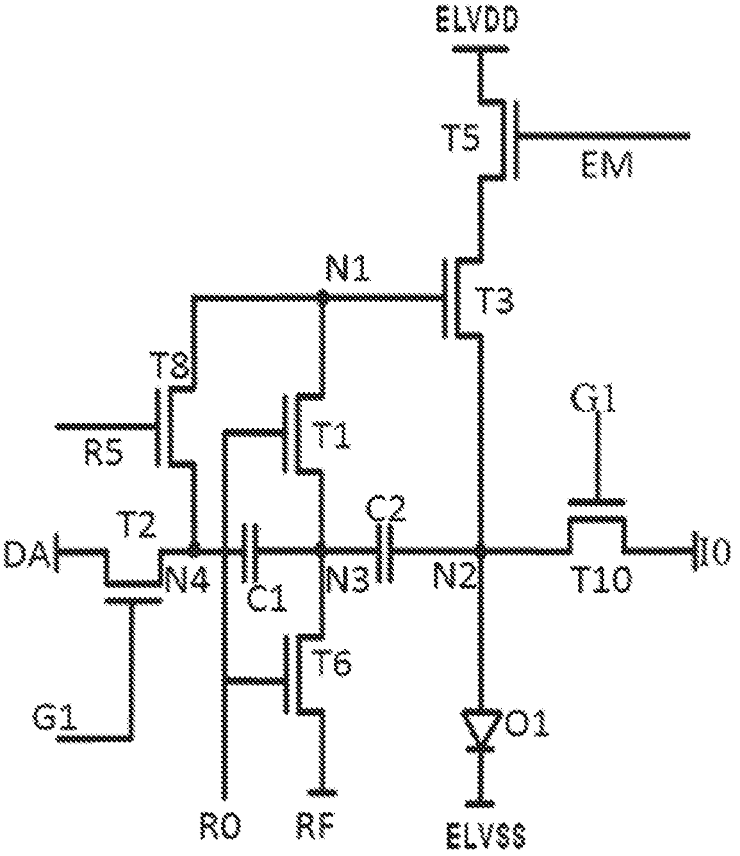
FIG. 35 is a circuit diagram of a pixel circuit according to at least one embodiment of the present disclosure.

The difference between at least one embodiment of the pixel circuit shown in FIG. 35 of the present disclosure and at least one embodiment of the pixel circuit shown in FIG. 31 of the present disclosure is that:

The source electrode of T1 is electrically connected to the third node N3.

In at least one embodiment of the pixel circuit shown in FIG. 35 of the present disclosure, the first control terminal and the second control terminal are both the reset terminal R0, the first setting voltage terminal is electrically connected to the third node N3, and the second setting voltage terminal is the reference voltage terminal RF, and the fourth setting voltage terminal is the initial voltage terminal I0.

Figure 36:
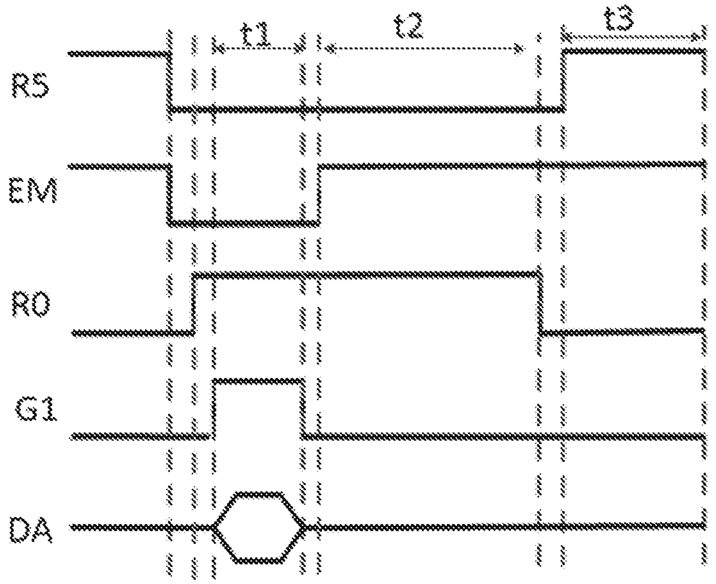
FIG. 36 is a working timing diagram of the pixel circuit shown in FIG. 35.

FIG. 36 is a working timing diagram of at least one embodiment of the pixel circuit shown in FIG. 35.

As shown in FIG. 36, when at least one embodiment of the pixel circuit shown in FIG. 35 of the present disclosure is working, the display period may include a first phase t1, a second phase t2 and a third phase t3 set successively;

In the first phase t1, R5 and EM provide low voltage signals, R0 provides high voltage signals, G1 provides high voltage signals, DA provides data voltage Vdata, and T6 is turned on to write the reference voltage Vref provided by RF into the third node N3, T8 and T5 are turned off, T2 is turned on to write the data voltage Vdata into the second node N2, and T1 is turned on to control to connect the first node N1 and the third node N3, so that the potential of the first node N1 is Vref; T10 is turned on to write Vint to the source electrode of T3;

In the second phase t2, R5 provides a low voltage signal, EM provides a high voltage signal, R0 provides a high voltage signal, G1 provides a low voltage signal, T6 is turned on to write Vref into the third node N3, and T1 is turned on to control to connect the first The node N1 and the third node N3, so that the potential of the first node N1 is Vref; T5 is turned on, and the drain electrode of T3 is electrically connected to ELVDD;

At the beginning of the second phase t2, T3 is turned on, and T3 performs threshold voltage compensation in a source following manner. The potential of the source electrode of T3 continues to increase from Vint until the potential of the source electrode of T3 becomes Vref−Vth, threshold voltage compensation is finished, T3 is turned off: at this time, the difference between the potential of N4 and the potential of the source electrode of T3 is Vdata−(Vref−Vth);

In the third phase t3, R5 and EM provide high voltage signals, R0 provides low voltage signals, G1 provides low voltage signals, T8 and T5 are turned on, the drain electrode of T3 is electrically connected to ELVDD, the potential of the gate electrode T3 is Vdata, and the gate-source voltage is Vdata−Vref+Vth; at this time, the current Ioled flowing through O1 is equal to $K(Vdata-Vref)^2$; K is the current coefficient of T3. Referring to the above equation, the current Ioled supplied by the driving transistor T3 to O1 can be determined based on the voltage difference between Vdata and Vref; since Vref is a fixed voltage, Ioled can be determined based on Vdata; Ioled is equal to the driving current Ids of T3 driving O1;

In the third phase t3, Ioled is equal to $K(Vdata-Vref)^2$; Ioled is not related to Vth.

Figure 37:
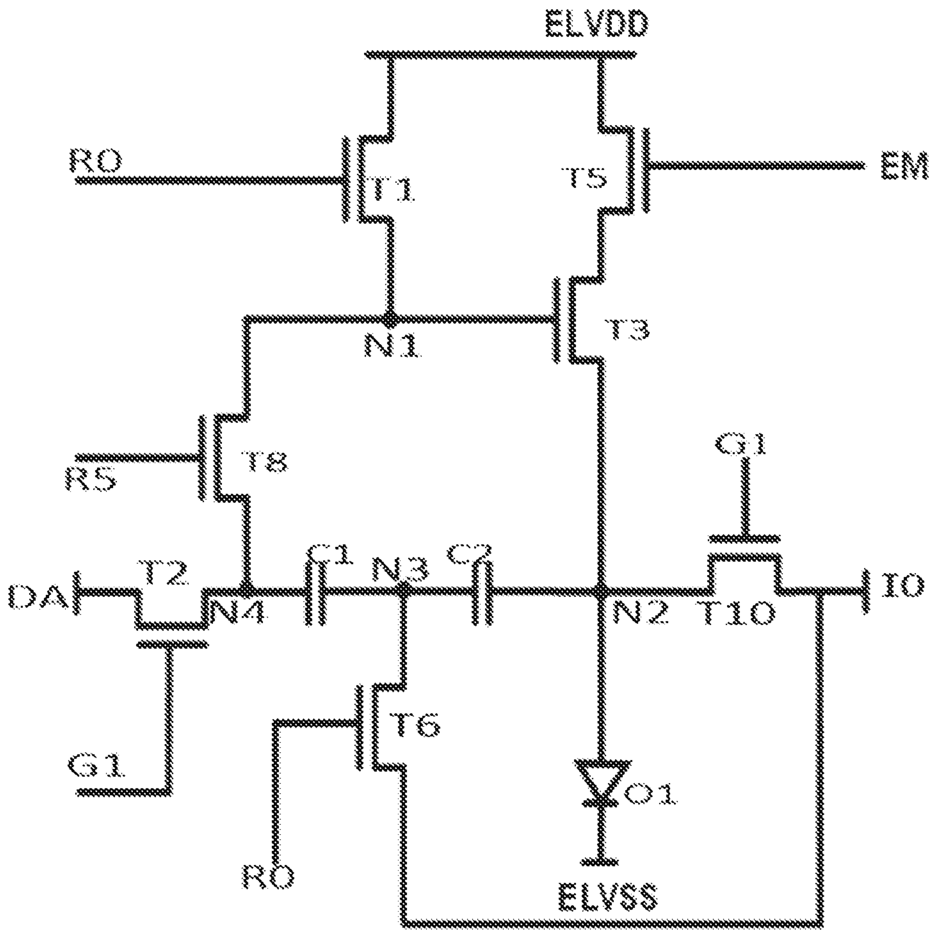
FIG. 37 is a circuit diagram of a pixel circuit according to at least one embodiment of the present disclosure.

The difference between at least one embodiment of the pixel circuit shown in FIG. 37 of the present disclosure and at least one embodiment of the pixel circuit shown in FIG. 31 of the present disclosure is that:

The source electrode of T1 is electrically connected to the power supply voltage terminal ELVDD;

The source electrode of T6 is electrically connected to the initial voltage terminal I0.

In at least one embodiment of the pixel circuit shown in FIG. 37 of the present disclosure, the first control terminal and the second control terminal are both the reset terminal R0, the first setting voltage terminal is the power supply voltage terminal ELVDD, and the second setting voltage terminal is the initial voltage terminal I0, and the fourth setting voltage terminal is the initial voltage terminal I0.

Figure 38:
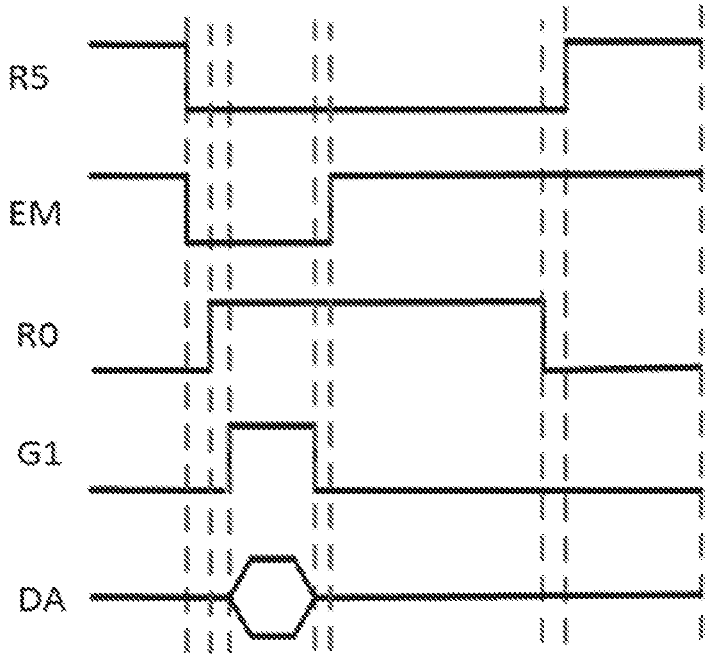
FIG. 38 is a working timing diagram of the pixel circuit shown in FIG. 37.

FIG. 38 is a working timing diagram of at least one embodiment of the pixel circuit shown in FIG. 37.

Figure 39:
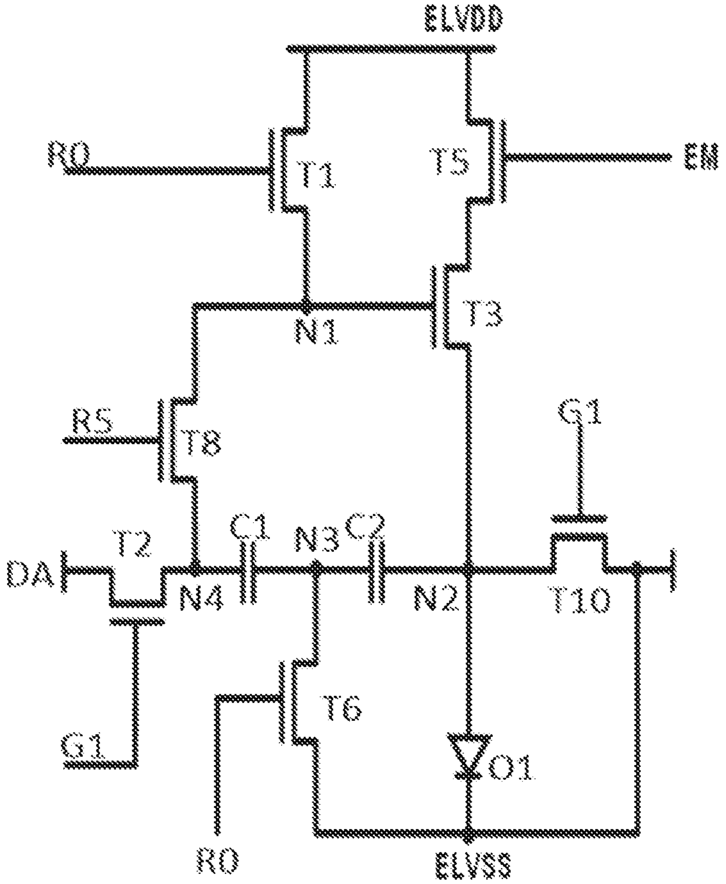
FIG. 39 is a circuit diagram of a pixel circuit according to at least one embodiment of the present disclosure.

The difference between at least one embodiment of the pixel circuit shown in FIG. 39 and at least one embodiment of the pixel circuit shown in FIG. 37 is that: the source electrode of T6 is electrically connected to the low voltage terminal ELVSS, and the source electrode of T10 is electrically connected to the low voltage terminal ELVSS.

In at least one embodiment of the pixel circuit shown in FIG. 39 of the present disclosure, the first control terminal and the second control terminal are both the reset terminal R0, the first setting voltage terminal is the power supply voltage terminal ELVDD, and the second setting voltage terminal and the fourth setting voltage terminal are both the low voltage terminal ELVSS.

Figure 40:
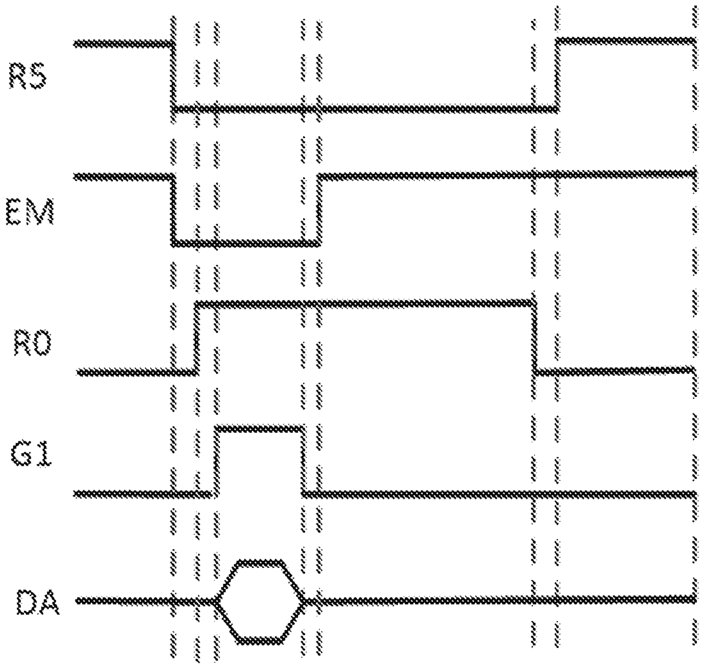
FIG. 40 is a working timing diagram of the pixel circuit shown in FIG. 39.

FIG. 40 is a working timing diagram of at least one embodiment of the pixel circuit shown in FIG. 39.

Figure 41:
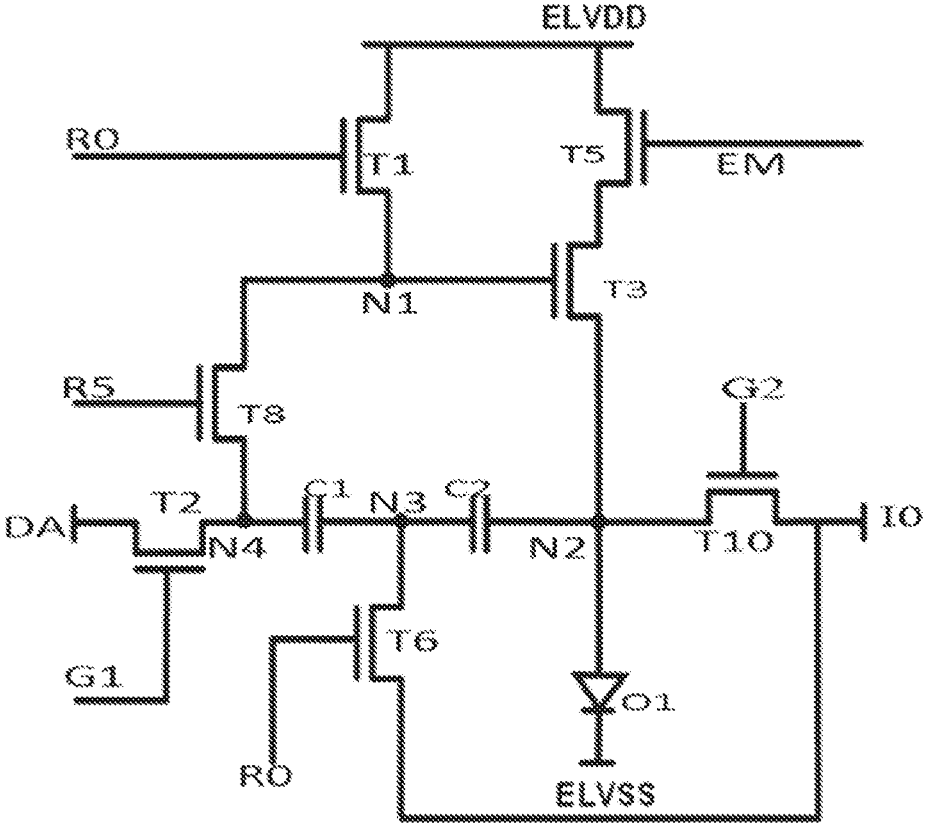
FIG. 41 is a circuit diagram of a pixel circuit according to at least one embodiment of the present disclosure.

The difference between at least one embodiment of the pixel circuit shown in FIG. 41 and the at least one embodiment of the pixel circuit shown in FIG. 37 is that the gate electrode of the tenth transistor T10 is electrically connected to the scanning signal terminal G2.

In at least one embodiment of the pixel circuit shown in FIG. 41 of the present disclosure, the first control terminal and the second control terminal are both the reset terminal R0, the fourth control terminal is the scanning signal terminal G2, and the first setting voltage terminal is the power supply voltage terminal ELVDD, the second setting voltage terminal and the fourth setting voltage terminal are all the initial voltage terminal I0.

Figure 42:
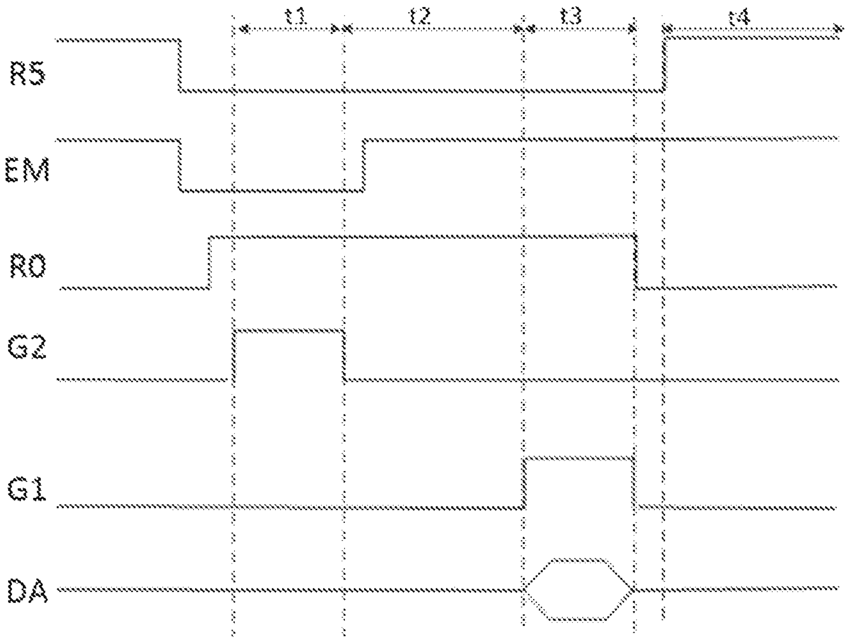
FIG. 42 is a working timing diagram of the pixel circuit shown in FIG. 41.

As shown in FIG. 42, when at least one embodiment of the pixel circuit shown in FIG. 41 of the present disclosure is working, the display period may include a first phase t1, a second phase t2, a third phase t3 and a fourth phase t4 that are set successively;

In the first phase t1, R5 and EM provide low voltage signals, R0 provides high voltage signals, G2 provides high voltage signals, G1 provides low voltage signals, DA provides data voltage Vdata, and T1 is turned on to write the power voltage Vdd provided by the power supply voltage terminal ELVDD into the gate electrode of T3, T8 and T5 are turned off, T2 is turned off, T6 is turned on to write the initial voltage Vint provided by I0 to the third node N3, and T10 is turned on to write Vint to the source electrode of T3;

In the second phase t2, R5 provides a low voltage signal, EM provides a high voltage signal, R0 provides a high voltage signal, G1 provides a low voltage signal, and T1 is turned on to write the power supply voltage provided by the power supply voltage terminal ELVDD into the gate electrode of T3, T6 is turned on to write the initial voltage Vint into the third node N3; T5 is turned on, and the drain electrode of T3 is electrically connected to ELVDD;

At the beginning of the second phase t2, T3 is turned on, and T3 performs threshold voltage compensation in a source following manner. The potential of the source electrode of T3 continues to increase from Vint until the potential of the source electrode T3 becomes Vdd-Vth, at this time the threshold voltage compensation is finished, T3 is turned off;

In the third phase t3, R5 provides a low voltage signal, EM provides a high voltage signal, R0 provides a high voltage signal, G2 provides a low voltage signal, G1 provides a high voltage signal, and T2 is turned on to write the data voltage Vdata into the fourth node N4; at this time, the difference between the potential of N4 and the potential of the source electrode of T3 is Vdata−(Vdd-Vth); T5 is turned on, and the drain electrode of T3 is electrically connected to ELVDD;

In the fourth phase t4, R5 and EM provide high voltage signals, R0 provides low voltage signals, G1 provides low voltage signals, G2 provides low voltage signals, T5 is turned on, and the drain electrode of T3 is electrically connected to ELVDD: T8 is turned on, and the potential of the gate electrode of T3 is Vdata, and the gate-source voltage of T3 is Vdata−Vdd+Vth; at this time, the current Ioled flowing through O1 is equal to $K(Vdata-Vdd)^2$; where K is the current coefficient of T3. Referring to the above equation, the current Ioled supplied by the driving transistor T3 to O1 can be determined according to the voltage difference between Vdata and Vdd; since Vdd is a fixed voltage, Ioled can be determined correspondingly according to Vdata; Ioled is equal to the driving current of T3 driving O1;

In the fourth phase t4, Ioled is equal to $K(Vdata-Vdd)^2$; Ioled is not related to Vth.

Figure 43:
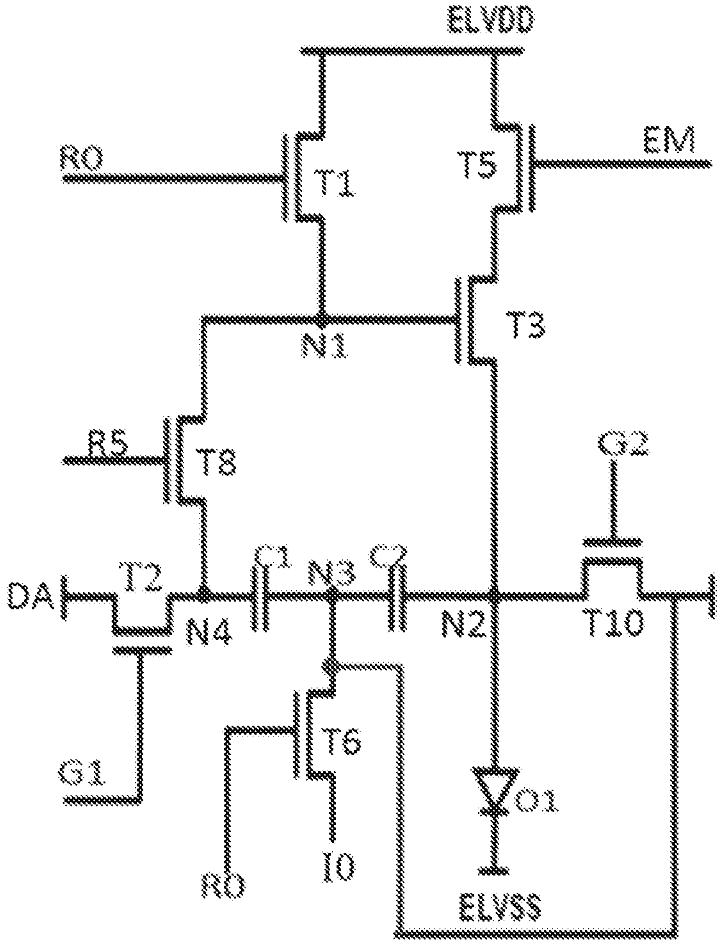
FIG. 43 is a circuit diagram of a pixel circuit according to at least one embodiment of the present disclosure.

The difference between at least one embodiment of the pixel circuit shown in FIG. 43 of the present disclosure and at least one embodiment of the pixel circuit shown in FIG. 41 of the present disclosure is that: the source electrode of T10 is electrically connected to the third node N3, and the source electrode of T10 is not electrically connected to I1.

In at least one embodiment of the pixel circuit shown in FIG. 43 of the present disclosure, the first control terminal and the second control terminal are both the reset terminal R0, the fourth control terminal is the scanning signal terminal G2, and the first setting voltage terminal is the power supply voltage terminal ELVDD, the second setting voltage terminal is the initial voltage terminal I0, and the fourth setting voltage terminal is electrically connected to the third node N3.

As shown in FIG. 42, when at least one embodiment of the pixel circuit shown in FIG. 43 of the present disclosure is working, the display period may include a first phase t1, a second phase t2, a third phase t3 and a fourth phase t4 that are set successively;

In the first phase t1, R5 and EM provide low voltage signals, R0 provides high voltage signals, G2 provides high voltage signals, G1 provides low voltage signals, DA provides data voltage Vdata, and T1 is turned on to write the power voltage Vdd provided by the power supply voltage terminal ELVDD into the gate electrode of T3, T8 and T5 are turned off, T2 is turned off, T6 is turned on to write the initial voltage Vint provided by I0 into the third node N3, and T10 is turned on to write Vint into the source electrode of T3;

In the second phase t2, R5 provides a low voltage signal, EM provides a high voltage signal, R0 provides a high voltage signal, G1 provides a low voltage signal, and T1 is turned on to write the power supply voltage Vdd provided by the power supply voltage terminal ELVDD into the gate electrode of T3, T6 is turned on to write Vint into the third node N3; T5 is turned on, and the drain electrode of T3 is electrically connected to ELVDD;

At the beginning of the second phase t2, T3 is turned on, and T3 performs threshold voltage compensation in a source following manner. The potential of the source electrode of T3 continues to increase from Vint until the potential of the source electrode of T3 becomes Vdd-Vth, at this time the threshold voltage compensation is finished, T3 is turned off;

In the third phase t3, R5 provides a low voltage signal, EM provides a high voltage signal, R0 provides a high voltage signal, G2 provides a low voltage signal, G1 provides a high voltage signal, and T2 is turned on to write the data voltage Vdata into the fourth node N4; at this time, the difference between the potential of N4 and the potential of the source electrode of T3 is Vdata−(Vdd−Vth); T5 is turned on, and the drain electrode of T3 is electrically connected to ELVDD;

In the fourth phase t4, R5 and EM provide high voltage signals, R0 provides low voltage signals, G1 provides low voltage signals, G2 provides low voltage signals, T5 is turned on, and the drain electrode of T3 is electrically connected to ELVDD: T8 is turned on, and the potential of the gate electrode of T3 is Vdata, and the gate-source voltage of T3 is Vdata−Vdd+Vth; at this time, the current Ioled flowing through O1 is equal to $K(Vdata-Vdd)^2$; where K is the current coefficient of T3. Referring to the above equation, the current Ioled supplied by the driving transistor T3 to O1 can be determined based on the voltage difference between Vdata and Vdd; since Vdd is a fixed voltage, Ioled can be determined based on Vdata: Ioled is equal to the driving current Ids of T3 driving O1;

In the fourth phase t4, Ioled is equal to $K(Vdata-Vdd)^2$; Ioled is not related to Vth.

Figure 44:
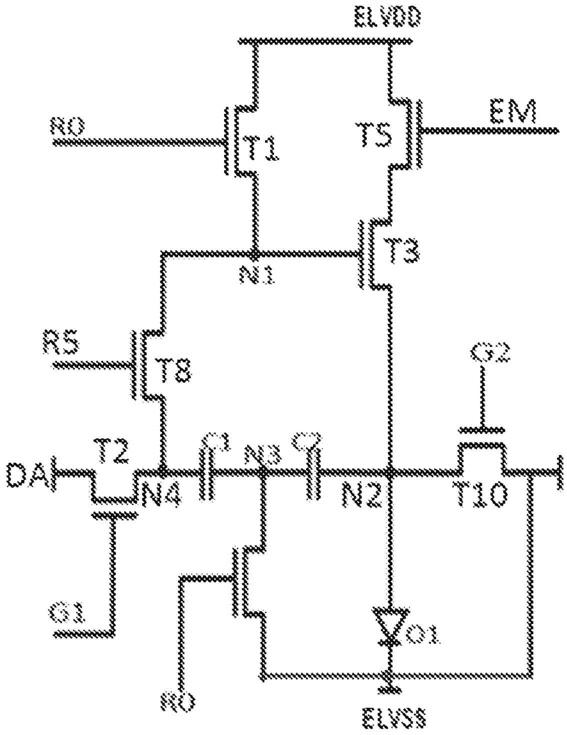
FIG. 44 is a circuit diagram of a pixel circuit according to at least one embodiment of the present disclosure.

The difference between at least one embodiment of the pixel circuit shown in FIG. 44 of the present disclosure and at least one embodiment of the pixel circuit shown in FIG. 41 of the present disclosure is that: the source electrode of T10 and the source electrode of T6 are both electrically connected to ELVSS, and the source electrode of T10 The source and the source electrode of T6 are not electrically connected to I0.

In at least one embodiment of the pixel circuit shown in FIG. 44 of the present disclosure, the first control terminal and the second control terminal are both the reset terminal R0, the fourth control terminal is the scanning signal terminal G2, and the first setting voltage terminal is the power supply voltage terminal ELVDD, the second setting voltage terminal and the fourth setting voltage terminal are all low voltage terminals ELVSS.

As shown in FIG. 42, when at least one embodiment of the pixel circuit shown in FIG. 44 of the present disclosure is working, the display period may include a first phase t1, a second phase t2, a third phase t3 and a fourth phase t4 that are set successively;

In the first phase t1, R5 and EM provide low voltage signals, R0 provides high voltage signals, G2 provides high voltage signals, G1 provides low voltage signals, DA provides data voltage Vdata, and T1 is turned on to write the power supply voltage Vdd provided by ELVDD into the gate electrode of T3, T8 and T5 are turned off, T2 is turned off, T6 is turned on to write the low voltage signal provided by ELVSS into the third node N3, and T10 is turned on to write the low voltage signal provided by ELVSS into the source electrode of T3;

In the second phase t2, R5 provides a low voltage signal, EM provides a high voltage signal, R0 provides a high voltage signal, G1 provides a low voltage signal, T1 is turned on to write Vdd to the gate electrode of T3, and T6 is turned on to write the low voltage signal provided by ELVSS into the third node N3; T5 is turned on, and the drain electrode of T3 is electrically connected to ELVDD;

At the beginning of the second phase t2, T3 is turned on, and T3 performs threshold voltage compensation in a source following manner. The potential of the source electrode of T3 continues to increase due to the voltage value of the low-voltage signal provided by ELVSS until the source potential of T3 becomes is Vdd−Vth, at this time the threshold voltage compensation is completed and T3 is turned off;

In the third phase t3, R5 provides a low voltage signal, EM provides a high voltage signal, R0 provides a high voltage signal, G2 provides a low voltage signal, G1 provides a high voltage signal, and T2 is turned on to write the data voltage Vdata into the fourth node N4; at this time, the difference between the potential of N4 and the potential of the source electrode of T3 is Vdata−(Vdd−Vth): T5 is turned on, and the drain electrode of T3 is electrically connected to ELVDD;

In the fourth phase t4, R5 and EM provide high voltage signals, R0 provides low voltage signals, G1 provides low voltage signals, G2 provides low voltage signals, T5 is turned on, and the drain electrode of T3 is electrically connected to ELVDD: T8 is turned on, and the potential of the gate electrode of T3 is Vdata, and the gate-source voltage of T3 is Vdata−Vdd+Vth; at this time, the current Ioled flowing through O1 is equal to $K(Vdata-Vdd)^2$; where K is the current coefficient of T3. Referring to the above equation, the current Ioled supplied by the driving transistor T3 to O1 can be determined based on the voltage difference between Vdata and Vdd: since Vdd is a fixed voltage, Ioled can be determined based on Vdata: Ioled is equal to the driving current Ids of T3 driving O1;

In the fourth phase t4, Ioled is equal to $Vdata-Vdd)^2$; Ioled is not related to Vth.

Figure 45:
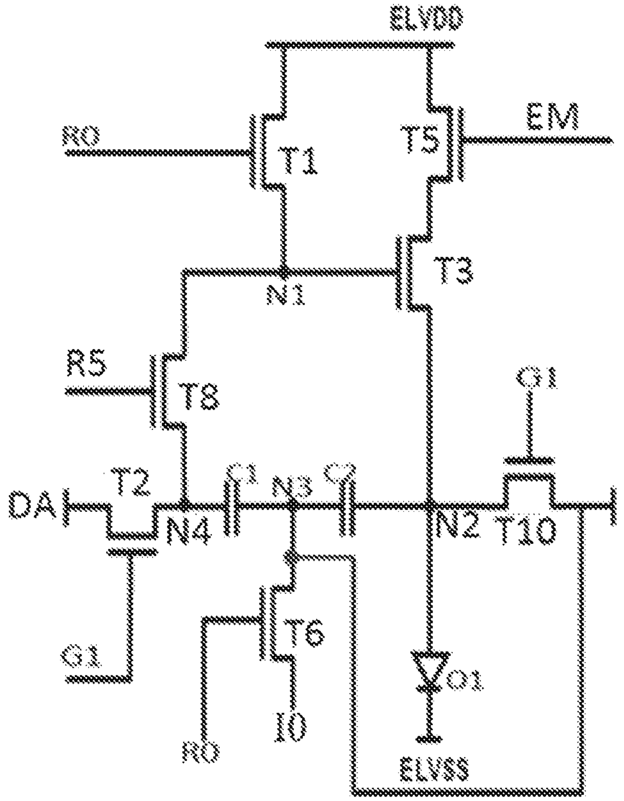
FIG. 45 is a circuit diagram of a pixel circuit according to at least one embodiment of the present disclosure.

The difference between at least one embodiment of the pixel circuit shown in FIG. 45 and at least one embodiment of the pixel circuit shown in FIG. 37 is that: the source electrode of T10 is electrically connected to the third node N3, and the source electrode of T10 is not electrically connected to I0.

In at least one embodiment of the pixel circuit shown in FIG. 45 of the present disclosure, the first control terminal and the second control terminal are both the reset terminal R0, the fourth control terminal is the scanning terminal G1, and the first setting voltage terminal is the power supply voltage terminal ELVDD, the second setting voltage terminal is the initial voltage terminal I0, and the fourth setting voltage terminal is electrically connected to the third node N3.

Figure 46:
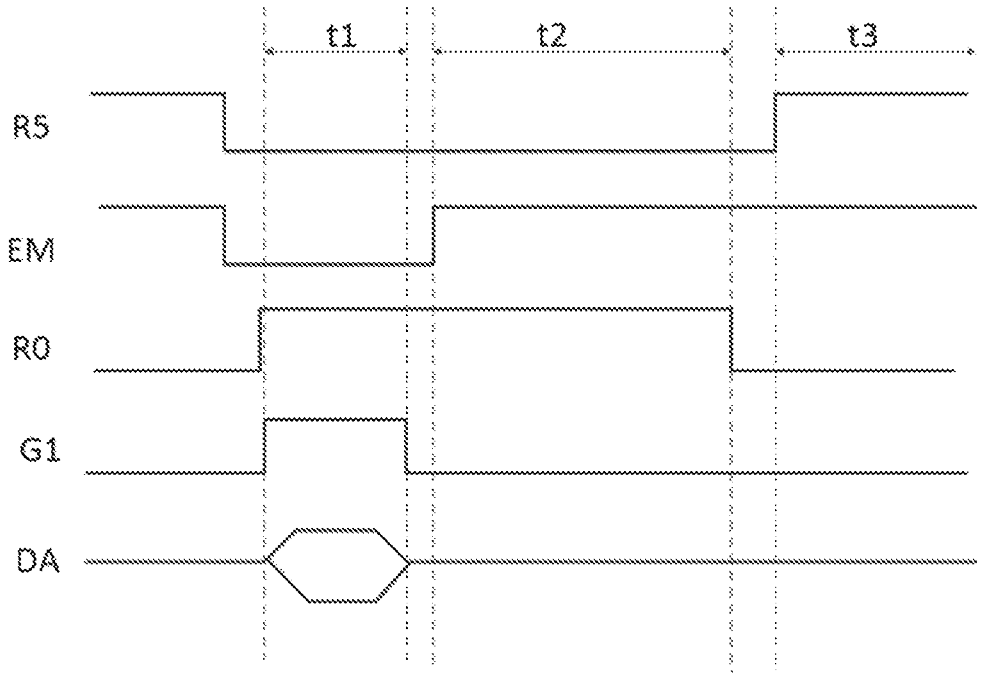
FIG. 46 is a working timing diagram of the pixel circuit shown in FIG. 45.

As shown in FIG. 46, when at least one embodiment of the pixel circuit shown in FIG. 45 of the present disclosure is working, the display period may include a first phase t1, a second phase t2, and a third phase t3 set successively;

In the first phase t1, R5 and EM provide low voltage signals, R0 provides high voltage signals, G1 provides high voltage signals, DA provides data voltage Vdata, and T6 is turned on to write the initial voltage Vint provided by I0 into the third node N3, T8 and T5 are turned off, T2 is turned on to write the data voltage Vdata into the fourth node N4, and T1 is turned on to control to connect the first node N1 and the power supply voltage terminal ELVDD to write the power voltage Vdd provided by the power supply voltage terminal ELVDD into the first node N1; T10 is turned on to write Vint into the source electrode of T3;

In the second phase t2, R5 provides a low voltage signal, EM provides a high voltage signal, R0 provides a high voltage signal, G1 provides a low voltage signal, T1 is turned on to control to connect the power supply voltage terminal ELVDD and the first node N1, and T6 is turned on, to control to connect the initial voltage terminal I0 and the third node N3, so that the potential of the third node N3 is Vint: T5 is turned on, and the drain electrode of T3 is electrically connected to ELVDD;

At the beginning of the second phase t2, T3 is turned on, and T3 performs threshold voltage compensation in a source following manner. The potential of the source electrode of T3 continues to increase from Vint until the potential of the source electrode of T3 becomes Vdd−Vth, at this time threshold voltage compensation is completed, T3 is turned off: at this time, the difference between the potential of N4 and the potential of the source electrode of T3 is Vdata−(Vdd−Vth);

In the third phase t3, R5 and EM provide high voltage signals, R0 provides low voltage signals, G1 provides low voltage signals, T8 and T9 are turned on, the drain electrode of T3 is electrically connected to ELVDD, the potential of the gate electrode of T3 is Vdata, and the gate-source voltage of T3 is Vdata−Vdd+Vth; at this time, the current Ioled flowing through O1 is equal to $K(Vdata-Vdd)^2$; where K is the current coefficient of T3. Referring to the above equation, the current Ioled supplied by the driving transistor T3 to O1 can be determined based on the voltage difference between Vdata and Vdd: since Vref is a fixed voltage, Ioled can be determined based on Vdata: Ioled is equal to the driving current Ids of T3 driving O1;

In the third phase t3, Ioled is equal to $K(Vdata-Vdd)^2$; Ioled is not related to Vth.

Figure 47:
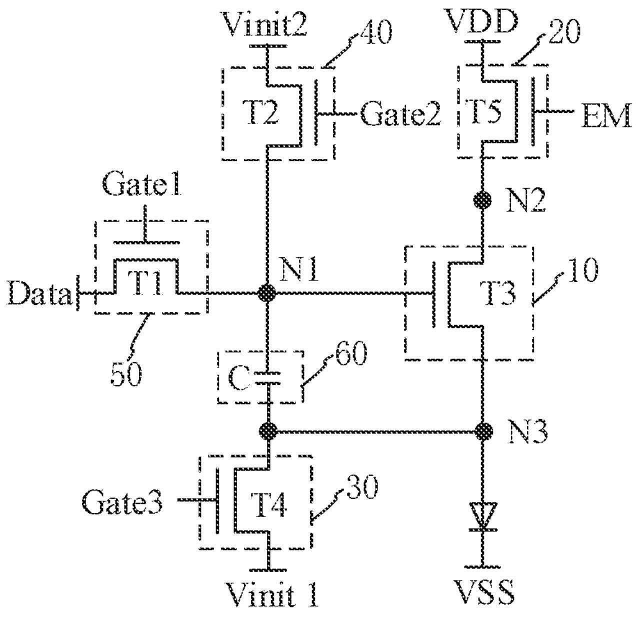
FIG. 47 is a schematic structural diagram of a pixel driving circuit in a pixel circuit according to an embodiment of the present disclosure.

FIG. 47 is a schematic structural diagram of a pixel driving circuit in a pixel circuit according to an embodiment of the present disclosure. As shown in FIG. 47, the pixel driving circuit may include a driving circuit 10 and a first control circuit 20, wherein the driving circuit 10 is connected to the first node N1, the second node N2 and the third node N3, the driving circuit 10 can be configured to provide a driving current by using the voltage difference between the second node N2 and the third node N3 in response to the voltage signal of the first node N1; the first control circuit 20 is connected to the second node N2, the first power terminal VDD and the enable signal terminal EM, the first control circuit 20 can be configured to transmit the voltage signal of the first power terminal VDD to the second node N2 in response to the signal of the enable signal terminal EM.

In the pixel driving circuit provided by the present disclosure, by arranging the first control circuit 20 between the second node N2 and the first power terminal VDD, the first control circuit 20 can provide the voltage signal of the first voltage terminal VDD provided to the second node N2 in respond to the signal of the enable signal terminal EM, so that the duration of the voltage signal provided by the first power terminal VDD to the second node N2 can be adjusted by adjusting the conduction duration of the enable signal, so that the pixel driving circuit has a PWM function and can improve the display uniformity of the display panel at low gray levels and improves display quality.

Because the pixel driving circuit in the pixel circuit described in at least one embodiment of the present disclosure has the first control circuit 20, by adjusting the on-level duty ratio of the enable signal at the enable signal terminal EM, the refresh rate of the image to be displayed can be adjusted, thereby improving the display uniformity of the display panel. For example, if the current image to be displayed is a low-gray-scale display, the driving integrated circuit DIC can increase the gray-scale voltage based on the gray-scale voltage corresponding to the current gray-scale value, that is, a higher gray-scale voltage is used to display the current gray-scale display. At the same time, the driving integrated circuit DIC can reduce the duty ratio of the conduction level of the enable signal terminal EM to reduce the refresh rate of the current picture, thereby combining the adjustment of the gray-scale voltage and adjustment of the refresh rate to improve the display uniformity of the display panel at low gray levels. It can be seen that the pixel driving circuit in the pixel circuit according to at least one embodiment of the present disclosure can control the driving current provided by the driving transistor through the first control circuit 20, making it possible to adjust the driving current. It should be understood that in other embodiments, the first control circuit 20 can also be used in other ways to improve display uniformity, which will not be described in detail here.

As shown in FIG. 47, in an exemplary embodiment, the driving circuit 10 and the first control circuit 20 may be implemented by transistors. Exemplarily, the driving circuit 10 may include a driving transistor T3, a first electrode of the driving transistor T3 is connected to the second node N2, a second electrode of the driving transistor T3 is connected to the third node N3, and a gate electrode of the driving transistor T3 is connected to the first node N1, the driving transistor T3 may be configured to provide a driving current using a voltage difference between the second node N2 and the third node N3 in response to the voltage signal of the first node N1. The first control circuit 20 may include a fifth transistor T5, a first electrode of the fifth transistor T5 is connected to the second node N2, a second electrode of the fifth transistor T5 is connected to the first power supply terminal VDD, and a gate electrode of the fifth transistor T5 is connected to the enable signal terminal EM, the fifth transistor T5 may be configured to transmit the voltage signal of the first power supply terminal VDD to the second node N2 in response to the signal of the enable signal terminal EM. For example, during the light emitting phase, the fifth transistor T5 is turned on under the control of the enable signal output by the enable signal terminal EM, thereby transmitting the voltage signal of the first power supply terminal VDD to the second node N2, and the driving transistor T3 is turned on under the control of the voltage signal of the first node N1, so that the driving transistor T3 can use the voltage difference between the second node N2 and the third node N3 to provide driving current to the light emitting device connected thereto, and drive the light emitting device to emit light. In this exemplary embodiment, since there is a fifth transistor T5 between the first power supply terminal VDD and the second node N2, it is possible to perform the duty ratio adjustment by the signal of the enable signal terminal EM applied to the gate electrode of the fifth transistor T5, in one frame of data, the duty ratio of the on-time of the fifth transistor T5 in one frame of data can be controlled, so that the PWM adjustment on the driving current can be implemented, so that the pixel driving circuit in the pixel circuit provided by at least one embodiment of the present disclosure can actively adjust the grayscale brightness of the light emitting device, thereby improving the problem of poor uniformity of the display panel at low grayscales.

As shown in FIG. 47, in an exemplary embodiment, the driving transistor T3 and the fifth transistor T5 may both be N-type transistors. For example, they can all be N-type oxide thin film transistors, which can reduce the influence of leakage on the first node N1 and the second node N2, which helps ensure the voltage stability of the above-mentioned main nodes of the driving circuit 10 at a low refresh frequency. Of course, in other embodiments, the driving circuit 10 and the first control circuit 20 can also be implemented by other circuits.

As shown in FIG. 47, in an exemplary embodiment, the pixel driving circuit may further include a first reset circuit 30, a second reset circuit 40, a data writing-in circuit 50 and a coupling circuit 60, where the first reset circuit 30 is connected to the third node N3, the third gate signal terminal Gate3 and the first initial signal terminal Vinit1, the first reset circuit 30 can be configured to transmit the signal of the first initial signal terminal Vinit1 to the third Node N3 in respond to the signal of the third gate signal terminal Gate3; the second reset circuit 40 is connected to the first node N1, the second initial signal terminal Vinit2 and the second gate signal terminal Gate2. The second reset circuit 40 can be configured to transmit the signal of the second initial signal terminal Vinit2 to the first node N1 in respond to the signal of the second gate signal terminal Gate2; the data writing-in circuit 50 is connected to the first node N1, the first gate signal terminal Gate1 and the data signal terminal Data. The data writing-in circuit 50 can be configured to transmit the signal of the data signal terminal Data to the first node N1 in respond to the signal of the first gate signal terminal Gate1; the coupling circuit 60 is connected between the first node N1 and the third node N3. Among them, the first reset circuit 30 can reset the third node N3 during the initialization phase, that is, reset the anode of the light emitting device to eliminate the influence of the previous frame of data. The second reset circuit 40 may input a voltage to turn off the driving circuit 10 to the first node N1 to prevent the light emitting device from abnormally emitting light. The data writing-in circuit 50 may write the data signal of the data signal terminal Data into the first node N1 during the data writing-in phase.

Similarly, the first reset circuit 30, the second reset circuit 40 and the data writing-in circuit 50 described in this disclosure can all be implemented by transistors. Exemplarily, the first reset circuit 30 may include a fourth transistor T4. The first electrode of the fourth transistor T4 is connected to the first initial signal terminal Vinit1. The second electrode of the fourth transistor T4 is connected to the third node N3. The gate electrode of the fourth transistor T4 is connected to the third gate signal terminal Gate3, and the fourth transistor T4 can be configured to transmit the signal of the first initial signal terminal Vinit1 to the third node N3 in response to the signal of the third gate signal terminal Gate3; the second reset circuit 40 can include a second transistor T2, the first electrode of the second transistor T2 is connected to the second initial signal terminal Vinit2, the second electrode of the second transistor T2 is connected to the first node N1, and the gate electrode of the second transistor T2 is connected to the second gate signal terminal. Gate2, the second transistor T2 may be configured to transmit the signal of the second initial signal terminal Vinit2 to the first node N1 in response to the signal of the second gate signal terminal Gate2; the data writing-in circuit 50 may include a first transistor T1, the first electrode of the first transistor T1 is connected to the data signal terminal Data, the second electrode of the first transistor T1 is connected to the first node N1, the gate electrode of the first transistor T1 is connected to the first gate signal terminal Gate1, and the first transistor T1 can be configured to transmit the signal of the data signal terminal Data to the first node N1 in respond to the signal of the gate signal terminal Gate1. Wherein, the first transistor T1, the second transistor T2 and the fourth transistor T4 may all be N-type transistors, for example, they may be N-type oxide thin film transistors. Of course, in other embodiments, the first reset circuit 30, the second reset circuit 40 and the data writing-in circuit 50 may also have other circuit structures, which will not be described in detail here.

As shown in FIG. 47, in an exemplary embodiment, the coupling circuit 60 may include a storage capacitor C, and the storage capacitor C may couple the voltage of each node at different phases.

At least one embodiment of the pixel circuit shown in FIG. 47 is also at least one embodiment of the pixel circuit shown in FIG. 2. Specifically, the driving circuit 10, the first control circuit 20, the first reset circuit 30, the second reset circuit 40, the data writing-in circuit 50, and the coupling circuit 60 respectively correspond to the driving circuit 10, the light emitting control circuit 14, the second setting circuit 13, the first setting circuit 12, the data writing-in circuit 21, the first energy storage circuit 11. Wherein, based on at least one embodiment of the pixel circuit shown in FIG. 2, in at least one embodiment of the pixel circuit shown in FIG. 7B, the driving circuit 10 may include a driving transistor T3, and the first setting circuit 12 may include a first transistor T1, the data writing-in circuit 21 may include a second transistor T2, the light emitting control circuit 14 may include a fifth transistor T5, the second setting circuit 13 may include a sixth transistor T6, and the first energy storage circuit 11 may include a first capacitor C1. In at least one embodiment of the pixel circuit shown in FIG. 47, the first reset circuit 30 may include a fourth transistor T4, the second reset circuit 40 may include a second transistor T2, and the data writing-in circuit 50 may include a first transistor T1, the coupling circuit 60 may include a storage capacitor C, the driving circuit 10 may include a driving transistor T3, and the first control circuit 20 may include a fifth transistor T5.

Figure 48:
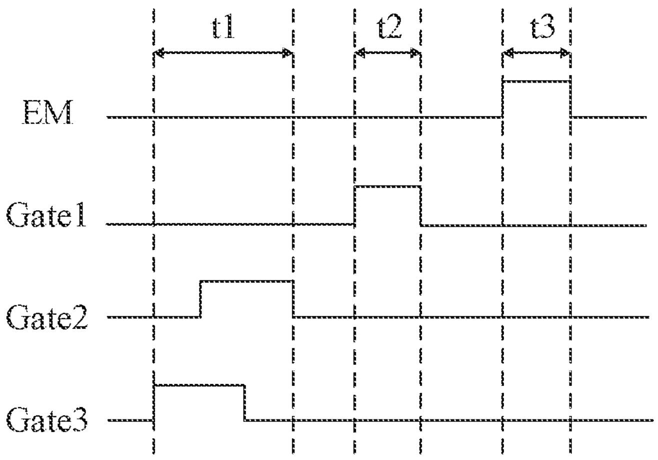
FIG. 48 is a timing diagram of each node of the pixel driving circuit in FIG. 47.

FIG. 48 is a timing diagram of each node of the pixel driving circuit in FIG. 47. In FIG. 48, EM represents the timing of the enable signal terminal EM, Gate1 represents the timing of the first gate signal terminal Gate1, and Gate2 represents the timing of the second gate signal terminal Gate2, Gate3 represents the timing of the third gate signal terminal Gate3, and Data represents the timing of the data signal terminal Data. As shown in FIG. 48, the driving method of the pixel driving circuit may include: a reset phase t1, a data writing-in phase t2, and a light emitting phase t3. The following is a detailed introduction to the driving method of the pixel driving terminal circuit of the present disclosure in conjunction with the timing diagram.

Figure 49:
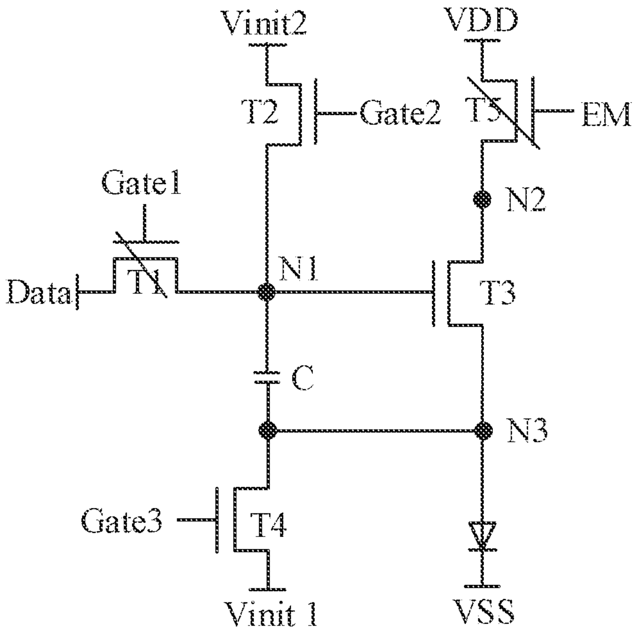
FIG. 49 is an equivalent circuit diagram of the pixel driving circuit in the pixel circuit in the reset phase according to an embodiment of the present disclosure.

FIG. 49 is an equivalent circuit diagram of the pixel driving circuit in the pixel circuit in the reset phase according to an embodiment of the present disclosure. As shown in FIG. 49, in the reset phase t1, the third gate signal terminal Gate3, the second gate signal terminal Gate2 successively outputs a high level, the fourth transistor T4 and the second transistor T2 are turned on successively, and the fourth transistor T4 is turned on to transmit the initialization signal of the first initial signal terminal Vinit1 to the third node N3, and the anode of the light emitting device is reset. The second transistor T2 is turned on to transmit the second initialization signal of the second initial signal terminal Vinit2 to the first node N1 to reset the first node N1.

Figure 50:
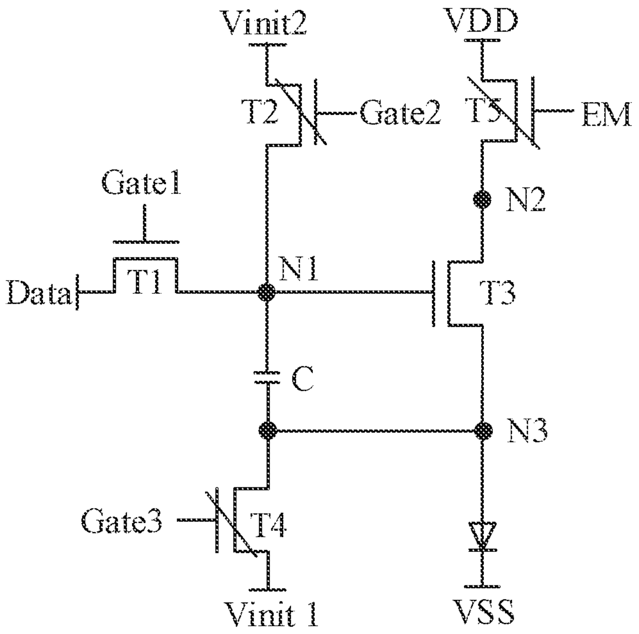
FIG. 50 is an equivalent circuit diagram of the pixel driving circuit in the pixel circuit in the data writing-in phase according to an embodiment of the present disclosure.

FIG. 50 is an equivalent circuit diagram of the pixel driving circuit in the pixel circuit according to an embodiment of the present disclosure during the data writing stage. As shown in FIG. 50, during the data writing-in phase t2, the second gate signal terminal Gate2 and the third gate signal terminals Gate3 both output a low level signal, and the fourth transistor T4 and the second transistor T2 are turned off. The first gate signal terminal Gate1 outputs a high-level signal, and the first transistor T1 is turned on to transmit the data signal of the data signal terminal Data to the first node N1. The voltage of the first node N1 becomes Vdata, and the voltage of the third node N3 becomes VN3=Vinit2−Vth.

Figure 51:
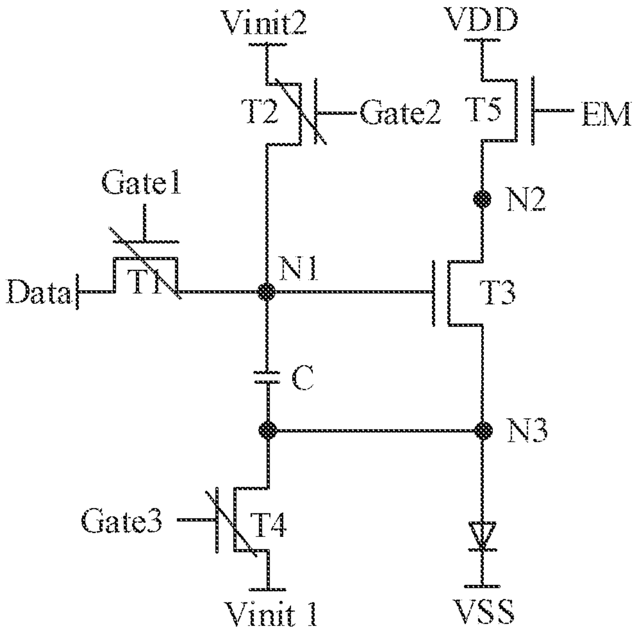
FIG. 51 is an equivalent circuit diagram of the pixel driving circuit in the pixel circuit in the light emitting phase according to an embodiment of the present disclosure.

FIG. 51 is an equivalent circuit diagram of the pixel driving circuit in the pixel circuit according to an embodiment of the present disclosure in the light emitting phase. As shown in FIG. 51, in the light emitting phase t3, the first transistor T1, the second transistor T2, the fourth transistor T4 are all turned off, the enable signal terminal EM outputs a high-level signal, the fifth transistor T5 is turned on, and the voltage signal of the first power supply terminal VDD is written into the second node N2, so that the driving transistor T3 is turned on under the influence of the data signal of the first node N1, the driving current is provided to the light emitting element by using the voltage difference between the first power supply terminal VDD and the second power supply terminal VSS to drive the light emitting device to emit light. VN1=VData+Voled+Vss−Vinit2+Vth, VN3=Voled+Vss, according to the driving transistor output current formula I=(μWCox/2L)(Vgs−Vth)2, where μ is the carrier mobility; Cox is gate storage capacitance per unit area, W is the width of the channel of the driving transistor, L is the length of the channel of the driving transistor, Vgs is the gate-source voltage difference of the driving transistor, and Vth is the threshold voltage of the driving transistor. The output current of the driving transistor in the pixel driving circuit of the pixel circuit according to at least one embodiment of the present disclosure is I=(μWCox/2L)(VData−Vinit2)2. The pixel driving circuit can avoid the influence of the driving transistor threshold on its output current.

Figure 52:
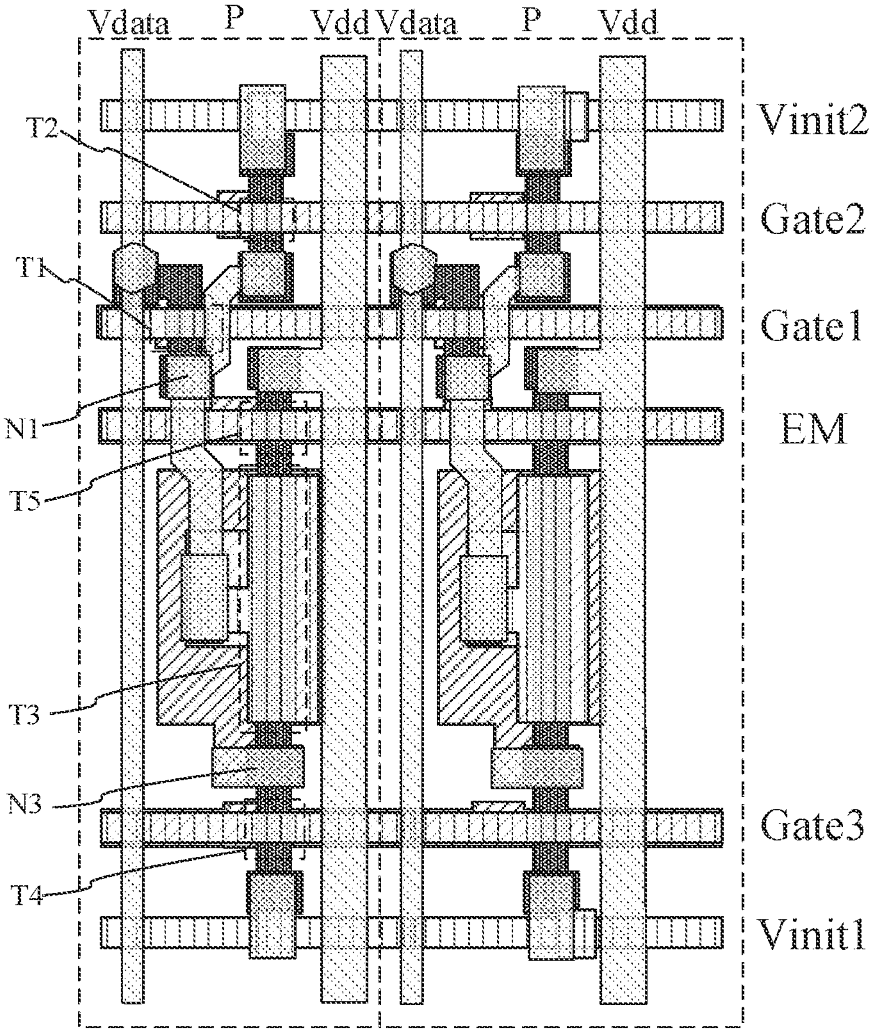
FIG. 52 is a structural layout of a display panel according to an embodiment of the present disclosure.
Figure 53:
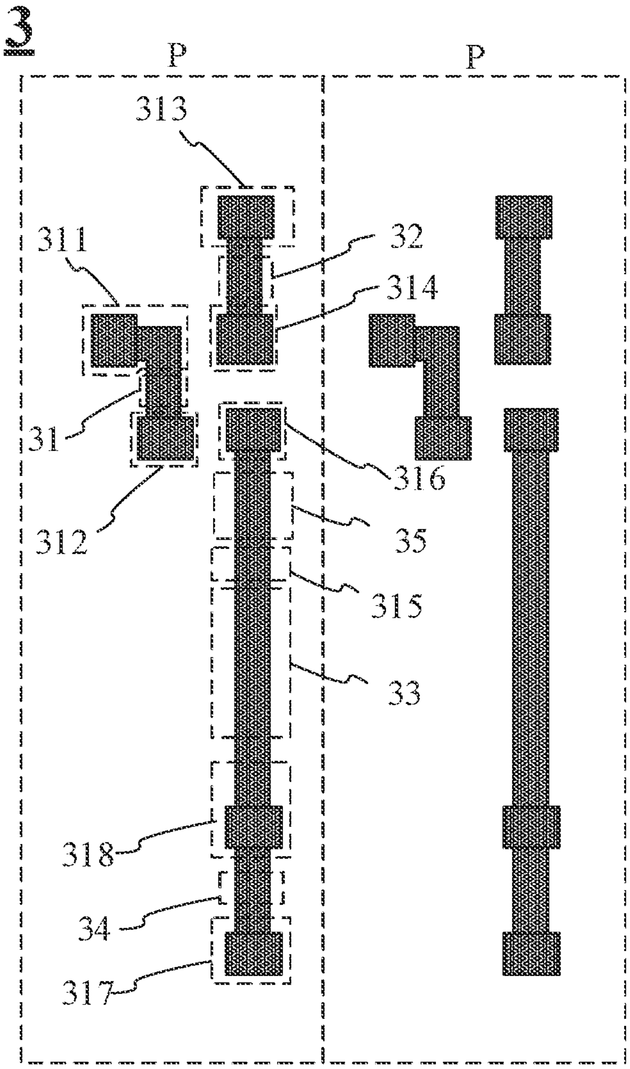
FIG. 53 is a structural layout of the active layer in FIG. 52.
Figure 54:
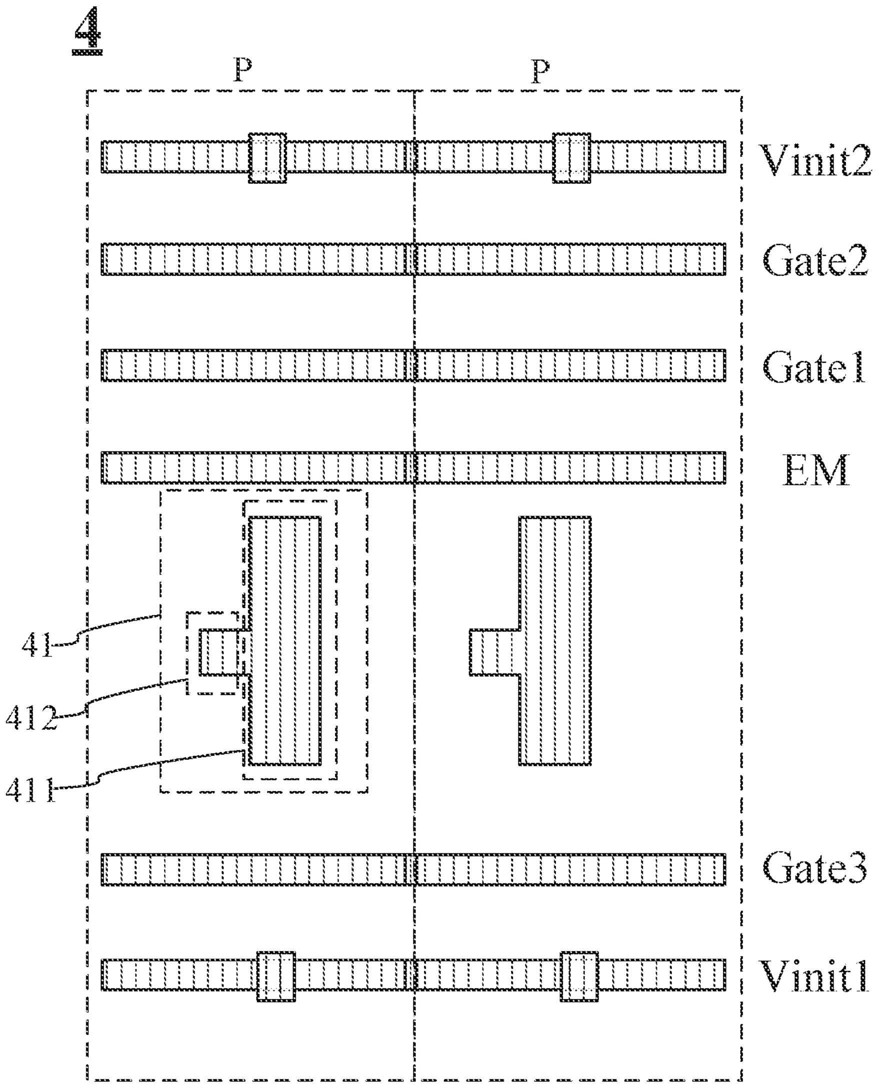
FIG. 54 is a structural layout of the third conductive layer in FIG. 52.
Figure 55:
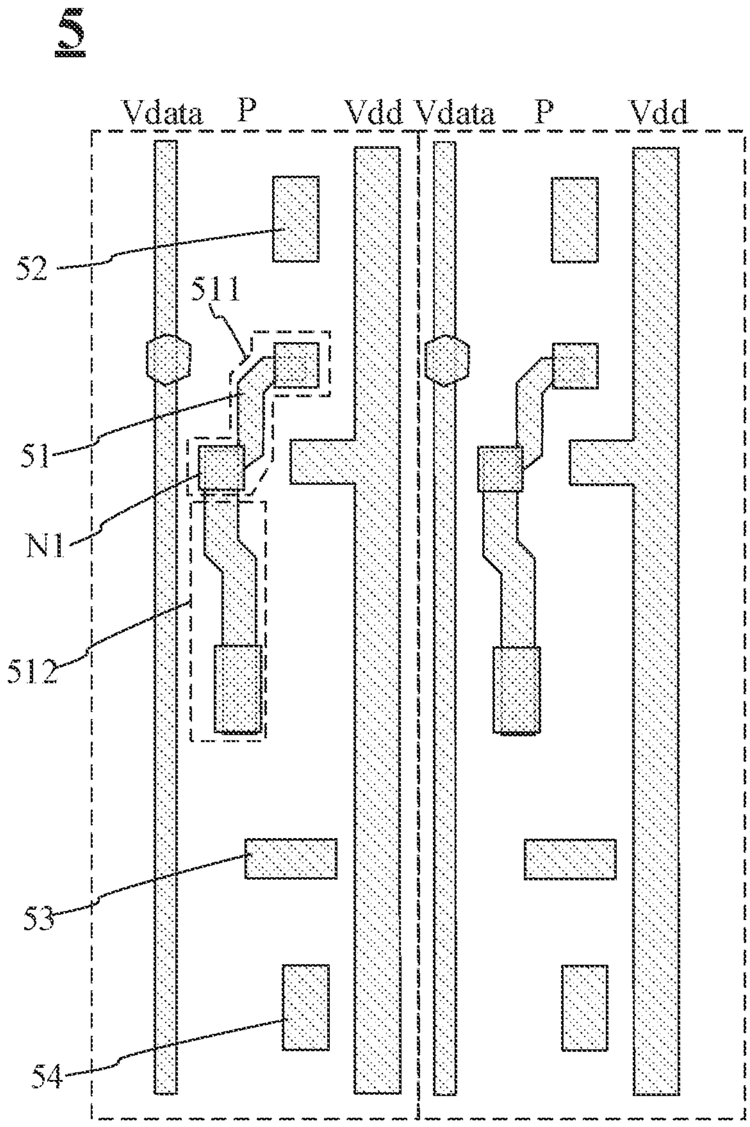
FIG. 55 is a structural layout of the fourth conductive layer in FIG. 52.

The present disclosure also provides a display panel, which may include a plurality of pixel driving circuits described in any embodiment of the present disclosure. A plurality of pixel driving circuits are arranged in an array along a first direction X and a second direction Y. The first direction X may be, for example, a row direction, and the second direction Y may be, for example, a column direction. FIG. 52 is a structural layout of a display panel according to an embodiment of the present disclosure. FIG. 53 is a structural layout of the active layer in FIG. 52. FIG. 54 is a structural layout of the third conductive layer in FIG. 52. FIG. 55 is a structural layout of the fourth conductive layer in FIG. 52. As shown in FIGS. 52 to 55, the display panel may include a base substrate, an active layer 3, a third conductive layer 4 and a fourth conductive layer 5, where the active layer 3 is located on one side of the base substrate, the active layer 3 may include a third active portion 33, a fifth active portion 35, a fifteenth active portion 315 and a sixteenth active portion 316. The third active portion 33 is to form the channel region of the driving transistor T3; the fifth active portion 35 is configured to form the channel region of the fifth transistor T5; the fifteenth active portion 315 is connected between the third active portion 33 and the fifth active portion 35, the fifteenth active portion 315 can be configured to form the first electrode of the driving transistor T3 and the first electrode of the fifth transistor T5; the sixteenth active portion 316 is connected to one side of the fifth active portion 35 away from the fifteenth active portion 315, the sixteenth active portion 316 can be configured to form the second electrode of the fifth transistor T5; the third conductive layer 4 is located on the side of the active layer 3 away from the base substrate, and the third conductive layer 4 can include a first conductive portion 41 and a first enable signal line EM. The first conductive portion 41 is arranged correspondingly to the third active portion 33. The orthographic projection of the first conductive portion 41 on the base substrate covers the orthographic projection of the third active portion 33 on the base substrate, the first conductive portion 41 can be configured to form the gate electrode of the driving transistor T3; the orthographic projection of the first enable signal line EM on the base substrate extends along the first direction X and cover the orthographic projection of the fifth active portion 35 on the base substrate, a part of the structure of the first enable signal line EM can be configured to form the top gate electrode of the fifth transistor T5; the fourth conductive layer 5 is located on the side of the third conductive layer 4 away from the base substrate. The fourth conductive layer 5 may include a first power line Vdd, the orthographic projection of the first power line Vdd on the base substrate may extend along the second direction Y. The first power line Vdd is connected to the sixteenth active portion 316 at the corresponding position through a via hole.

By forming the fifth transistor T5, the display panel of the present disclosure can adjust the conduction duration of the fifth transistor T5 in the light emitting phase by adjusting the duty ratio of the conduction level of the first enable signal line EM, thereby adjusting the size of driving current provided by the pixel driving, thereby actively controlling the pixel driving circuit during the light emitting phase, providing the possibility to adjust the gray-scale voltage of the image displayed on the display panel. In other words, because the display panel of the present disclosure has the fifth transistor T5, it can realize the adjustment of the gray scale value of the display screen in the light emitting phase.

As shown in FIGS. 52 and 53, in an exemplary embodiment, the orthographic projection of the structure formed by sequentially connecting the sixteenth active portion 316, the fifth active portion 35, the fifteenth active portion 315, and the third active portion 33 on the base substrate may extend along the second direction Y, so that the fifth transistor T5 is located on one side of the driving transistor T3 along the column direction.

It should be understood that when a certain structure A in this disclosure extends along direction B, it means that A may include a main part and a secondary part connected to the main part. The main part is a line, line segment or bar-shaped body, and the main part extends along direction B, and the length of the main part extending in direction B is greater than the length of the secondary part extending in other directions.

The present disclosure can use the third conductive layer 4 as a mask to conduct conduction processing on the active layer 3, that is, the area covered by the third conductive layer 4 in the active layer 3 can form the channel region of the transistor. The areas not covered by the third conductive layer 4 form conductor structures.

The first enable signal line EM can be configured to provide the enable signal terminal EM in FIG. 47. The orthographic projection of the first enable signal line EM on the base substrate can extend along the first direction X, so that a part structure of the first enable signal line EM covers the fifth active portion 35, so that the fifth active portion 35 forms the channel region of the fifth transistor T5.

As shown in FIGS. 53, in exemplary embodiments, the first conductive portion 41 in the third conductive layer 4 may include a first main body part 411 and a first additional part 412, and the orthographic projection of first main body part 411 on the base substrate may extend along the second direction Y and cover the orthographic projection of the third active portion 33 on the base substrate, and the first main body part 411 may be configured to form the gate electrode of the driving transistor T3. The first additional part 412 may be connected to one side of the first main body part 411 along the first direction X, the first additional part 412 is connected to the first electrode of the storage capacitor C through a via hole, so that the gate electrode of the driving transistor T3 is connected to the first electrode of the storage capacitor C.

The first power line Vdd can provide the first power terminal VDD in FIG. 47. The orthographic projection of the first power line Vdd on the base substrate extends along the second direction Y. The first power line Vdd can be connected to the sixteenth terminal through a via hole, so that the second electrode of the fifth transistor T5 is connected to the first power terminal VDD.

It should be understood that the orthographic projection of a certain structure A on the substrate described in this disclosure covers the orthographic projection of another structure B on the substrate means that the outline of the orthographic projection of B on the plane of the base substrate is completely located within the outline of the orthographic projection of B on the plane of the base substrate.

Figure 56:
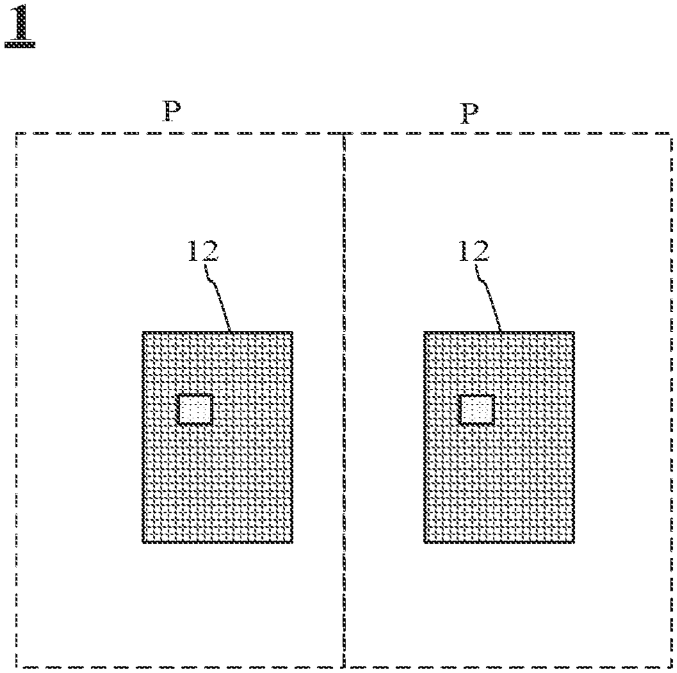
FIG. 56 is a structural layout of the first conductive layer in FIG. 52.

In addition, as shown in FIG. 52, the display panel of the present disclosure may also include a first conductive layer 1 and a second conductive layer 2, wherein the base substrate, the first conductive layer 1, the second conductive layer 2, the active layer 3, the third conductive layer 4 and the fourth conductive layer 5 are stacked in sequence, and an insulating layer may be disposed between the above functional layers. The first conductive layer 1 may be a first gate metal layer (Gate1 layer), the second conductive layer 2 may be a second gate metal layer (Gate2 layer), and the third conductive layer 4 may be a third gate metal layer (Gate3 layer), the fourth conductive layer 5 may be the first metal wiring layer (SD1 layer). FIG. 56 is a structural layout of the first conductive layer in FIG. 52, and FIG. 57 is a structural layout of the second conductive layer in FIG. 52.

As shown in FIGS. 52 and 56, in exemplary embodiments, the first conductive layer 1 may include a second conductive portion 12, and the second conductive portion 12 may be configured to form a first electrode of the storage capacitor C. The orthographic projection of the second conductive portion 12 on the base substrate can cover the orthographic projection of the first addition portion 412 on the base substrate, so that the second conductive portion 12 can be directly connected to the first addition portion 412 through the via hole at the corresponding position, and the first electrode of the storage capacitor C is connected to the gate electrode of the driving transistor T3.

Figure 57:
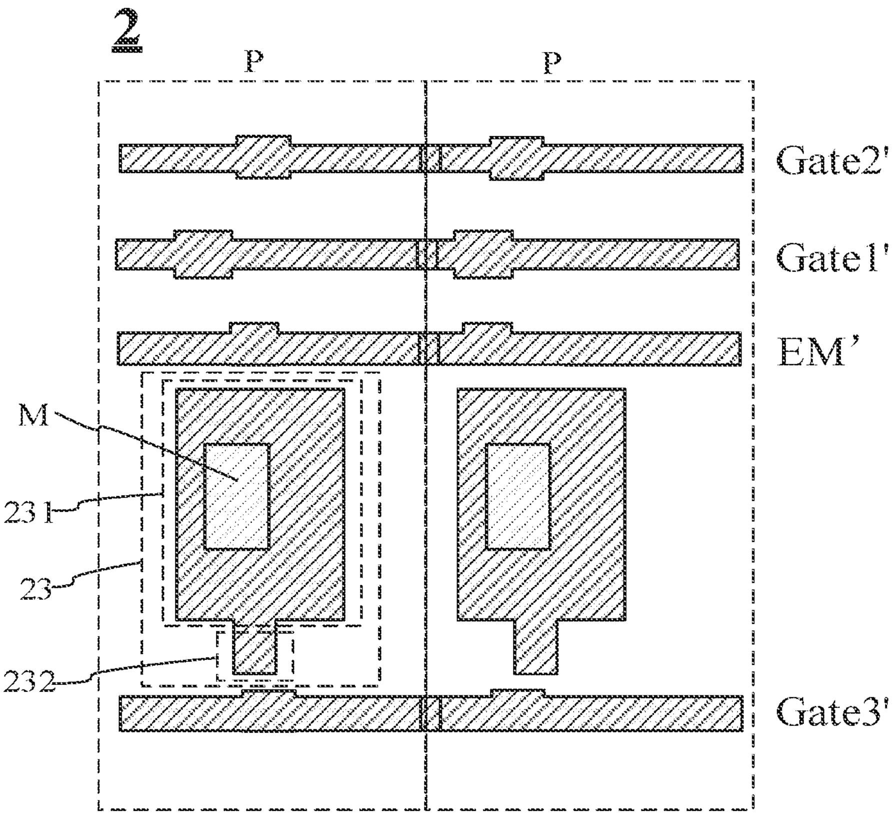
FIG. 57 is a structural layout of the second conductive layer in FIG. 52.

As shown in FIGS. 52 and 57, the second conductive layer 2 may include a third conductive portion 23, the third conductive portion 23 may be configured to form the second electrode of the storage capacitor C, and the third conductive portion 23 may include a second main body part 231 and the second addition part 232. The orthographic projection of the second main body part 231 on the base substrate may extend along the second direction Y and overlap the orthographic projection of the second conductive portion 12 on the base substrate. The second addition part 232 is connected to the side of the second main body portion 231 close to the third gate signal line Gate3. The second main body part 231 forms the second electrode of the storage capacitor C. The second main body part 231 has an opening M through which a part of the second conductive portion 12 can be exposed, so that the exposed second conductive portion 12 can be connected to the first addition portion 412 in the first conductive portion 41 through a via hole.

The second addition part 232 may be connected to the third bridge portion 53 of the fourth conductive layer 5 through a via hole, so as to connect the second addition part 232 to the third node N3 through the third bridge portion 53 so that the second electrode of the storage capacitor C is connected to the third node N3. In an exemplary embodiment, the conductive structure forming the third node N3 in the active layer 3 may be located on a side of the third active portion 33 away from the fifth active portion 35, and accordingly, the second addition part 232 may be located on a side of the second main body part 231 away from the first enable signal line EM.

In addition, as shown in FIG. 57, the second conductive layer 2 may also include a first gate line Gate1', a second gate line Gate2', a third gate line Gate3' and a second enable signal line EM'. The second enable signal line EM', the first gate line Gate1' and the second gate line Gate2' are located on one side of the third conductive portion 23 in the second direction Y, and the third gate line Gate3' is located on the other side of the third conductive portion 23 in the second direction Y, the orthographic projections of the first gate line Gate1', the second gate line Gate2', the third gate line Gate3' and the second enable signal line EM' on the base substrate can all extend along the first direction X, and the second enable signal line EM', the first gate line Gate1' and the second gate line Gate2' are sequentially arranged in the second direction Y in a direction away from the third conductive portion 23.

The first gate line Gate1' is arranged corresponding to the first gate signal line Gate1 of the third conductive layer 4. The orthographic projection of the first gate line Gate1' on the base substrate can partially overlap the orthographic projection of the first gate signal line Gate1 on the base substrate and covers the orthographic projection of the first active portion 31 on the base substrate, so that a part of the structure of the first gate line Gate1' can be configured to form the bottom gate electrode of the first transistor T1.

The second gate line Gate2' is arranged corresponding to the second gate signal line Gate2. The orthographic projection of the second gate line Gate2' on the base substrate partially overlaps the orthographic projection of the second gate signal line Gate2 on the substrate and covers the orthographic projection of the second active portion 32 on the base substrate, so that a part of the structure of the second gate line Gate2' can be configured to form the bottom gate electrode of the second transistor T2.

The third gate line Gate3' is arranged correspondingly to the third gate signal line Gate3. The orthographic projection of the third gate line Gate3' on the base substrate partially overlaps the orthographic projection of the third gate signal line Gate3 on the substrate and covers the orthographic projection of the fourth active portion 34 on the base substrate, so that part of the structure of the third gate line Gate3' can be configured to form the bottom gate electrode of the fourth transistor T4.

The second enable signal line EM' is arranged corresponding to the first enable signal line EM. The orthographic projection of the second enable signal line EM' on the base substrate partially overlaps the orthographic projection of the first enable signal line EM on the base substrate and covers the orthographic projection of the fifth active portion 35 on the base substrate, so that a part of the structure of the second enable signal line EM' can be configured to form the bottom gate electrode of the fifth transistor T5.

As shown in FIGS. 52 and 53, in exemplary embodiments, the active layer 3 may further include a first active portion 31, a second active portion 32 and a fourth active portion 34, where the first active portion 31 is configured to form a channel region of the first transistor T1, the second active portion 32 is configured to form a channel region of the second transistor T2, and the fourth transistor T4 is configured to form a channel region of the fourth transistor T4. The fourth active portion 34 and the fifth active portion 35 are respectively located at two terminals of the third active portion 33 to connect two terminals of the driving transistor T3 respectively.

As shown in FIG. 53, the active layer 3 may further include an eleventh active portion 311 to an eighteenth active portion 318, wherein the eleventh active portion 311 is connected to a side of the first active portion 31, is configured to form the first electrode of the first transistor T1, the orthographic projection of the eleventh active portion 311 on the base substrate can extend along the first direction to below the data signal line Vdata, to connect to the data signal line Vdata through a via hole, and to connect the first electrode of the first transistor T1 to the data signal terminal Data. The twelfth active portion 312 is connected to the other side of the first active portion 31 and is configured to form the second electrode of the first transistor T1. The orthographic projection of the twelfth active portion 312 on the base substrate can extend to the position of the first node N1 along the second direction Y, so that the first bridge portion 51 of the fourth conductive layer 5 can be connected through the via hole to connect the second electrode of the first transistor T1 to the first node N1.

The thirteenth active portion 313 and the fourteenth active portion 314 are respectively connected to both sides of the second active portion 32, and the thirteenth active portion 313 may be configured to form the first electrode of the second transistor T2, the fourteenth active portion 314 may be configured to form the second electrode of the second transistor T2. The connected structure of the thirteenth active portion 313, the second active portion 32 and the fourteenth active portion 314 may extend along the second direction Y, and the fourteenth active portion 314 is located on one side of the second active portion 32 close to the third active portion 33, correspondingly, the thirteenth active portion 313 is located on the side of the second active portion 32 away from the third active portion 33. The thirteenth active portion 313 may be connected to the second bridge portion 52 of the fourth conductive layer 5 through a via hole, so as to connect the second initial signal line Vinit2 of the third conductive layer 4 through the second bridge portion 52, thereby connecting the first electrode of the second transistor T2 to the second initial signal terminal Vinit2. The fourteenth active portion 314 may be connected to the first bridge portion 51 of the fourth conductive layer 5 through a via hole, so as to connect the second electrode of the second transistor T2 to the first node N1 through the first bridge portion 51.

The eighteenth active portion 318 is connected between the fourth active portion 34 and the third active portion 33 and is configured to form the second electrode of the fourth transistor T4 and the third node N3. The seventeenth active portion 317 is connected to the side of the fourth active portion 34 away from the third active portion 33 and is configured to form the first electrode of the fourth transistor T4. The seventeenth active portion 317 can be connected to the fourth bridge portion 54 of the fourth conductive layer 5 through a via hole, and is configured to connect the first electrode of the fourth transistor T4 to the first initial signal terminal Vinit1 through the fourth bridge portion 54.

As shown in FIG. 54, in an exemplary embodiment, the third conductive layer 4 may also include first to third gate signal lines Gate1 to Gate3 and first and second initial signal lines Vinit1 and Vinit2, wherein each of the above signal lines can extend along the first direction X, and the first enable signal line EM, the first gate signal line Gate1, the second gate signal line Gate2 and the second initial signal line Vinit2 are located on one side of the third conductive portion 23 in the second direction Y and are sequentially spaced in the second direction Y in the direction away from the third conductive portion 23. The third gate signal and the first initial signal line Vinit1 are located on the other side of the third conductive portion 23 in the second direction Y, and are spaced apart in the second direction Y along the direction away from the third conductive portion 23.

The first gate signal line Gate1 may be configured to provide the first gate signal terminal Gate1 in FIG. 47. The orthographic projection of the first gate signal line Gate1 on the base substrate covers the orthographic projection of the first active portion 31 on the base substrate, and a part of the structure of the first gate signal line Gate1 is configured to form the top gate electrode of the first transistor T1.

The second gate signal line Gate2 may be configured to provide the second gate signal terminal Gate2 in FIG. 47. The orthographic projection of the second gate signal line Gate2 on the base substrate covers the orthographic projection of the second active portion 32 on the base substrate, and a part of the structure of the second gate signal line Gate2 is configured to form the top gate electrode of the second transistor T2.

The third gate signal line Gate3 may be configured to provide the third gate signal terminal Gate3 in FIG. 47. The orthographic projection of the third gate signal line Gate3 on the base substrate covers the orthographic projection of the fourth active portion 34 on the base substrate, and a part of the structure of the third gate signal line Gate3 is configured to form the top gate electrode of the fourth transistor T4.

The first initial signal line Vinit1 may be configured to provide the first initial signal terminal Vinit1 in FIG. 47. The first initial signal line Vinit1 may be connected to the fourth bridge portion 54 of the fourth conductive layer 5 through a via hole, so as to be connected to the first electrode of the fourth transistor T4 through the fourth bridge portion 54. The second initial signal line Vinit2 may be configured to provide the second initial signal terminal Vinit2 in FIG. 47. The second initial signal line Vinit2 may be connected to the second bridge portion 52 of the fourth conductive layer 5 through a via hole, so as to be connected to the first electrode of the second transistor T2 through the second bridge portion 52.

As shown in FIG. 55, in an exemplary embodiment, in addition to the first power line Vdd, the fourth conductive layer 5 may also include first to fourth bridge portions 51 to 54, wherein the first bridge portion 51 may form the first node N1 in FIG. 47, the first bridge portion 51 may include a first sub-bridge portion 511 and a second sub-bridge portion 512. The first sub-bridge portion 511 may be bent and connected the fourteenth active portion 314 and the twelfth active portion 312 through via holes, that is respectively connected to the second electrode of the second transistor T2 and the second electrode of the first transistor T1. The second sub-bridge portion 512 may extend along the second direction Y, one terminal of the second sub-bridge portion 512 is connected to the first sub-bridge portion 511, and the other terminal may be connected to the first addition part 412 through a via hole to connect the gate electrode of the driving transistor T3, so that the second electrode of the first transistor T1, the second electrode of the second transistor T2 and the gate electrode of the driving transistor T3 are connected through the first sub-bridge portion 511 and the second sub-bridge portion 512.

The orthographic projection of the second bridge portion 52 on the base substrate may extend along the second direction Y to connect the thirteenth active portion 313 and the second initial signal line Vinit2 through via holes respectively in the second direction Y to connect the first electrode of the second transistor T2 to the second initial signal terminal Vinit2.

The orthographic projection of the third bridge portion 53 on the base substrate may extend along the first direction X to connect the second addition portion 232 and the eighteenth active portion 318 through via holes in the first direction, so that the second electrode of the fourth transistor T4 and the second electrode of the storage capacitor C are connected to the third node N3.

The orthographic projection of the fourth bridge portion 54 on the base substrate may extend along the second direction Y to connect the seventeenth active portion 317 and the first initial signal line Vinit1 through via holes in the second direction Y respectively, and connect the first electrode of the fourth transistor T4 to the first initial signal terminal Vinit1.

In addition, as shown in FIG. 55, the fourth conductive layer 5 may also include a data signal line Vdata. The orthographic projection of the data signal line Vdata on the base substrate may extend along the second direction Y. The data signal line Vdata may be configured to provide the data signal terminal Data shown in FIG. 47, the data signal line Vdata may be connected to the eleventh active portion 311 through a via hole to be connected to the first electrode of the first transistor T1. As shown in FIG. 52, in an exemplary embodiment, in one repeating unit, the data signal line Vdata and the first power supply line Vdd may be located on both sides. In other words, in the same repeating unit, other structures of the pixel driving circuit are located between the data signal line Vdata and the first power line Vdd.

Figure 58:
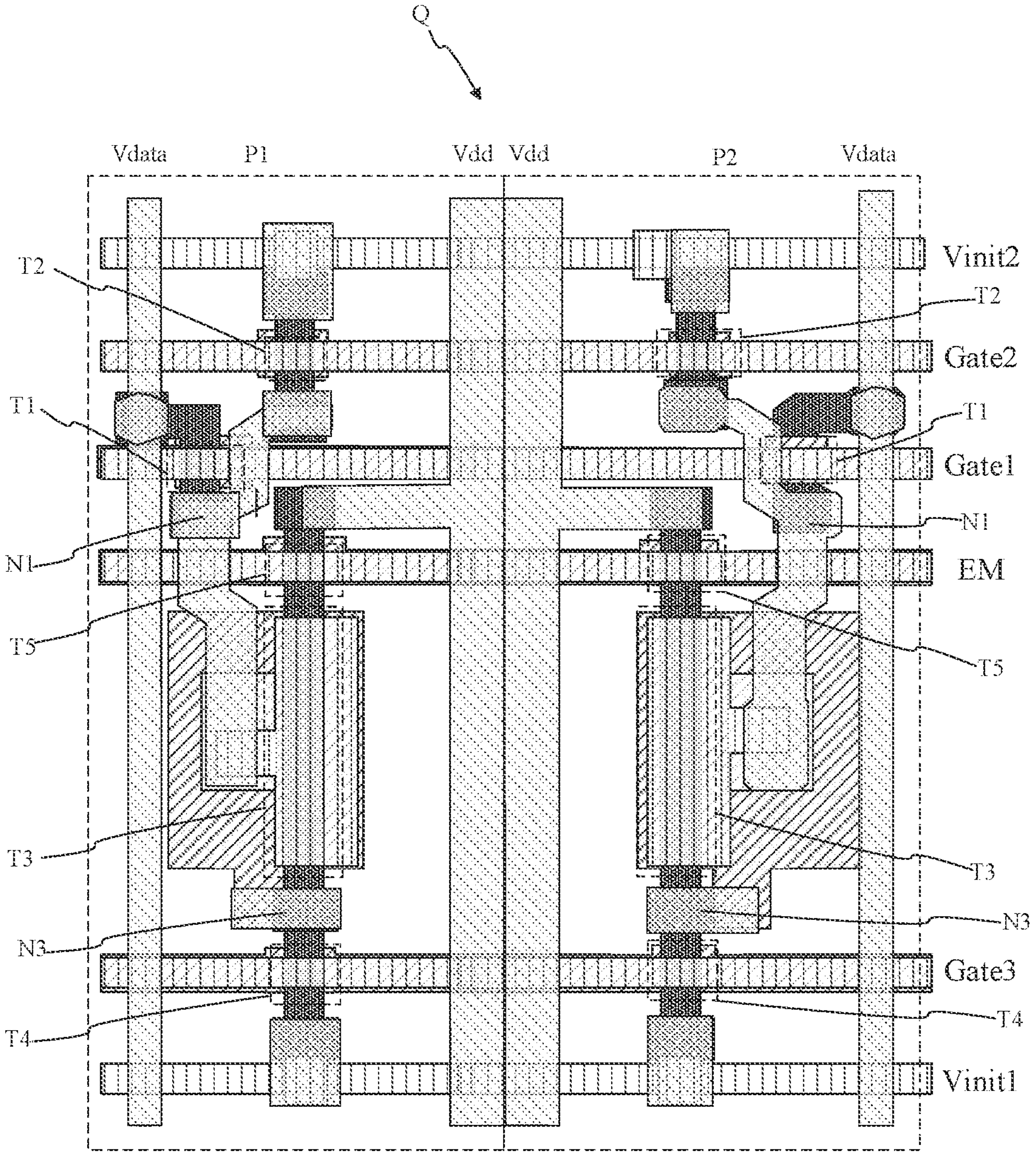
FIG. 58 is another structural layout of a display panel according to an embodiment of the present disclosure.

As shown in FIG. 52, among the plurality of pixel driving circuits in the display panel of the present disclosure, one pixel driving circuit may constitute a repeating unit. In another exemplary embodiment of the present disclosure, one repeating unit may also be formed by two pixel driving circuits. Exemplarily, FIG. 58 is a structural layout of a display panel according to another embodiment of the present disclosure. As shown in FIG. 58, a plurality of pixel driving circuits may include first pixel driving circuits P1 and the second pixel driving circuit P2 arranged adjacently in the row direction X, the first pixel driving circuit P1 and the second pixel driving circuit P2 may be arranged in mirror symmetry. The first pixel driving circuit P1 and the second pixel driving circuit P2 may form a repeating unit Q, and the display panel may include a plurality of repeating units Q arranged in an array in the row direction X and the column direction Y. Among the two adjacent repeating units Q in the row direction, the first pixel driving circuit P1 in one repeating unit Q is adjacent to the second pixel driving circuit P2 in the other adjacent repeating unit Q. The second pixel driving circuit P2 in a repeating unit Q is arranged adjacent to the first pixel driving circuit P1 in another repeating unit Q.

As shown in FIG. 58, in a repeating unit Q, the first pixel driving circuit P1 and the second pixel driving circuit P2 are arranged in mirror symmetry, and the first power supply line Vdd in the first pixel driving circuit P1 and the first power supply line Vdd in the second pixel driving circuit P2 may be connected as a whole, and in the two adjacent repeating units Q in the row direction, the first power supply line Vdd in the first pixel driving circuit P1 and the first power supply line Vdd in the adjacent repeating unit Q are not connected. In addition, as shown in FIG. 58, in the same repeating unit Q, the data signal line Data in the first pixel driving circuit P1 and the data signal line Data in the second pixel driving circuit P2 are not connected, and the two data signal lines Data are arranged on both sides of the two first power lines Vdd.

Figure 59:
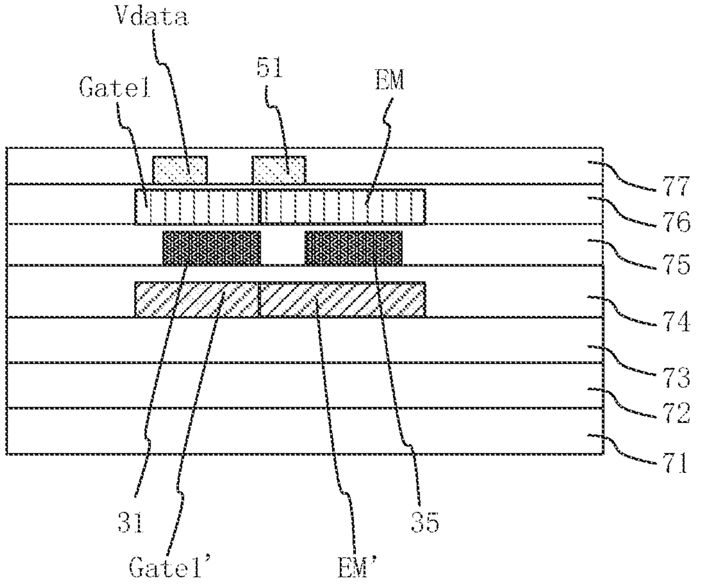
FIG. 59 is a cross-sectional view along the AA direction in FIG. 52.

FIG. 59 is a cross-sectional view along the AA direction in FIG. 52. As shown in FIG. 59, the display panel can also include a buffer layer 72, a first insulating layer 73, a second insulating layer 74, a first dielectric layer 75, and a passivation layer. 76, wherein the base substrate 71, the buffer layer 72, the first conductive layer 1, the first insulating layer 73, the second conductive layer 2, the second insulating layer 74, the active layer 3, the first dielectric layer 75, the third conductive layer 4, the passivation layer 76, the fourth conductive layer 5, and the first planarization layer 77 are stacked in sequence. The first insulating layer 73, the second insulating layer 74, and the third insulating layer 75 may be silicon oxide layers, the first dielectric layer 75 may be a silicon nitride layer, and the material of the buffer layer 72 may be silicon oxide, silicon nitride, or the like. The base substrate 71 may include a glass substrate, a barrier layer, and a polyimide layer that are stacked in sequence. The barrier layer may be an inorganic material. The material of the first conductive layer 1, the second conductive layer 2, and the third conductive layer 4 may be one of molybdenum, aluminum, copper, titanium, niobium or an alloy, or a molybdenum/titanium alloy or a laminated layers thereof. The material of the fourth conductive layer 5 may include metal materials, such as one or an alloy of molybdenum, aluminum, copper, titanium, niobium, or a molybdenum/titanium alloy or laminated layers thereof, or may be a titanium/aluminum/titanium laminated layer.

The driving method described in the embodiment of the present disclosure is applied to the above-mentioned pixel circuit. The driving method includes:

Controlling, by the light emitting control circuit, to connect the first voltage terminal and the first terminal of the driving circuit under the control of the light emitting control signal;

Controlling, by the driving circuit, to connect the first voltage terminal and the first electrode of the light emitting element under the control of the potential of the first node;

Controlling, by the first setting circuit, to connect the first setting voltage terminal and the first node under the control of the first control signal;

Controlling, by the second setting circuit, to connect the second setting voltage terminal and the first energy storage circuit under the control of the second control signal.

The display device according to the embodiment of the present disclosure includes the above-mentioned pixel circuit.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A pixel circuit, comprising a light emitting element, a driving circuit, a first energy storage circuit, a first setting circuit, a second setting circuit and a light emitting control circuit; wherein:

the light emitting control circuit is electrically connected to a light emitting control terminal, a first voltage terminal and a first terminal of the driving circuit respectively, and is configured to control to connect the first voltage terminal and the first terminal of the driving circuit under the control of a light emitting control signal provided by the light emitting control terminal;

a control terminal of the driving circuit is electrically connected to a first node, and a second terminal of the driving circuit is electrically connected to a first electrode of the light emitting element, the driving circuit is configured to control to connect the first voltage terminal and the first electrode of the light emitting element under the control of a potential of the first node;

the first electrode of the light emitting element is electrically connected to a second node; a second electrode of the light emitting element is electrically connected to a second voltage terminal;

a first terminal of the first energy storage circuit is electrically connected to the first node, and a second terminal of the first energy storage circuit is electrically connected to a third node, the first energy storage circuit is configured to store electrical energy; the second node is electrically connected to the third node;

the first setting circuit is electrically connected to a first control terminal, a first setting voltage terminal and the first node respectively, and is configured to control to connect the first setting voltage terminal and the first node under the control of a first control signal provided by the first control terminal;

the second setting circuit is electrically connected to a second control terminal, a second setting voltage terminal and a second terminal of the first energy storage circuit respectively, and is configured to control to connect the second setting voltage terminal and the second terminal of the first energy storage circuit under the control of a second control signal provided by the second control terminal;

the pixel circuit further comprises a third setting circuit; and the third setting circuit is electrically connected to a third control terminal, a third setting voltage terminal and the third node respectively, and is configured to write a third setting voltage provided by the third setting voltage terminal into the third node under the control of a third control signal provided by the third control terminal.

2. The pixel circuit according to claim 1, further comprising a data writing-in circuit;

wherein the data writing-in circuit is electrically connected to a scanning terminal, a data line and the first node respectively, and is configured to write a data voltage provided by the data line into the first node under the control of a scanning signal provided by the scanning terminal.

3. The pixel circuit according to claim 1, further comprising a second energy storage circuit; wherein the third node is electrically connected to the second node through the second energy storage circuit;

a first terminal of the second energy storage circuit is electrically connected to the third node, a second terminal of the second energy storage circuit is electrically connected to the second node, and the second energy storage circuit is configured to store electrical energy.

4. The pixel circuit according to claim 1, wherein the first control terminal and the second control terminal are a same control terminal.

5. The pixel circuit according to claim 1, further comprising a data writing-in circuit; wherein the data writing-in circuit is electrically connected to the scanning terminal, the data line and the first node respectively, and is configured to write the data voltage provided by the data line into the first node under the control of the scanning signal provided by the scanning terminal;

the third control terminal and the scanning terminal are a same control terminal.

6. The pixel circuit according to claim 1, further comprising a fourth setting circuit;

wherein the fourth setting circuit is electrically connected to a fourth control terminal, a fourth setting voltage terminal and the second node respectively, and is configured to write a fourth setting voltage provided by the fourth setting voltage terminal into the second node under the control of a fourth control signal provided by the fourth control terminal.

7. The pixel circuit according to claim 6, wherein the first control terminal and the fourth control terminal are a same control terminal.

8. The pixel circuit according to claim 1, wherein the pixel circuit includes a fourth setting circuit;

the fourth setting circuit is electrically connected to a fourth control terminal, the third node and the second node respectively, and is configured to connect the third node and the second node under the control of the fourth control signal provided by the fourth control terminal;

the second setting voltage terminal and the third setting voltage terminal are a same setting voltage.

9. The pixel circuit according to claim 3, wherein the pixel circuit further comprises a first control circuit;

the first terminal of the first energy storage circuit is electrically connected to the first node through the first control circuit;

the first terminal of the first energy storage circuit is directly electrically connected to a fourth node;

the first control circuit is electrically connected to a fifth control terminal, and is configured to control to connect the first node and the fourth node under the control of a fifth control signal provided by the fifth control terminal.

10. The pixel circuit according to claim 9, further comprising a data writing-in circuit;

wherein the data writing-in circuit is electrically connected to the scanning terminal, the data line and the fourth node respectively, and is configured to write the data voltage provided by the data line into the fourth node under the control of the scanning signal provided by the scanning terminal.

11. The pixel circuit according to claim 9, wherein the second setting voltage terminal is electrically connected to the first node.

12. The pixel circuit according to claim 1, wherein the first setting voltage terminal is electrically connected to the third node.

13. The pixel circuit according to claim 1, wherein the first setting voltage terminal and the first voltage terminal are a same voltage terminal.

14. The pixel circuit according to claim 10, further comprising a second control circuit;

wherein the second control circuit is electrically connected to the light emitting control terminal, the second terminal of the driving circuit and the first electrode of the light emitting element respectively, and is configured to control to connect the second terminal of the driving circuit and the first electrode of the light emitting element under the control of the light emitting control signal.

15. The pixel circuit according to claim 10, further comprising a fourth setting circuit; wherein the fourth setting circuit is electrically connected to a fourth control terminal, a fourth setting voltage terminal and the second node respectively, and is configured to write the fourth setting voltage provided by the fourth setting voltage terminal into the second node under the control of the fourth control signal provided by the fourth control terminal;

the second setting voltage terminal and the fourth setting voltage terminal are a same voltage terminal, wherein the second voltage terminal and the fourth setting voltage terminal are a same voltage terminal.

16. The pixel circuit according to claim 2, wherein the pixel circuit further includes a fourth setting circuit;

the fourth setting circuit is electrically connected to a fourth control terminal, a fourth setting voltage terminal and the second node respectively, and is configured to write the fourth setting voltage provided by the fourth setting voltage terminal into the second node under the control of the fourth control signal provided by the fourth control terminal;

the fourth control terminal and the scanning terminal are a same control terminal.

17. The pixel circuit according to claim 15, wherein the third node is electrically connected to the fourth setting voltage terminal.

18. A driving method, applied to the pixel circuit according to claim 1, comprising:

controlling, by the light emitting control circuit, to connect the first voltage terminal and the first terminal of the driving circuit under the control of the light emitting control signal;

controlling, by the driving circuit, to connect the first voltage terminal and the first electrode of the light emitting element under the control of the potential of the first node;

controlling, by the first setting circuit, to connect the first setting voltage terminal and the first node under the control of the first control signal;

controlling, by the second setting circuit, to connect the second setting voltage terminal and the first energy storage circuit under the control of the second control signal.

19. A display device comprising the pixel circuit according to claim 1.

* * * * *